(12) United States Patent
Grip et al.

(10) Patent No.: US 11,787,524 B2
(45) Date of Patent: Oct. 17, 2023

(54) STRUCTURAL ARRANGEMENT AND METHOD FOR COUNTERACTING A VERTICAL MOMENT OF A STRUT-BRACED WING

(71) Applicant: The Boeing Company, Chicago, IL (US)

(72) Inventors: Robert E. Grip, Rancho Palos Verdes, CA (US); Neal A. Harrison, Lake Forest, CA (US)

(73) Assignee: The Boeing Company, Arlington, VA (US)

( * ) Notice: Subject to any disclaimer, the term of this patent is extended or adjusted under 35 U.S.C. 154(b) by 20 days.

(21) Appl. No.: 17/452,973

(22) Filed: Oct. 29, 2021

(65) Prior Publication Data
US 2023/0140102 A1    May 4, 2023

(51) Int. Cl.
*B64C 1/26* (2006.01)
*B64C 3/14* (2006.01)
*B64C 3/16* (2006.01)

(52) U.S. Cl.
CPC .......... *B64C 1/26* (2013.01); *B64C 3/14* (2013.01); *B64C 3/16* (2013.01); *B64C 2003/149* (2013.01)

(58) Field of Classification Search
CPC .... B64C 1/26; B64C 3/14; B64C 3/16; B64C 2003/149; B64C 3/185; B64C 1/065
USPC .................................................. 244/45 R, 49
See application file for complete search history.

(56) References Cited

U.S. PATENT DOCUMENTS

| | | | |
|---|---|---|---|
| 5,671,899 A * | 9/1997 | Nicholas | B64C 3/56 244/3.28 |
| 8,757,538 B2 * | 6/2014 | Seifert | B64C 3/10 244/45 R |
| 10,933,970 B2 | 3/2021 | Harrison | |
| 11,511,846 B2 * | 11/2022 | Campana | B64C 7/00 |
| 2011/0180660 A1 * | 7/2011 | Llamas Sandin | B64C 39/068 244/45 R |
| 2012/0074264 A1 * | 3/2012 | Heaton | B64C 3/385 244/45 R |
| 2013/0264428 A1 * | 10/2013 | Rouyre | B64C 39/068 244/45 R |
| 2018/0281926 A1 * | 10/2018 | Sclafani | B64C 3/16 |

OTHER PUBLICATIONS

Chun-Yung Niu, "Airframe Structural Design: Practical Design Information and Data on Aircraft Structures" (1999), pp. 253-276 (Year: 1999).*

* cited by examiner

*Primary Examiner* — Tien Q Dinh
*Assistant Examiner* — Katherine June Bolek

(57) ABSTRACT

An aircraft includes a fuselage and a pair of wings. Each wing is coupled to the fuselage at a wing-fuselage joint, and is supported by a strut coupled to the fuselage at a strut-fuselage joint and coupled to the wing at a strut-wing joint. The strut-fuselage joint is located below and at least partially aft of the wing-fuselage joint. The wing generates a lifting force when air passes over the wing. The lifting force induces a vertical moment about the wing-fuselage joint due to the location of the strut-fuselage joint below and at least partially aft of the wing-fuselage joint. The wing and/or the strut has a structural arrangement configured to counteract the vertical moment.

21 Claims, 45 Drawing Sheets

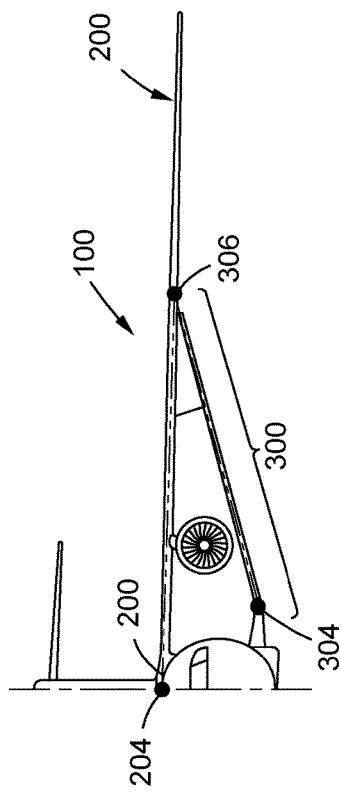
FIG. 55
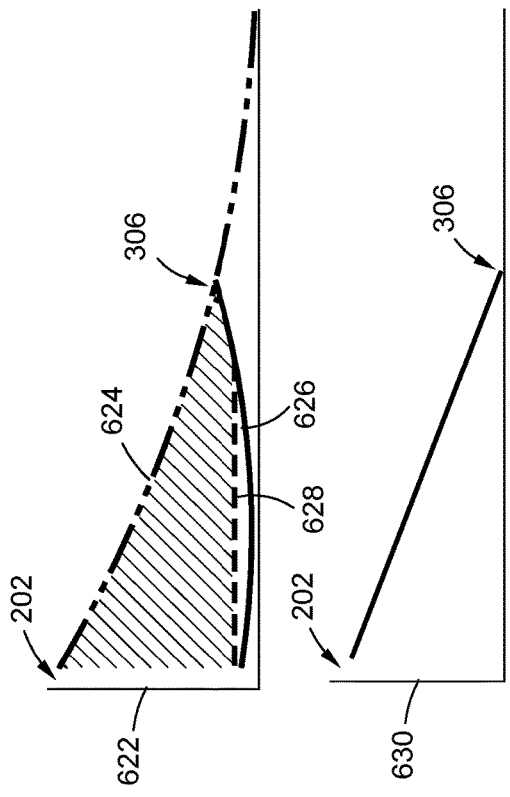
FIG. 56
FIG. 57
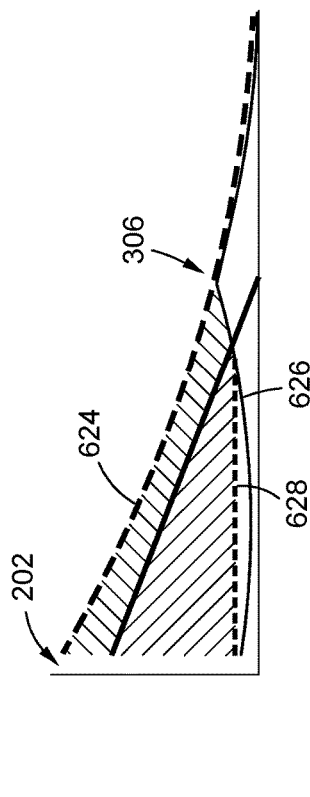
FIG. 58

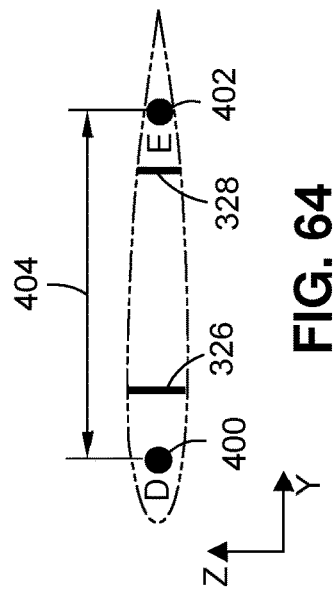
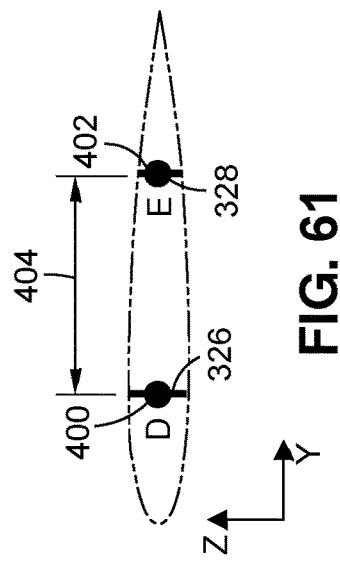
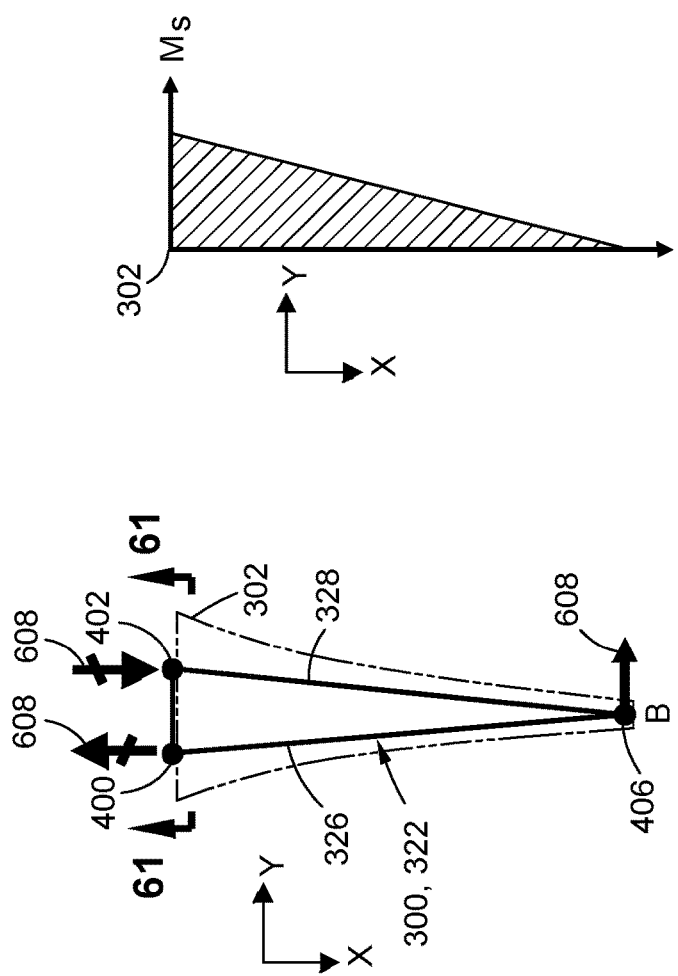
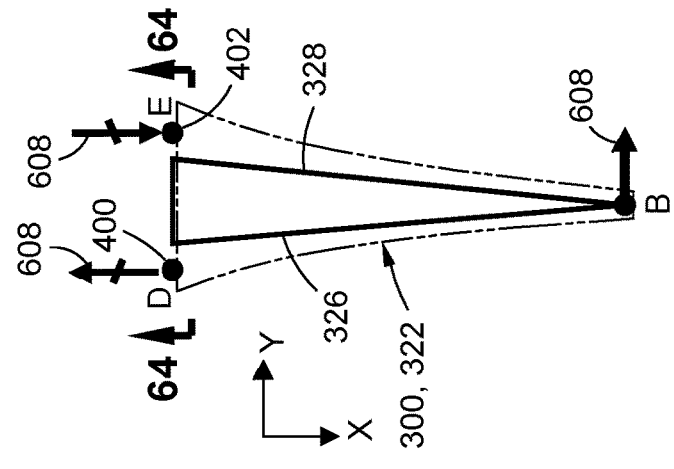

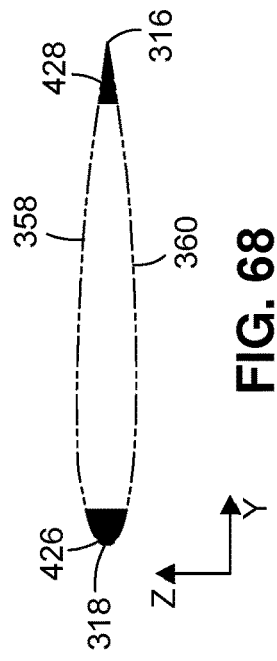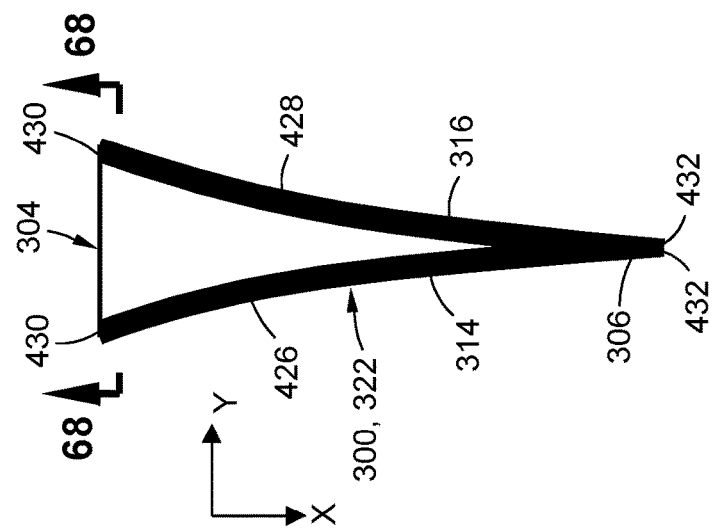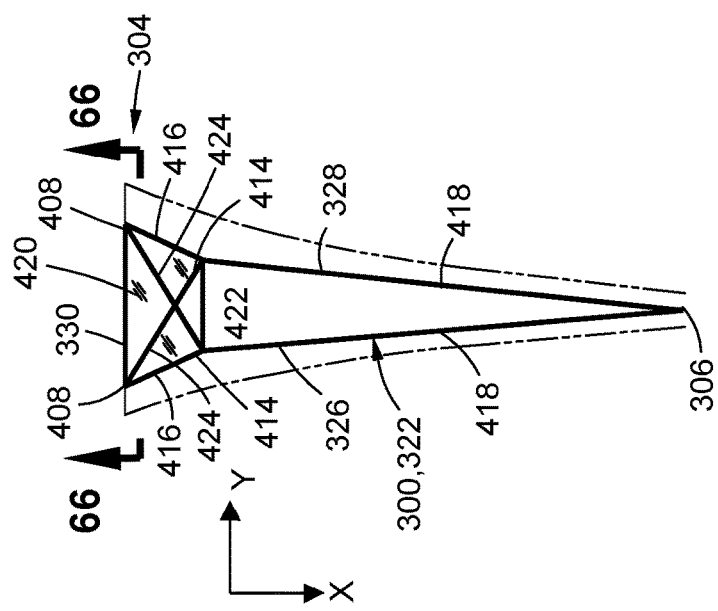

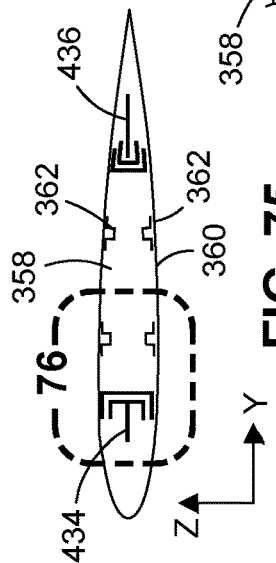
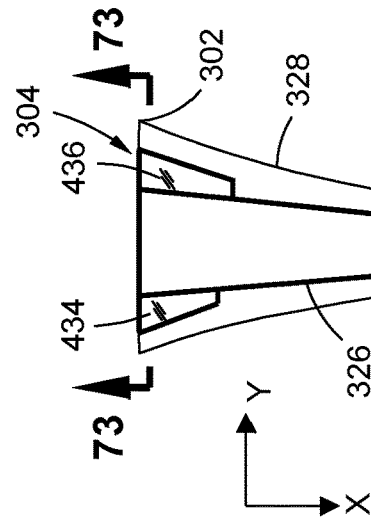
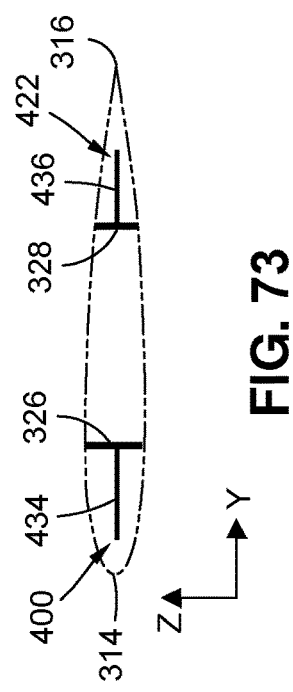
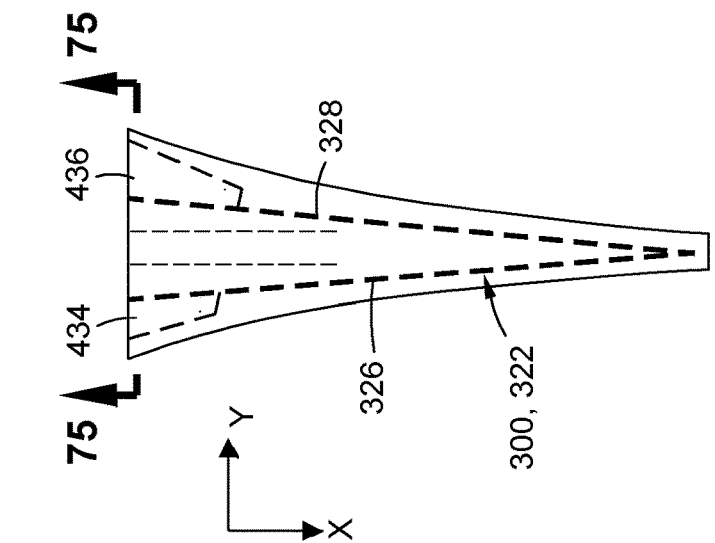
FIG. 76
FIG. 75
FIG. 74
FIG. 73
FIG. 72

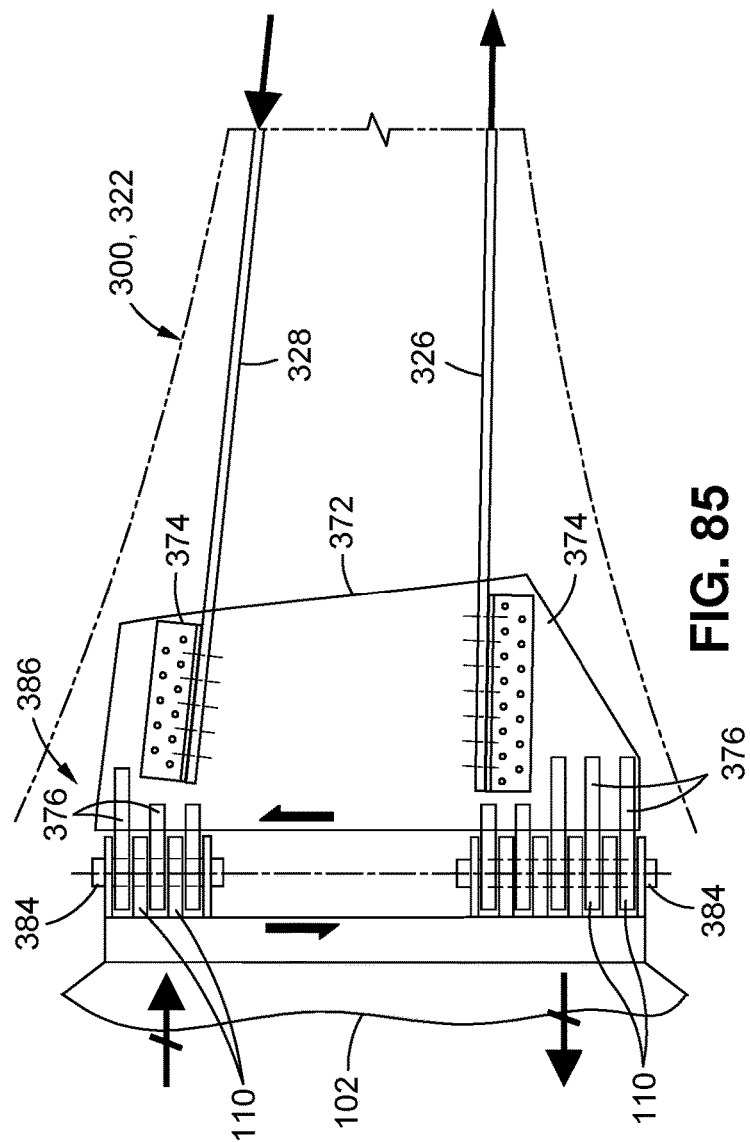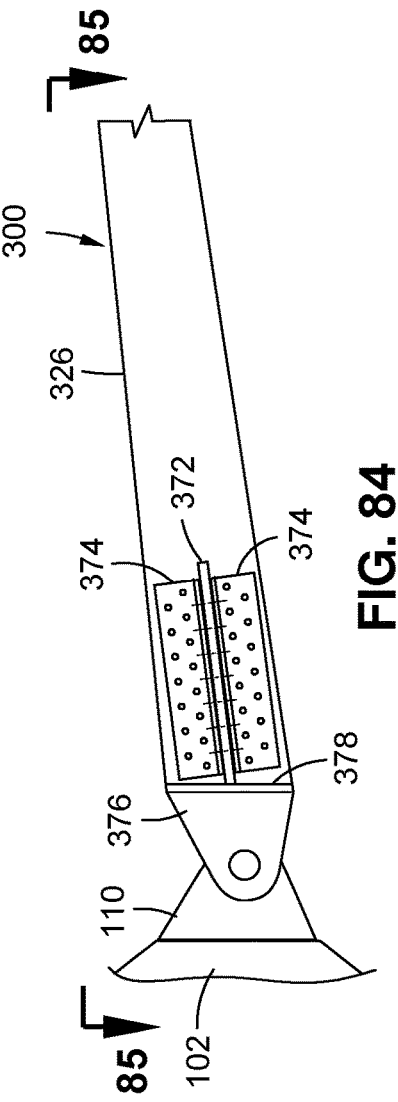

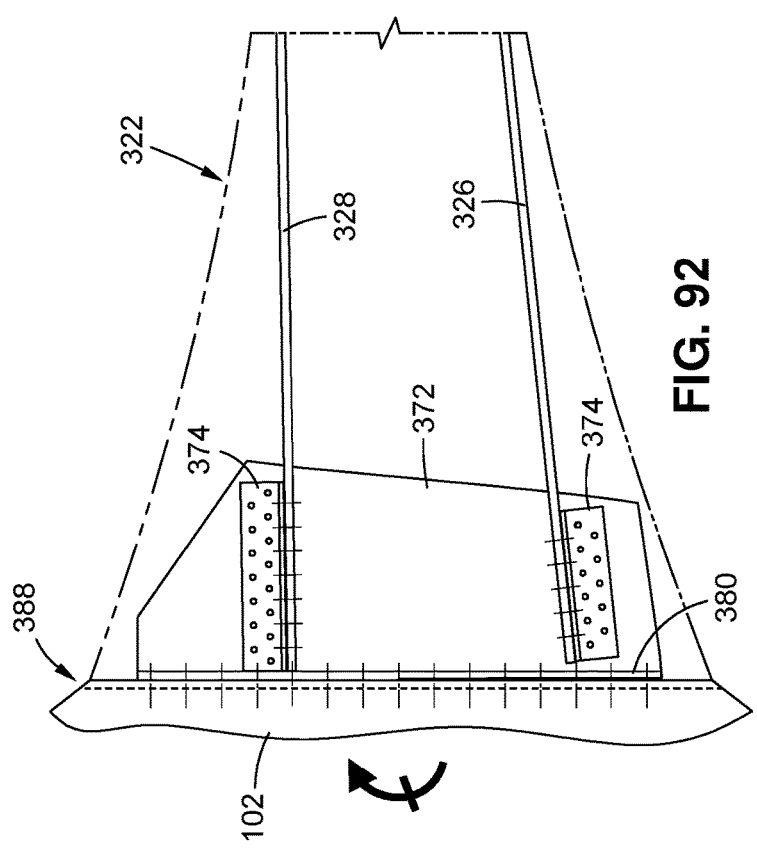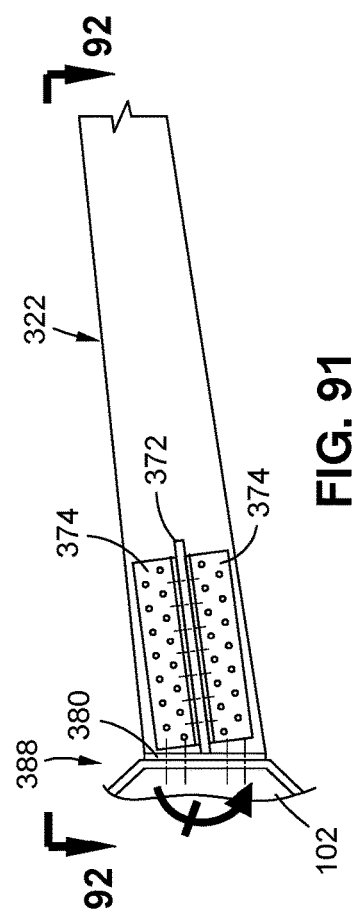

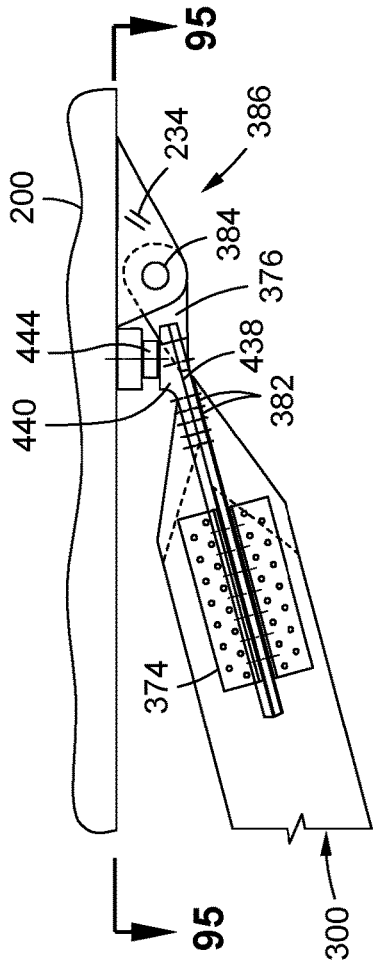
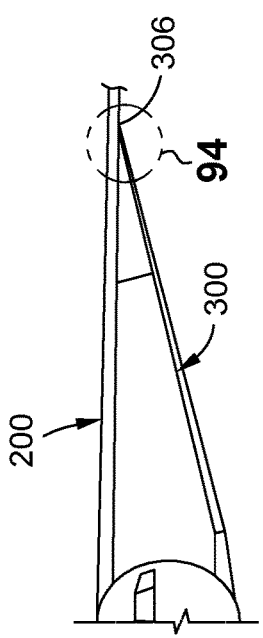
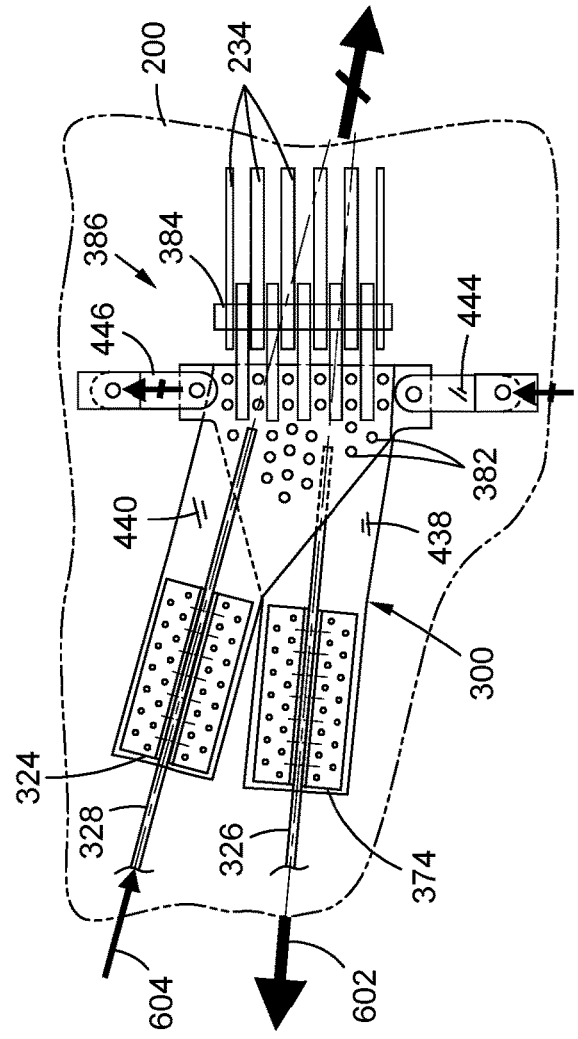
FIG. 93
FIG. 94
FIG. 95

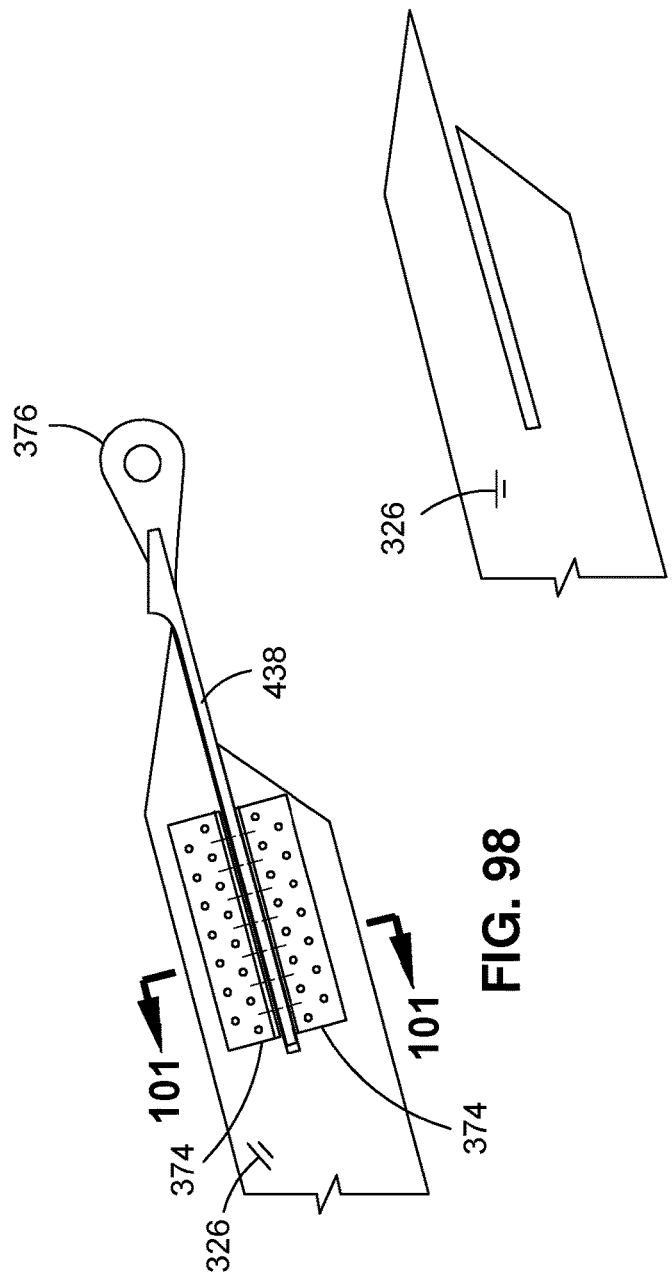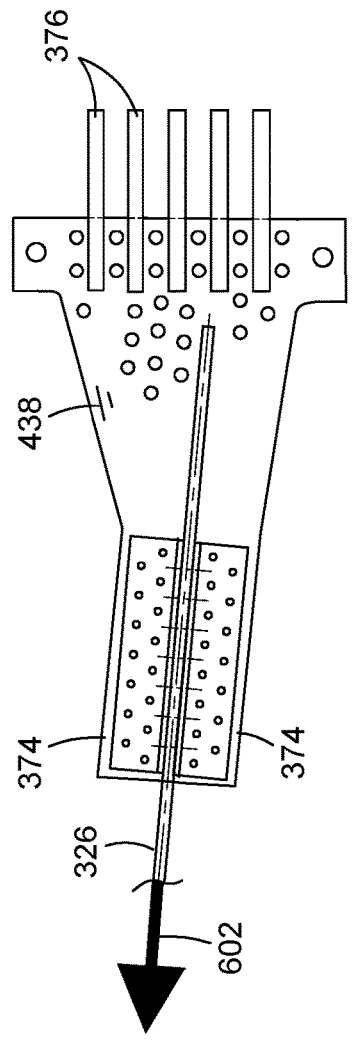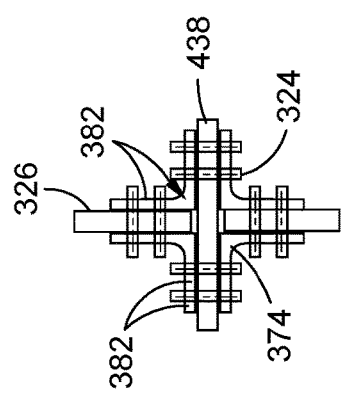

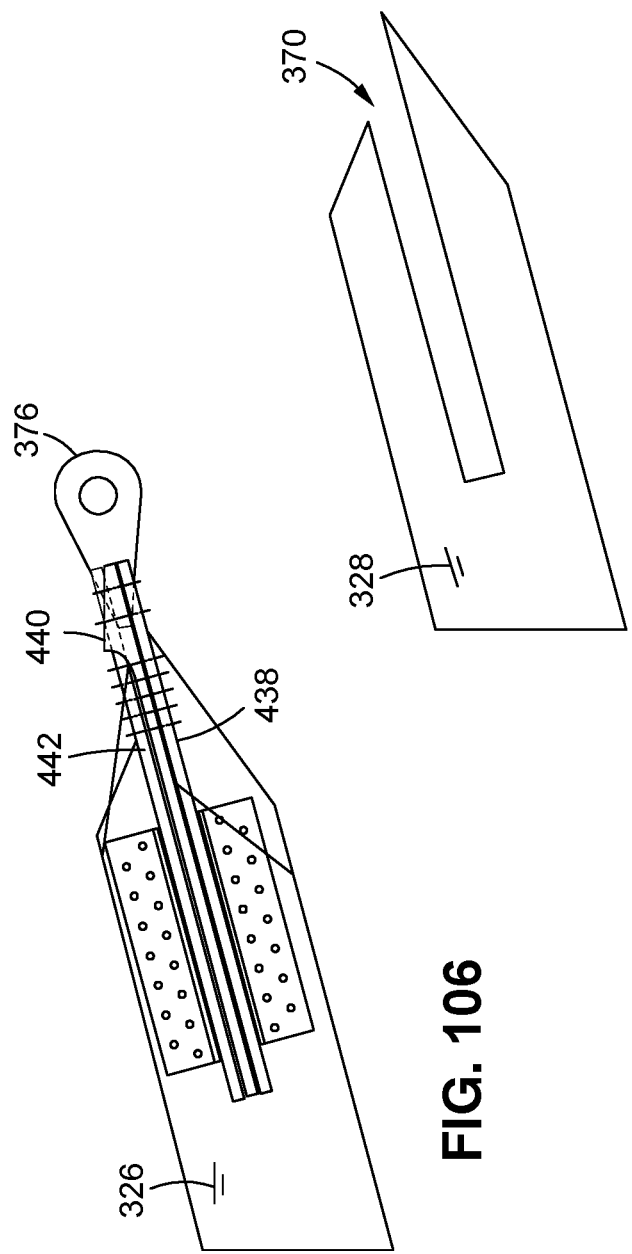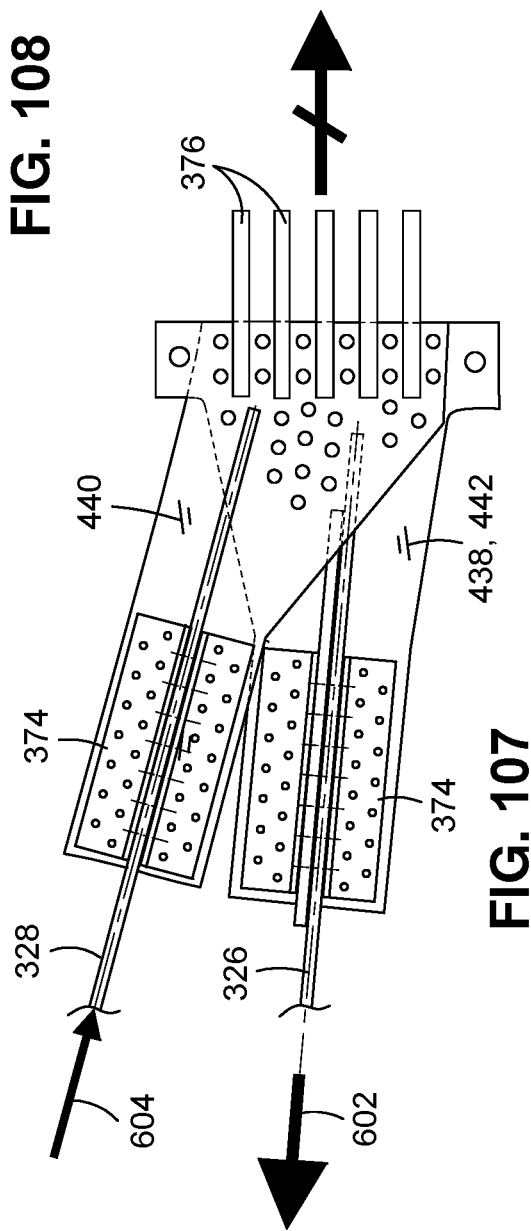

STRUCTURAL ARRANGEMENT AND METHOD FOR COUNTERACTING A VERTICAL MOMENT OF A STRUT-BRACED WING

FIELD

The present disclosure relates generally to aircraft structures and, more particularly, to a structural arrangement for counteracting a vertical moment generated by a strut-braced wing.

BACKGROUND

The use of struts to support the wings of an aircraft can significantly reduce the spanwise bending moment in the wings. Struts are typically attached to a lower portion of the fuselage, and extend up to the wings at an angle. Aircraft that operate at high cruise speeds typically have swept wings to reduce shock waves and wave drag. The aerodynamic performance of an aircraft can be improved by increasing the aspect ratio of the wings.

When struts are implemented on a swept-wing aircraft with high-aspect-ratio wings, the strut-fuselage joint (where the strut attaches to the fuselage) is located aft of the wing-fuselage joint (where the wing attaches to the fuselage). As a result of the aft offset of the strut-fuselage joint relative to the wing-fuselage joint, the lower portion of the struts are non-overlapped by the wings when the aircraft is viewed from above. The non-stacked or non-overlapping relation of the wings and struts reduces interference drag, which significantly improves the aerodynamic performance of the aircraft.

However, the aft offset of the strut-fuselage joint results in a relatively large moment about a vertical axis on the wings and struts. More specifically, the lifting force generated by each wing is reacted by tension load in the strut that supports the wing. Due to the aft offset of the strut-fuselage joint, the tension load in the strut induces a large bending moment about the vertical axis at the wing root and strut root, referred to as a vertical moment. The large vertical moment has the undesirable effect of urging the wings to pivot in an aft direction.

As can be seen, there exists a need in the art for a structural arrangement for a strut-braced, swept-wing aircraft that is capable of counteracting a large vertical moment in a structurally efficient manner.

SUMMARY

The above-noted needs associated with structural arrangements for strut-braced, swept-wing aircraft is addressed by the present disclosure, which includes an aircraft having a fuselage, and a pair of wings. Each wing is coupled to the fuselage at a wing-fuselage joint, and is supported by a strut coupled to the fuselage at a strut-fuselage joint and coupled to the wing at a strut-wing joint. The strut-fuselage joint is located below and at least partially aft of the wing-fuselage joint. The wing generates a lifting force when air passes over the wing. The lifting force induces a vertical moment about the wing-fuselage joint due to the location of the strut-fuselage joint below and at least partially aft of the wing-fuselage joint. The wing and/or the strut has a structural arrangement configured to counteract the vertical moment.

Also disclosed is an aircraft, comprising a fuselage, a wing, and a strut. The wing is coupled to the fuselage at a wing-fuselage joint, and has a wing trailing edge. The strut is coupled to the fuselage at a strut-fuselage joint and is coupled to the wing at a strut-wing joint. The strut-fuselage joint is located below and at least partially aft of the wing-fuselage joint. The strut has a strut leading edge, a portion of which is located aft of the wing trailing edge when the aircraft is viewed from a top-down perspective. The wing generates a lifting force when air passes over the wing. The lifting force induces a vertical moment about the wing-fuselage joint due to the location of the strut-fuselage joint below and at least partially aft of the wing-fuselage joint. At least one of the wing and the strut has a structural arrangement configured to counteract the vertical moment.

Additionally, disclosed is a method of enhancing the performance of an aircraft. The method includes generating a lifting force when air passes over a wing of the aircraft. The wing is coupled to a fuselage at a wing-fuselage joint, and is supported by a strut coupled to the fuselage at a strut-fuselage joint located below and at least partially aft of the wing-fuselage joint. The method additionally includes inducing a vertical moment about the wing-fuselage joint in response to the lifting force. The method also includes counteracting the vertical moment using a structural arrangement of at least one of the wing and the strut.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 55 is a front view of one-half of the aircraft;

FIG. 56 are plots of structural weight due to wing bending moment, as a function of wing span, for a typical cantilevered wing and for a strut-based wing;

FIG. 57 is a plot of structural weight due to vertical moment, as a function of wing span;

FIG. 58 shows the cut of FIG. 56 superimposed on the plot of FIG. 57;

FIG. 60 is a schematic diagram of a strut A-frame structure;

FIG. 61 is a sectional view taken along line 61-61 of FIG. 60, showing an attach point spacing between a strut front attach point aligned with the strut front spar, and a strut rear attach point aligned with the strut rear spar;

FIG. 62 is a diagram of the strut bending moment as a function of strut length from the strut-fuselage joint to the strut-wing joint;

FIG. 63 is a schematic diagram of a strut A-frame structure in which the strut front attach point and strut rear attach point are located respectively forward and aft of the strut inboard ends of the strut front spar and the strut rear spar;

FIG. 64 is a sectional view taken along line 64-64 of FIG. 63, showing the increased attach point spacing between the strut front attach point and the strut rear attach point;

FIG. 65 is a schematic diagram of an example of a strut having a kink in the strut front spar and the strut rear spar as a means to increase the attach point spacing between the strut front attach point and the strut rear attach point;

FIG. 66 is a sectional view taken along line 66-66 of FIG. 65, showing a kink plate interconnecting a strut spar inboard section of each of the strut front spar and the strut rear spar;

FIG. 67 is a schematic diagram of an example of a strut having a strut leading edge and a strut trailing edge defining the strut leading edge and the strut trailing edge of the strut;

FIG. 68 is a sectional view taken along line 68-68 of FIG. 67, showing the strut leading edge member and the strut trailing edge member for counteracting the vertical moment at the strut-fuselage joint;

FIG. 72 is a schematic diagram of an example of a strut having a strut front fitting and a strut rear fitting for increasing the attach point spacing between the strut front attach point and the strut rear attach point;

FIG. 73 is a sectional view taken along line 73-73 of FIG. 72, and illustrating the strut front fitting and the strut rear fitting respectively coupled to the strut front spar and the strut rear spar;

FIG. 74 is a schematic diagram of an example of a strut having skin stiffeners coupled to a strut upper skin panel and a strut lower skin panel;

FIG. 75 is a sectional view taken along line 75-75 of FIG. 74, and showing the strut front fitting and the strut rear fitting respectively coupled to the spar web of the strut front spar and the strut rear spar;

FIG. 76 is a magnified view of the portion of the strut identified by reference numeral 76 of FIG. 72, illustrating an example of the strut front fitting nested within an upper cap, a lower cap, and a spar web of the strut front spar;

FIG. 84 is a magnified view of the portion of the pinned joint identified by reference numeral 84 of FIG. 81, and illustrating a plurality of strut lugs rotatably coupled to a plurality of fuselage lugs via pins at the strut-fuselage joint;

FIG. 85 is a top view of the strut-fuselage joint of FIG. 84;

FIG. 91 is a magnified view of the portion of the fixed joint identified by reference numeral 91 of FIG. 83, and illustrating a plurality of mechanical fasteners coupling a strut end plate to the fuselage;

FIG. 92 is a top view of the fixed joint of FIG. 91 illustrating the reaction moment at the strut-fuselage joint;

FIG. 93 is a front view of an example of the aircraft having a jury strut extending between the strut and the wing proximate the strut-wing joint;

FIG. 94 is a magnified view of the portion of the strut-wing joint of FIG. 93, and illustrating a pinned connection coupling strut lugs of the strut to the wing lugs of the wing;

FIG. 95 is a top-down view taken along line 95-95 of FIG. 94, and illustrating the strut-wing joint comprising a plurality of strut lugs coupled to a front spar plate and a rear spar plate respectively of the strut front spar and the strut rear spar;

FIG. 98 is a front view of the front spar plate coupled to the strut front spar via angle brackets;

FIG. 99 is a top-down view of the front spar plate and the strut front spar;

FIG. 100 is a front view of the strut front spar having a spar slot for receiving the front spar plate;

FIG. 101 is a sectional view taken along line 101-101 of FIG. 97, illustrating the coupling of the front spar plate to the strut front spar via angle brackets;

FIG. 106 is a front view of an example of the strut-wing joint having a spar plate doubler for distributing the axial load from the strut front spar and strut rear spar respectively to the front spar plate and the rear spar plate;

FIG. 107 is a top view of the strut-wing joint of FIG. 106;

FIG. 108 is a front view of the strut front spar having a spar slot for receiving the spar doubler plate of FIG. 106;

DETAILED DESCRIPTION

Figure 1:
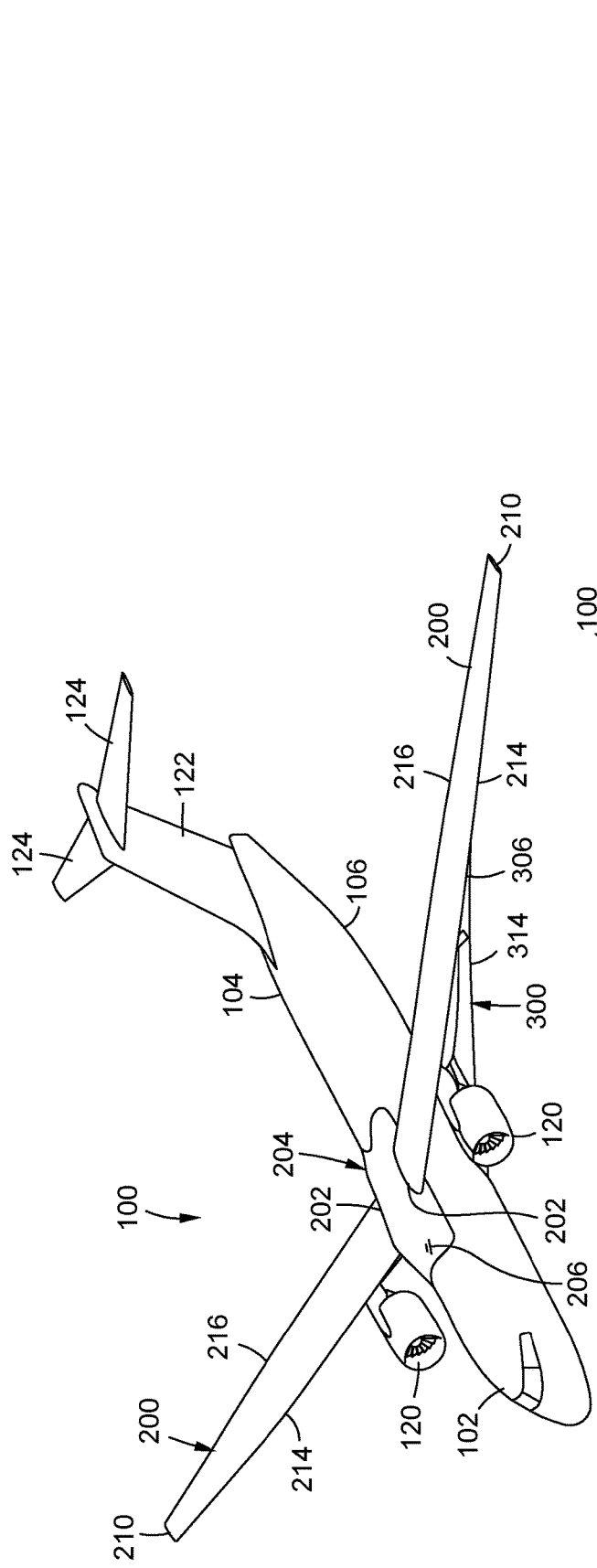
FIG. 1 is a top perspective view of an example of a strut-braced, swept-wing aircraft.
Figure 2:
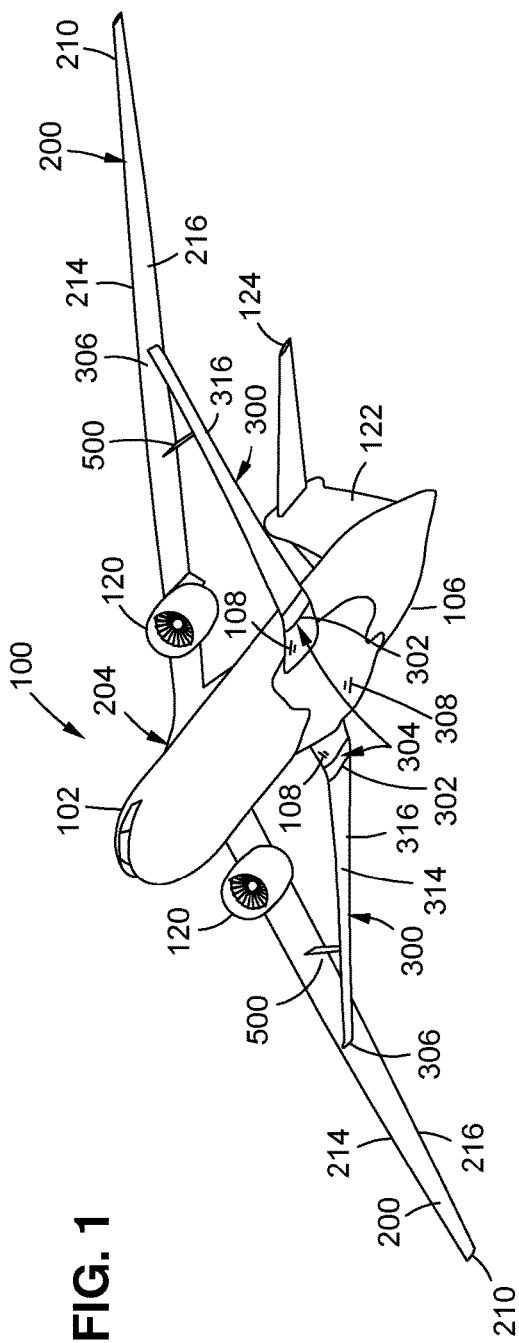
FIG. 2 is a bottom perspective view of the aircraft of FIG. 1.
Figure 3:
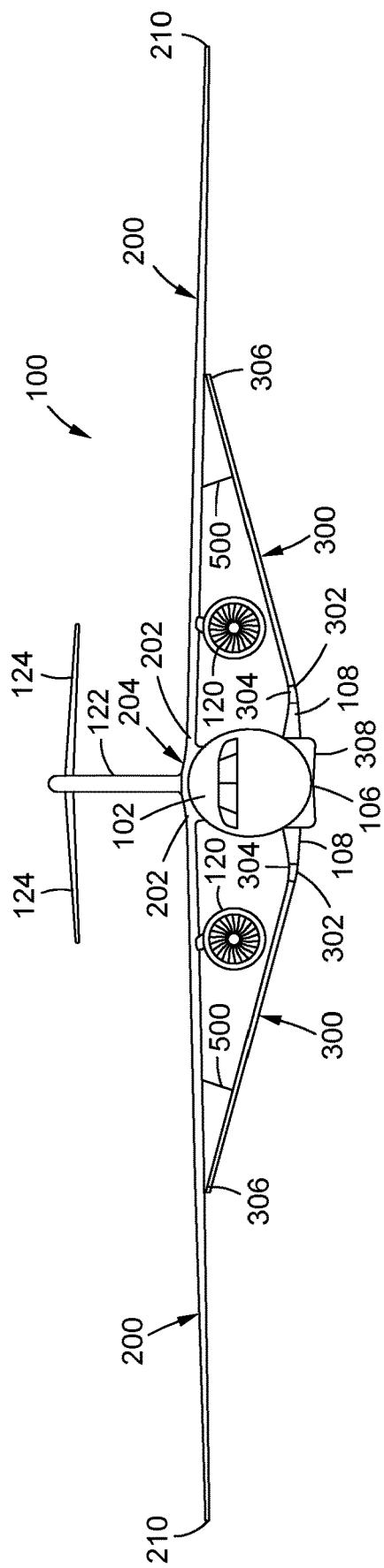
FIG. 3 is a front view of the aircraft of FIG. 1.

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Referring now to the drawings which illustrate preferred and various examples of the disclosure, shown in FIGS. 1-6 is a strut-braced, high-wing aircraft 100. The aircraft 100 has a fuselage 102 having a fuselage upper portion 104 and a fuselage lower portion 106. The fuselage 102 has a nose and a tail section, and a longitudinal axis 126 (FIG. 4) extending between the nose and the tail section. In the example shown, the tail section includes a vertical tail 122 and a pair of horizontal tails 124 mounted on top of the vertical tail 122. However, the vertical tail 122 and horizontal tails 124 may be arranged in alternative configurations.

Figure 4:
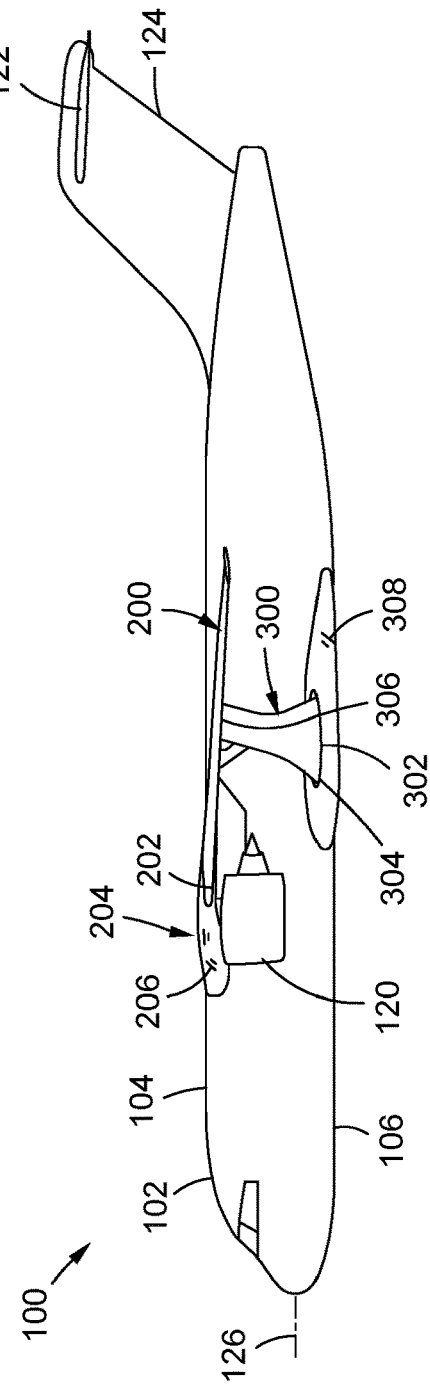
FIG. 4 is a side view of the aircraft of FIG. 1.

The aircraft 100 includes a pair of wings 200, and a pair of engines 120 suspended from the wings 200. However, the engines may be mounted at alternative locations on the aircraft 100. For example, the engines 120 may be mounted on the fuselage 102, such as on an aft portion (not shown) of the fuselage 102. Each wing 200 has a wing leading edge 214, a wing trailing edge 216, a wing root 202, and a wingtip 210. The wingspan of the aircraft 100 is measured between the wingtips 210. Each wing root 202 is coupled to the fuselage 102 at a wing-fuselage joint 204 at the fuselage upper portion 104. In the example shown, the wing-fuselage joint 204 for each wing 200 is covered by a wing root fairing 206. Each wing 200 is swept aftwardly, and each wing 200 is a high-aspect-ratio wing, having a relatively long span and a relatively short chord. In the example shown, each wing 200 is swept at an angle of up to 25 degrees relative to a lateral axis (not shown), which is perpendicular to the longitudinal axis 126 (FIG. 4). In other examples, each wing 200 may be swept at an angle of between 10-25 degrees.

Figure 5:
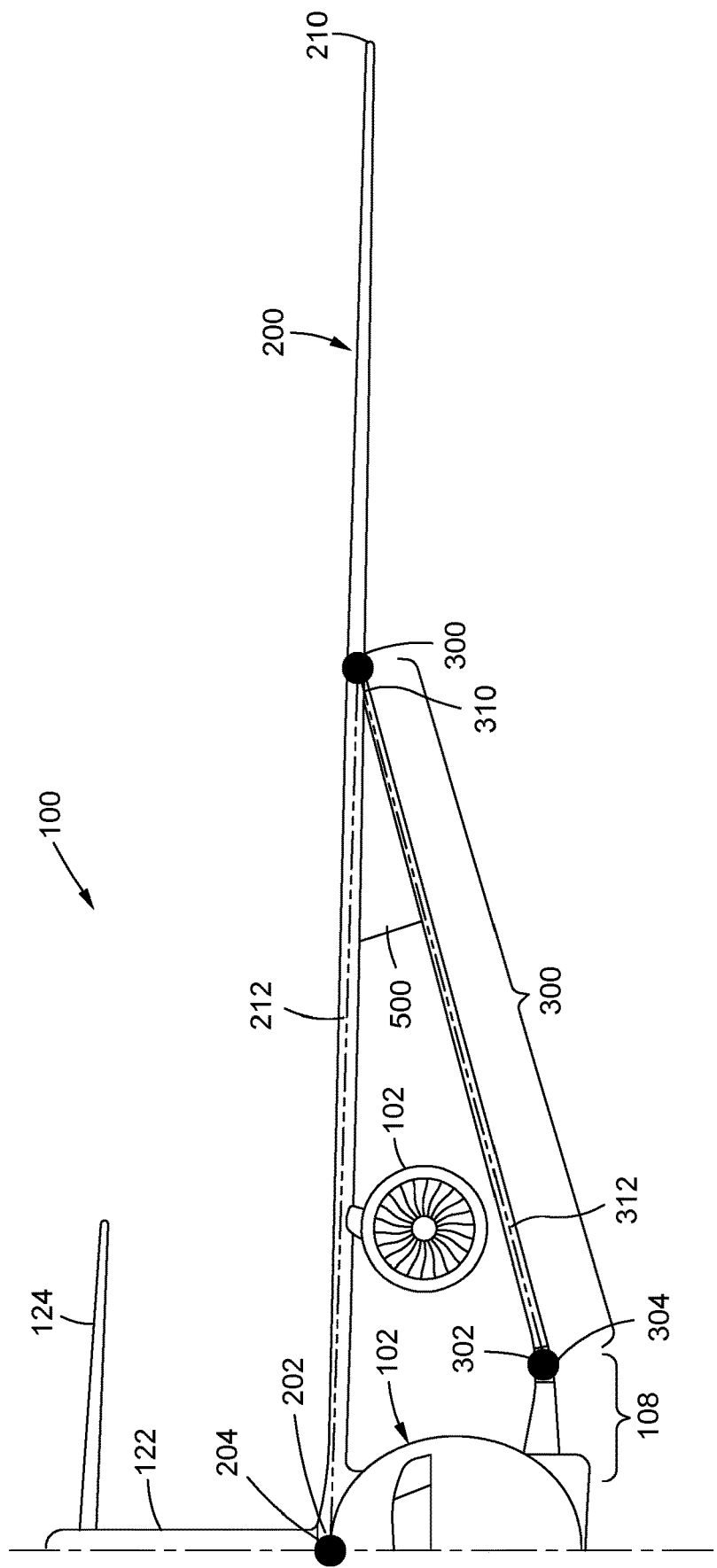
FIG. 5 is a front view of one-half of the aircraft of FIG. 1, illustrating a wing of the aircraft coupled to the fuselage at a wing-fuselage joint, and further illustrating a strut coupled to the fuselage at a strut-fuselage joint, and coupled to the wing at a strut-wing joint.

In FIG. 5, each wing 200 has less than 10 degrees of anhedral, such that each wing 200 is slightly downwardly angled. However, in other examples, the wings 200 may have no anhedral, or the wings 200 may have dihedral, wherein the wings 200 are angled upwardly. In the example shown, the aircraft 100 is configured for transonic airspeeds, wherein the aircraft 100 may have a free stream Mach number of between 0.7-1.0. However, the presently-disclosed structural arrangements may be implemented on aircraft configured for subsonic speeds, and/or on aircraft configured for supersonic speeds.

Referring still to FIGS. 1-6, on each side of the aircraft 100 is a strut 300. Each strut 300 has a strut leading edge 314, a strut trailing edge 316, a strut root 302, and a strut outboard end 310. The strut root 302 is coupled to the fuselage 102 at a strut-fuselage joint 304 at the fuselage lower portion 106. In the example shown, the aircraft 100 includes a fuselage stub 108 protruding laterally from each side of the fuselage 102. The strut root 302 is coupled to the fuselage stub 108 at the strut-fuselage joint 304. The strut-fuselage joint 304 is covered by a strut root fairing 308.

Each strut 300 extends at an upward angle from the strut-fuselage joint 304, and is coupled to the wing 200 at a strut-wing joint 306. Although not shown, the strut-wing joint 306 may be covered by a strut-wing-joint fairing. In the example shown, each strut-wing joint 306 is located at a distance of 40-70 percent of the distance from the wing root 202 to the wingtip 210.

Figure 6:
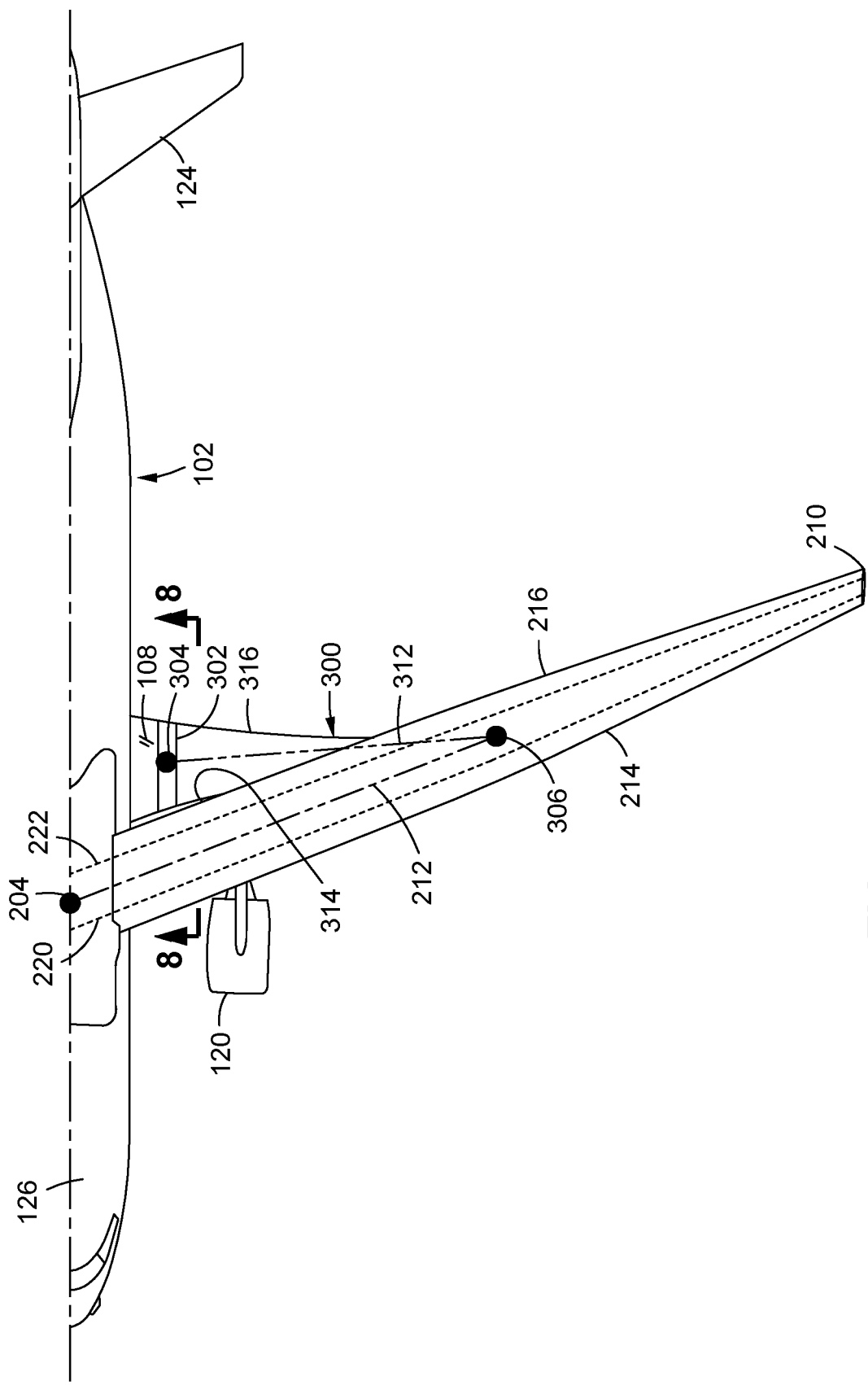
FIG. 6 is a top view of the aircraft of FIG. 5, and illustrating the strut-fuselage joint located aft of the wing-fuselage joint.
Figure 8:
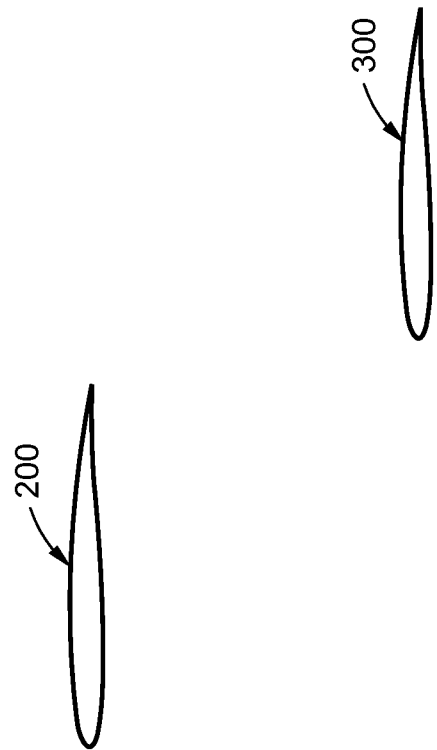
FIG. 8 is a diagrammatic sectional view taken along line 8-8 of FIG. 6, and illustrating an unstacked configuration of a wing and strut.
Figure 7:
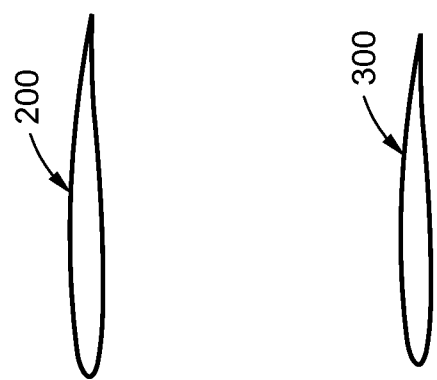
FIG. 7 is a diagrammatic sectional view of a vertically stacked configuration of a wing and a strut.
Figure 12:
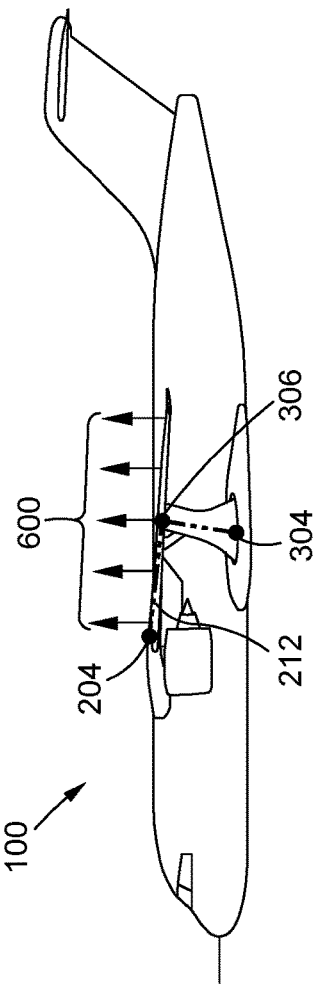
FIG. 12 is a side view of the aircraft of FIG. 9.

Notably, each strut-fuselage joint 304 is located at least partially aft of the wing-fuselage joint 204 when the aircraft 100 is viewed from the side, as shown in FIG. 12, or when viewed from the top, as shown in FIG. 6. When viewed from a top-down perspective (e.g., FIG. 6 or 10), the wing 200 and the strut 300 may be described as having a vertically unstacked arrangement, as opposed to a stacked arrangement (not shown) in which the wing 200 is vertically stacked directly above the strut 300. FIG. 7 is a schematic sectional view of an example of a wing 200 and a strut 300 in a vertically stacked arrangement. FIG. 8 is a schematic sectional view taken along line 8-8 of FIG. 6, illustrating an unstacked arrangement of the wing 200 and strut 300. As a result of the unstacked arrangement, when the aircraft 100 is viewed from a top-down perspective, at least a portion of the strut leading edge 314 is aft of the wing trailing edge 216. More specifically, at locations proximate the strut root 302, the strut leading edge 314 is located aft of the wing trailing edge 216. In the present disclosure, the strut-fuselage joint 304 is defined as being located aft of the wing-fuselage joint 204 if the strut leading edge 314 at the strut root 302 is located aft of the wing front spar 220 at the wing root 202, although the aerodynamics are unfavorable if the strut leading edge 314 is located forward of the wing trailing edge 216.

Advantageously, the unstacked arrangement of the wing-fuselage joint 204 and the strut-fuselage joint 304 allows each strut 300 (at least an inboard portion of the strut 300—e.g., FIG. 6) to contribute to lift and thereby enhance aircraft performance, while reducing loading on the wing 200. In contrast, for a vertically stacked arrangement (not shown) of the wing-fuselage joint 204 and strut-fuselage joint 304, low-pressure flow coming off each strut 300 acts on the underside of the wing 200, reducing pressure and diminishing the lift contribution of the wing 200. An additional benefit of the unstacked arrangement is a reduction in drag that would otherwise occur in the stacked arrangement due to strong shocks from high local flow Mach numbers caused by flow interference between the strut 300 and the wing 200.

Referring to FIGS. 9-12, shown respectively are perspective, top, front, and side views of a portion (e.g., one-half) of the aircraft 100 of FIGS. 1-6. Shown in each view is a wing axis 212 extending between the wing-fuselage joint 204 and the strut-wing joint 306. Also shown is a strut axis 312 extending between the strut-fuselage joint 304 and the strut-wing joint 306. The wing 200 generates a lifting force 600, which is distributed along the wingspan. The lifting force 600 is the vertical force supporting the mass of the aircraft 100 during flight, and is generated by the wing 200 when air passes over the wing 200.

Figure 14:
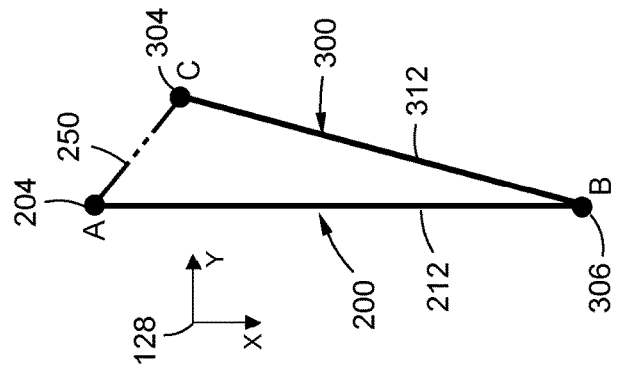
FIG. 14 is a schematic diagram of the wing and the strut in the same orientation as the top view of FIG. 10.
Figure 16:
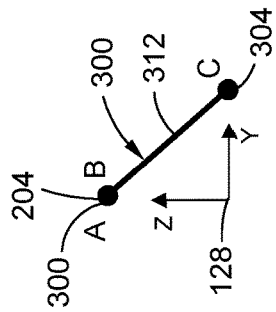
FIG. 16 is a schematic diagram of the wing and the strut in the same orientation as the side view of FIG. 12.
Figure 13:
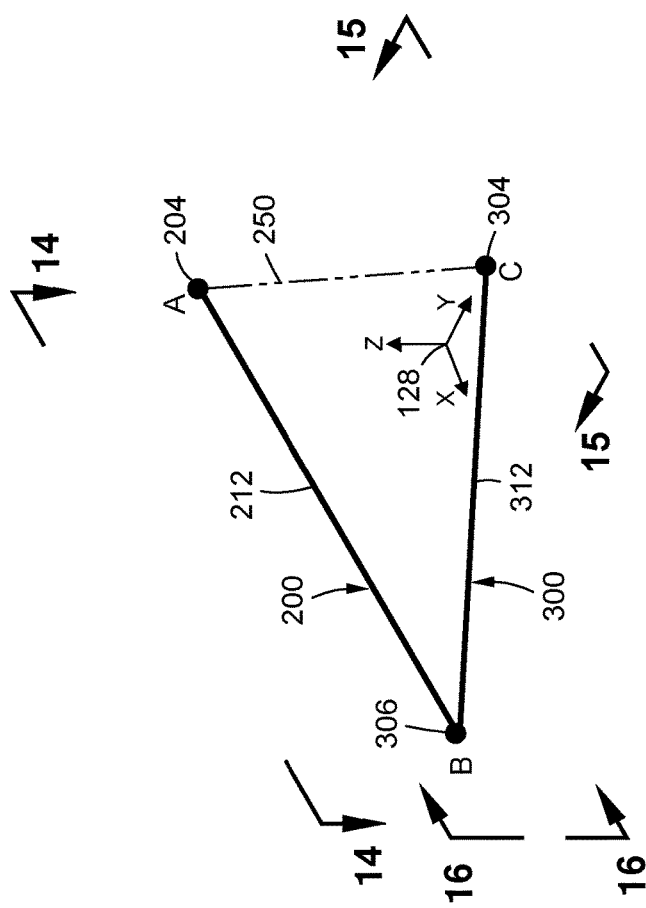
FIG. 13 is a schematic diagram of the wing and the strut in the same orientation as the top-aft perspective view of FIG. 9.
Figure 15:
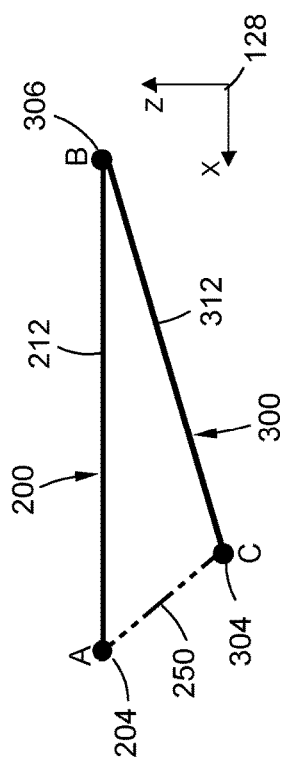
FIG. 15 is a schematic diagram of the wing and the strut in the same orientation as the front view of FIG. 11.

Referring to FIGS. 13-15, shown are schematic diagrams respectively corresponding to FIGS. 9-12. FIGS. 13-15 schematically illustrate the wing 200 and the wing axis 212, and the strut 300 and the strut axis 312. Also shown in FIGS. 13-15 and subsequent schematic diagrams is a reference coordinate system 128, to aid in identifying the orientation of each drawing figure. In addition, the wing-fuselage joint 204 is identified by reference character A, the strut-wing joint 306 is identified by reference character B, and the strut-fuselage joint 304 is identified by reference character C. Furthermore, shown is wing-joint/strut-joint axis 250 extending the wing-fuselage joint 204 and the strut-fuselage joint 304.

Figure 9:
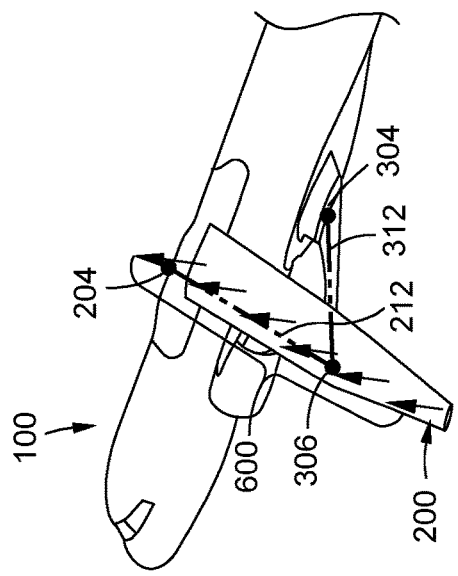
FIG. 9 is a top-aft perspective view of a portion of the aircraft of FIG. 6, and illustrating a wing axis extending from the wing-fuselage joint to the strut-wing joint, and a strut axis extending from the strut-fuselage joint to the strut-wing joint, and further illustrating a distributed air pressure representative of lifting force generated by the wing.
Figure 11:
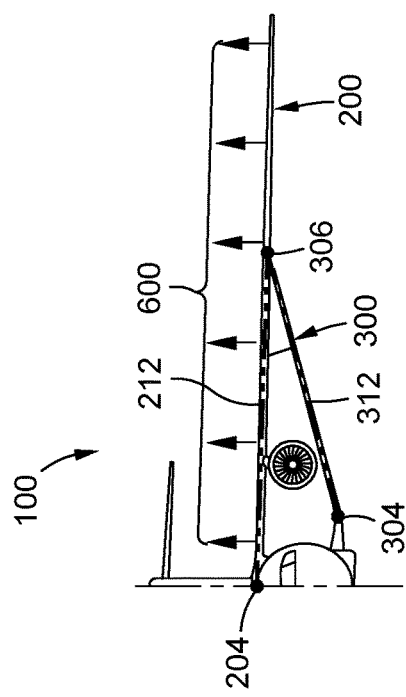
FIG. 11 is a front view of the aircraft of FIG. 9
Figure 18:
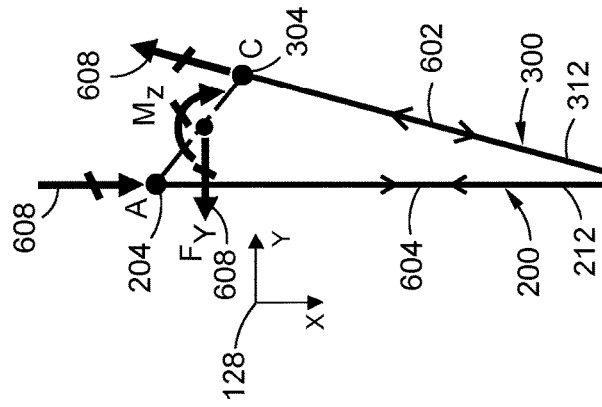
FIG. 18 is a schematic diagram of the wing and the strut of FIG. 14, and showing the reaction forces and the vertical moment of FIG. 17.
Figure 20:
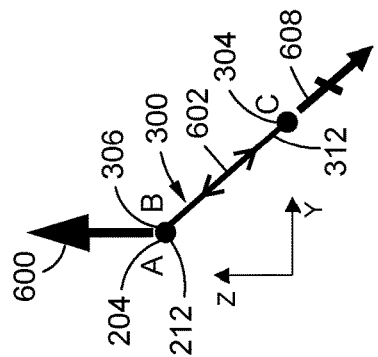
FIG. 20 is a schematic diagram of the wing and the strut of FIG. 60, and showing the reaction forces and the vertical moment of FIG. 17.
Figure 17:
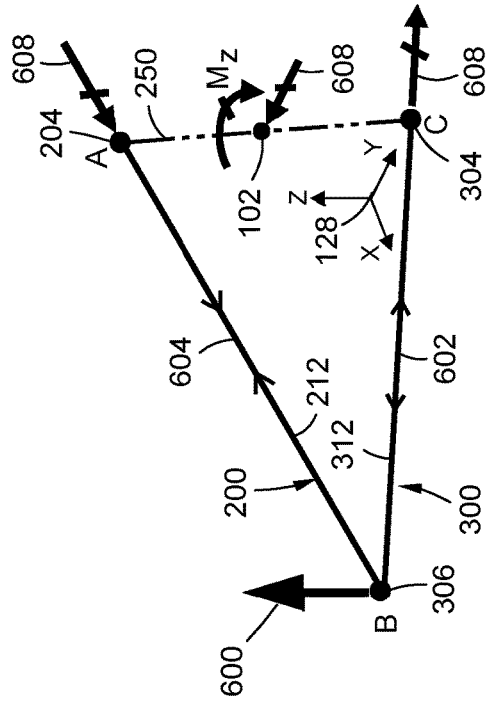
FIG. 17 is a schematic diagram of the wing and the strut of FIG. 9, and showing a vertical load vector at the strut-wing joint representing the above-mentioned vertical lifting force distributed over the wing (e.g., FIG. 9), and also showing reactions respectively at the wing-fuselage joint and the strut-fuselage joint, and further showing a vertical moment resulting from the lifting force about the wing-fuselage joint due to the location of the strut-fuselage joint aft of the wing-fuselage joint.
Figure 19:
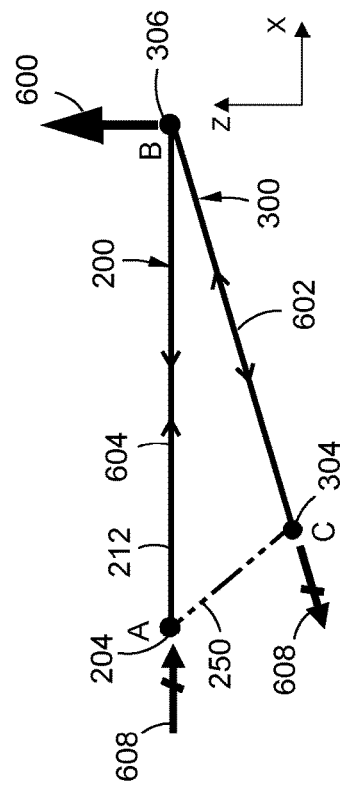
FIG. 19 is a schematic diagram of the wing and the strut of FIG. 15, and showing the reaction forces and the vertical moment of FIG. 17.

Referring to FIGS. 17-20, shown are schematic diagrams respectively similar to FIGS. 13-16, but without the aircraft 100. FIGS. 17, 19 and 20 schematically illustrate the lifting force 600 applied to the strut-wing joint 306. The lifting force 600 is shown as a vertical load vector at the strut-wing joint 306, and represents the typical summation of spanwise distribution of lift along the wingspan that is carried by the strut 300, as shown in FIGS. 9, 11 and 12. A typically smaller portion of the wing spanwise distribution of lift is also transmitted by the wing 200 to the wing-fuselage joint 204, and which does not contribute to a vertical moment $M_z$ caused by the unstacked arrangement of the wing 200 and strut 300.

As described herein, the vertical moment $M_z$ is due to the aft offset of the strut-fuselage joint relative to the wing-fuselage joint 204, and is a relatively large moment about a substantially vertical axis on the wings 200 and struts 300. As mentioned above, the lifting force generated by each wing 200 is reacted by tension load in the strut 300 that supports the wing 200. Due to the aft offset of the strut-fuselage joint, the tension load in the strut 300 induces the vertical moment $M_z$ about a substantially vertical axis (i.e., parallel to the Z axis of the reference court system 128) at the wing root 202 and strut root 302. Also shown in FIGS. 17-20 are reaction forces 608 at the wing-fuselage joint 204 and at the strut-fuselage joint 304, and which area also in response to the lifting force 600. As can be seen, the wing 200 is under compression load 604, and the strut 300 is under tension load. The reaction force 608 at the wing-fuselage joint 204 is compression, and the reaction force 608 at the strut-fuselage joint 304 is tension.

As mentioned above, the reaction forces 608 include the vertical moment $M_z$, which is induced by the lifting force 600 about the wing-fuselage joint 204. The vertical moment $M_z$ is due to the location of the strut-fuselage joint 304 at least partially aft of the wing-fuselage joint 204 (e.g., see FIG. 18). Stated another way, the vertical moment $M_z$ is created as a result of the non-parallel relationship between the wing axis 212 and the strut axis 312 (e.g., see FIG. 20) when the aircraft 100 is viewed from a top-down direction.

The vertical moment $M_z$ tends to urge the wing 200 to pivot about the wing root 202 in an aftward direction. The vertical moment $M_z$ is in addition to the moment (not shown) generated by engine thrust, and in addition to moment (not shown) generated by aerodynamic drag on the wing 200, the engine 120, and the strut 300, and/or in addition to yawing moments (not shown). Typically (e.g., for commercial airliners), the vertical moments resulting from engine thrust, aerodynamic drag, and yawing moments are much smaller than the vertical moment $M_z$ created by the angle between the wing 200 and the strut 300 (e.g., FIG. 18). Also shown in FIGS. 17-18 is a reaction force 608 (i.e., parallel to the Y axis of the reference court system 128) in the fore-aft direction (i.e., shear load into the fuselage 102). The reaction force 608 in the fore-aft direction is also a result of the location of the strut-fuselage joint 304 below and at least partially aft of the wing-fuselage joint 204.

In the present disclosure, the aircraft 100 is configured such that the wing 200 and/or the strut 300 on each side of the aircraft 100 has a structural arrangement configured to counteract or resist the vertical moment $M_z$. The structural arrangement of the wing 200 and/or the strut 300 prevents the vertical moment $M_z$ from pivoting the wing 200 in an aftward direction, at least to an extent causing plastic deformation of the structural members of the aircraft 100. The below discussion describes various examples of structural arrangements of the wing 200 and/or the strut 300 for counteracting the vertical moment $M_z$.

Figure 22:
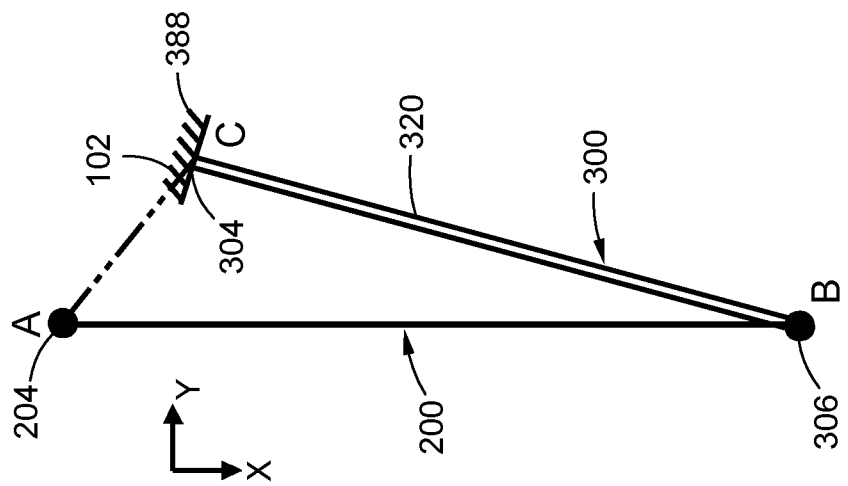
FIG. 22 is a top view schematic diagram of the wing and the strut of FIG. 21.
Figure 21:
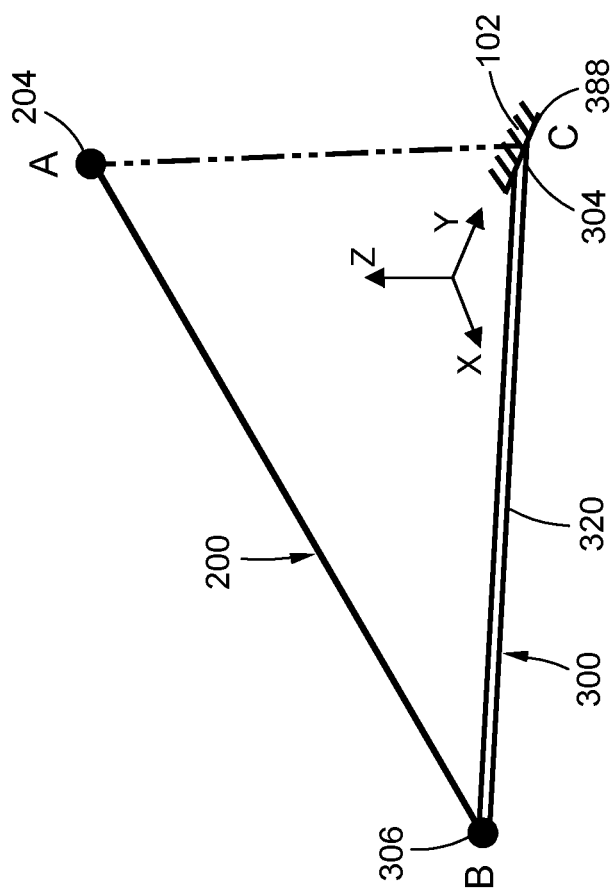
FIG. 21 is a top-aft perspective view schematic diagram of the wing and the strut, and showing the strut as a cantilevered beam fixedly coupled to the fuselage at the strut-fuselage joint.
Figure 24:
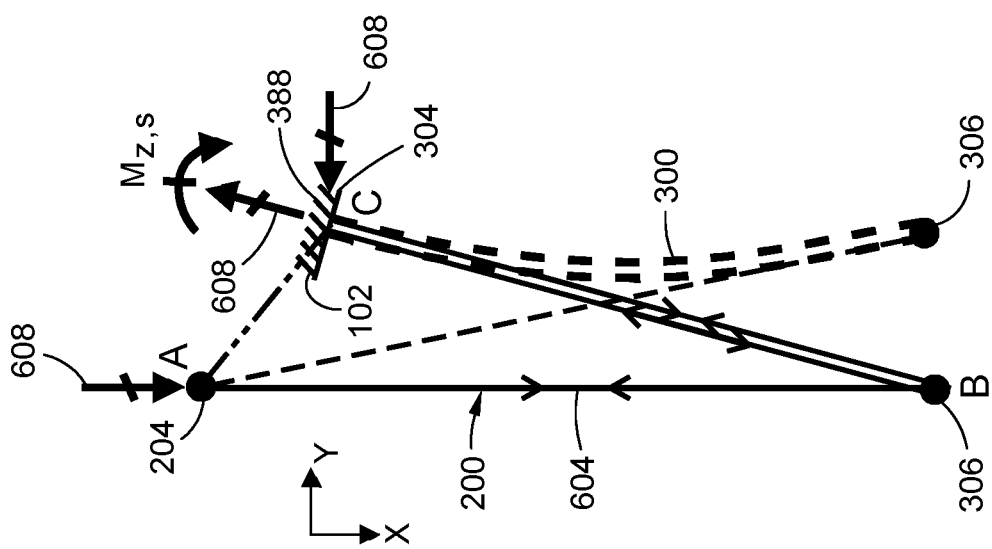
FIG. 24 is a top view schematic diagram of FIG. 23 showing the reaction forces and the vertical moment.
Figure 23:
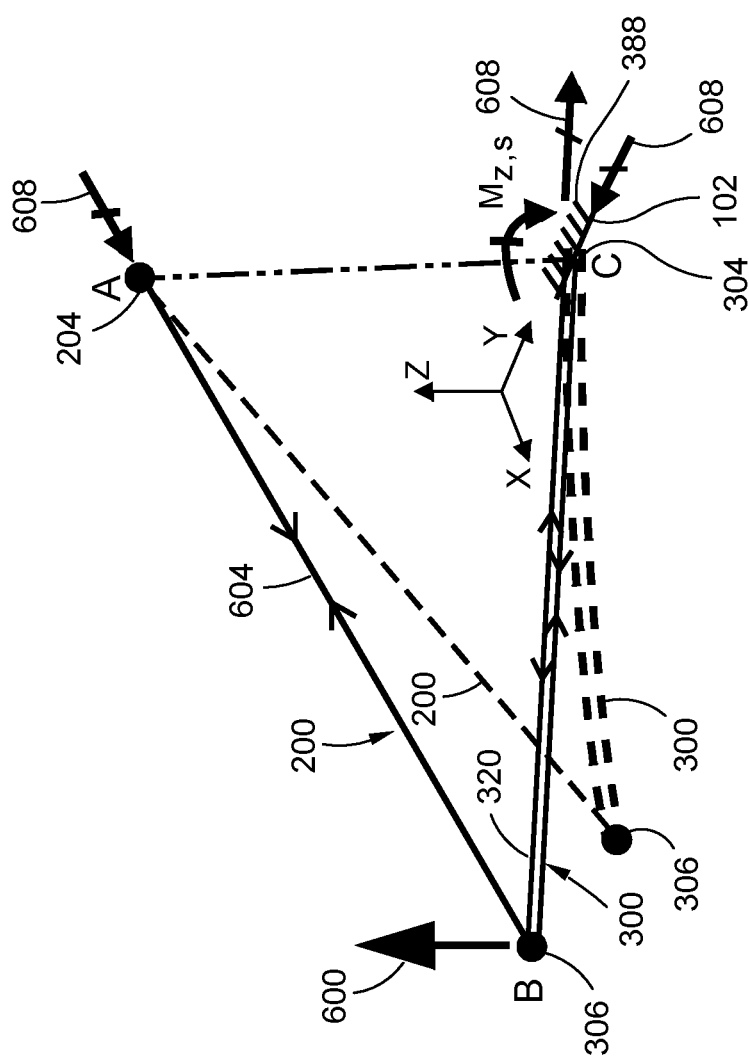
FIG. 23 is a schematic diagram of the wing and the strut of FIG. 21, and showing the vertical load vector at the strut-wing joint representing the lifting force distributed over the wing, and the reaction forces respectively at the wing-fuselage joint and the strut-fuselage joint, and the vertical moment reacted by the strut configured as a cantilevered beam.

Referring to FIGS. 21-22, shown are schematic diagrams respectively similar to FIGS. 17-18, and illustrating an example of a structural arrangement of a strut 300 configured as a cantilevered beam 320 for resisting the vertical moment $M_z$ induced by the lifting force 600. The cantilevered beam 320 of the strut 300 is non-rotatably or fixedly coupled to the fuselage 102 via a fixed joint 388 at the strut-fuselage joint 304, and is configured to carry tension and bending load to counteract the vertical moment $M_z$ induced by the lifting force 600. For the moment $M_y$ (not shown) about a horizontal axis parallel to the Y axis at the strut-fuselage joint 304, the strut 300 can be either fixedly coupled or pivotably coupled to the fuselage 102. FIGS. 23-24 show the bending (i.e., exaggerated for illustration purposes) of the cantilevered beam 320 of the strut 300 in response to the lifting force 600. Also shown is the wing 200 under compression load 604, and the reaction force 608 (i.e., pure axial load, and no bending load) at the wing-fuselage joint 204. In addition, shown is the strut 300 (i.e., the cantilevered beam 320) in bending, and the reaction force 608 at the strut-fuselage joint 304, comprising tension in combination with bending moment from the vertical moment $M_{z,s}$. Additionally, shown is a reaction force 608 in the fore-aft direction (i.e., shear load, parallel to the Y axis) at the strut-fuselage joint 304. Configuring the strut 300 as a cantilevered beam 320 for resisting the vertical moment $M_{z,s}$ may favor an arrangement in which the strut 300 has a relatively large chord at the strut root 302.

Figure 26:
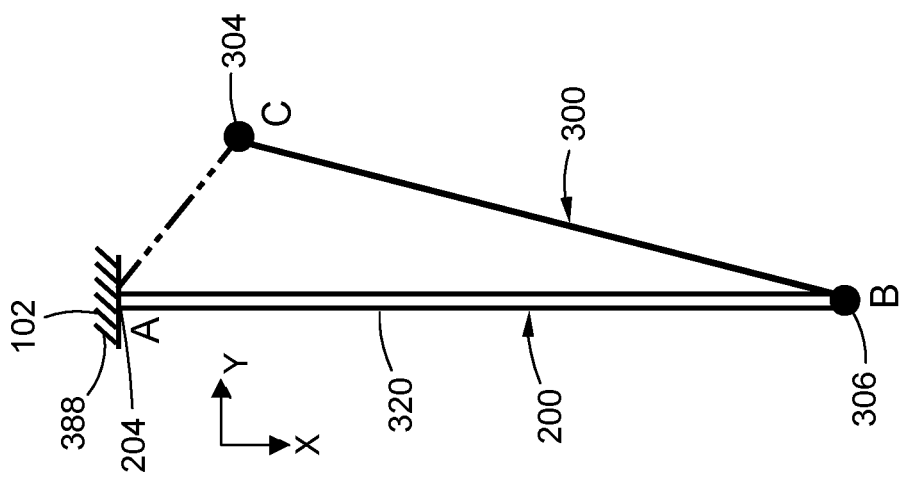
FIG. 26 is a top view schematic diagram of the wing and the strut of FIG. 25.
Figure 25:
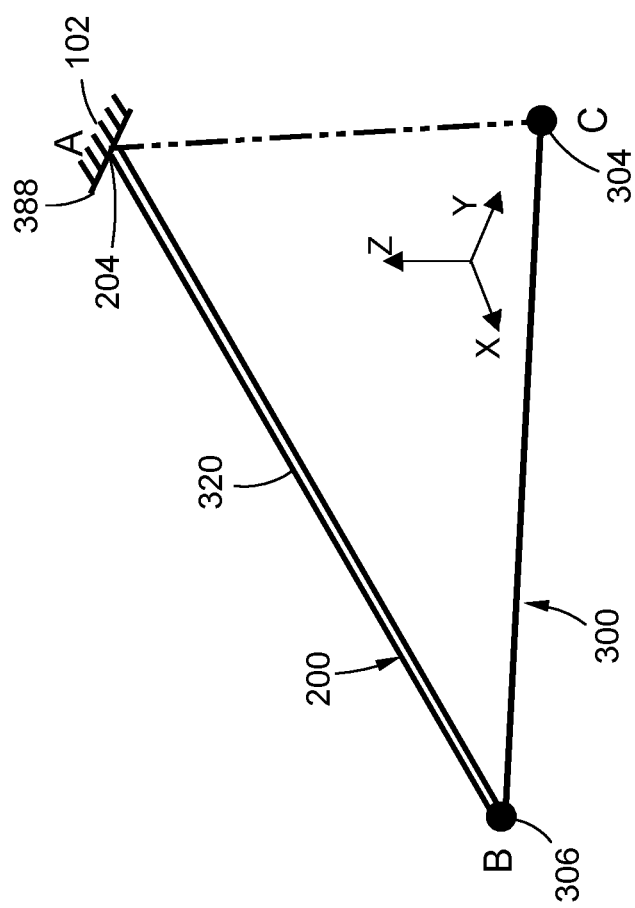
FIG. 25 is a top-aft perspective view schematic diagram of the wing and the strut, and showing the wing as a cantilevered beam fixedly coupled to the fuselage at the wing-fuselage joint.
Figure 28:
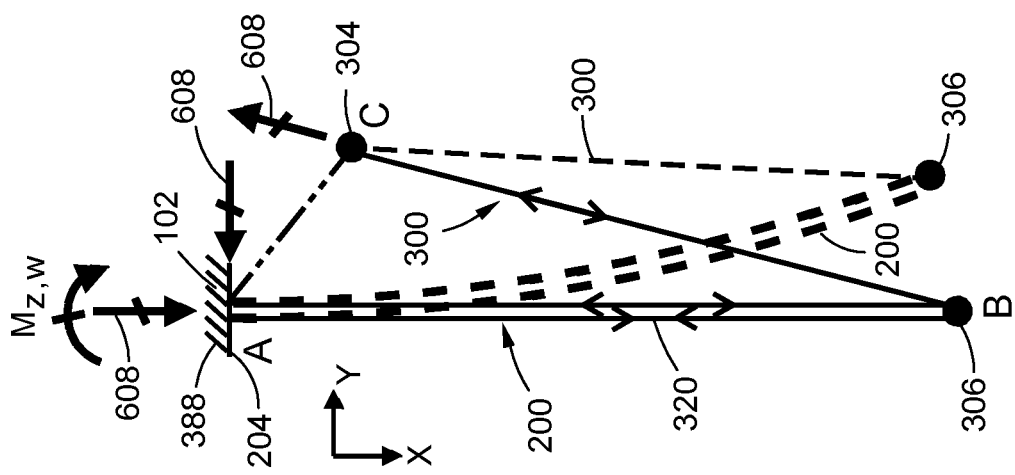
FIG. 28 is a top view schematic diagram of FIG. 27 showing the reaction forces and the vertical moment.
Figure 27:
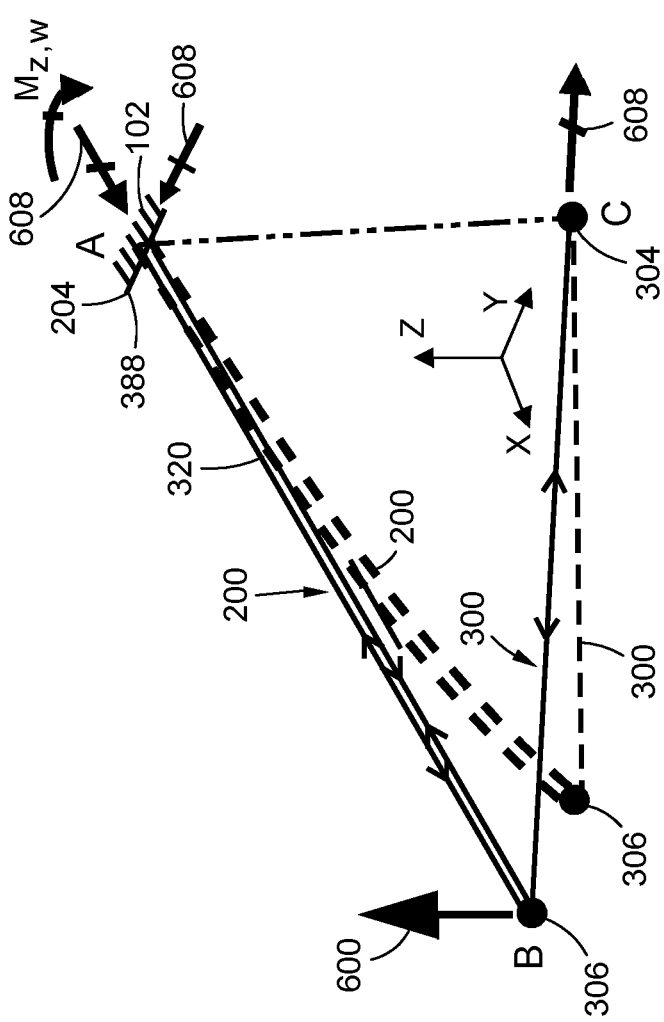
FIG. 27 is a schematic diagram of the wing and the strut of FIG. 25, and showing the lifting force at the strut-wing joint, and the reaction forces respectively at the wing-fuselage joint and the strut-fuselage joint, and the vertical moment reacted by the wing configured as a cantilevered beam.
Figure 30:
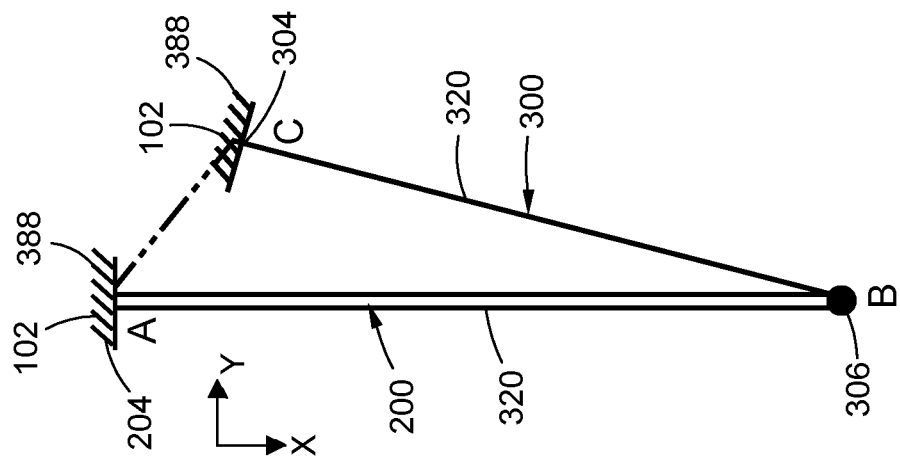
FIG. 30 is a top view schematic diagram of FIG. 29.
Figure 29:
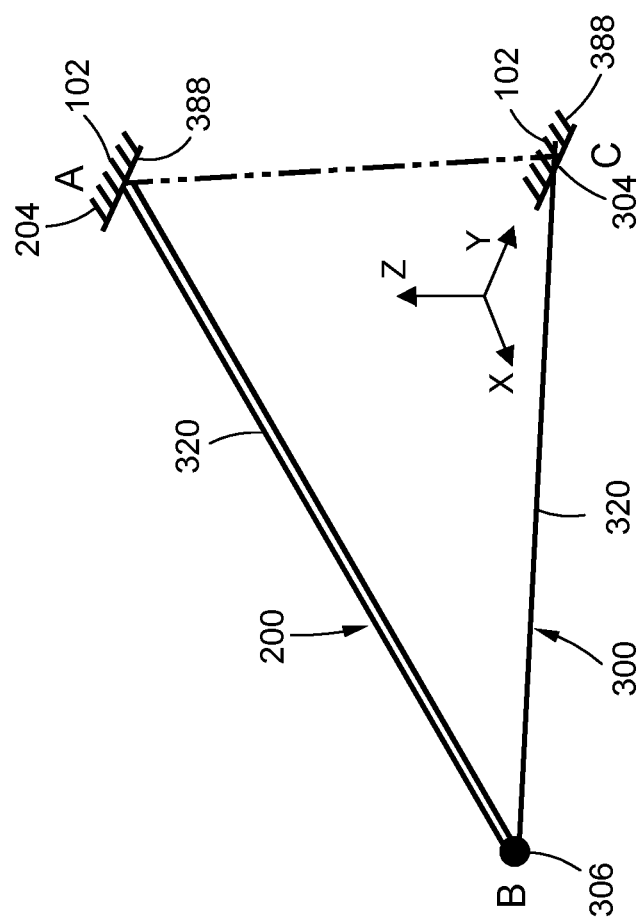
FIG. 29 is a top-aft perspective view schematic diagram of the wing and the strut showing both the wing and the strut as cantilevered beams, each fixedly coupled to the fuselage.
Figure 32:
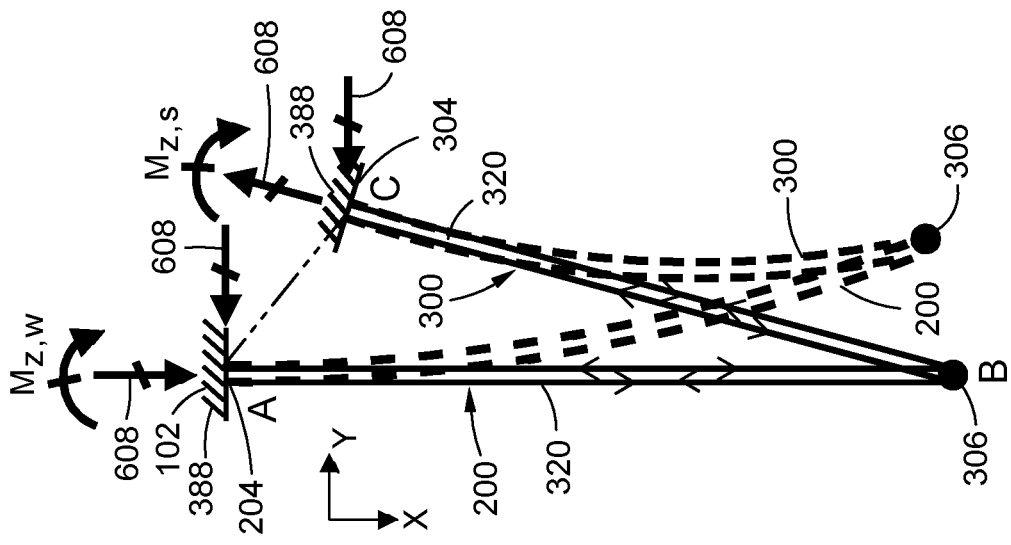
FIG. 32 is a top view diagram of FIG. 31, showing the reaction forces and the vertical moments reacted at the wing-fuselage joint and the strut-fuselage joint.
Figure 31:
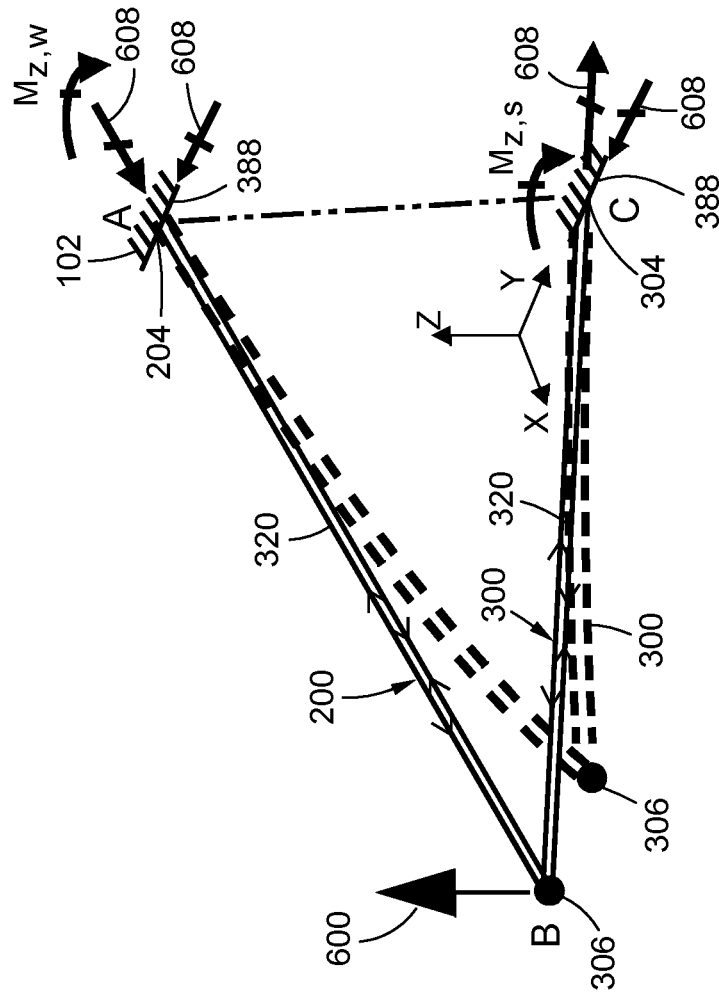
FIG. 31 is a schematic diagram of the wing and the strut of FIG. 29, and showing the vertical load vector at the strut-wing joint representing the distributed air pressure (e.g., FIG. 9) over the wing area, and additionally showing the reaction forces respectively at the wing-fuselage joint and the strut-fuselage joint, and the vertical moment resisted by the wing at the wing-fuselage joint, and the vertical moment resisted by the strut at the strut-fuselage joint.
Figure 34:
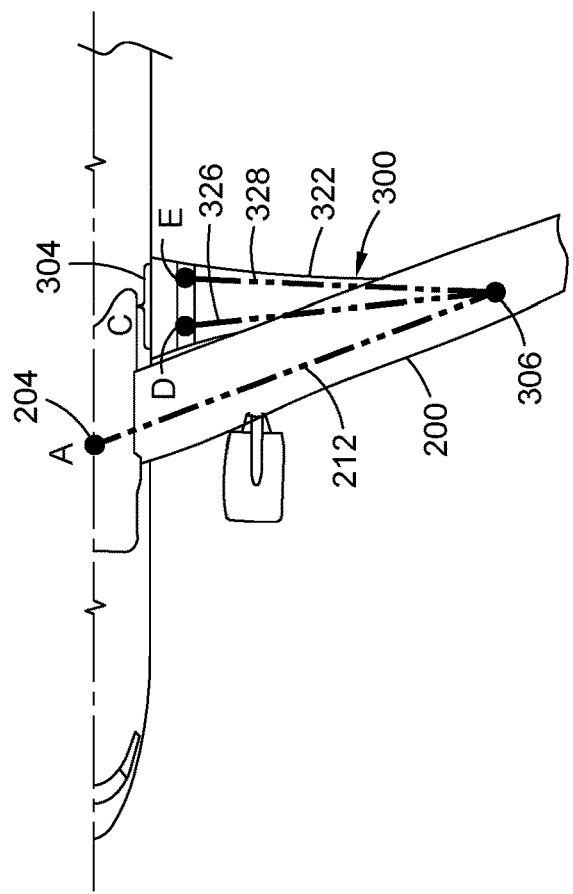
FIG. 34 is a top view of the aircraft of FIG. 33.
Figure 33:
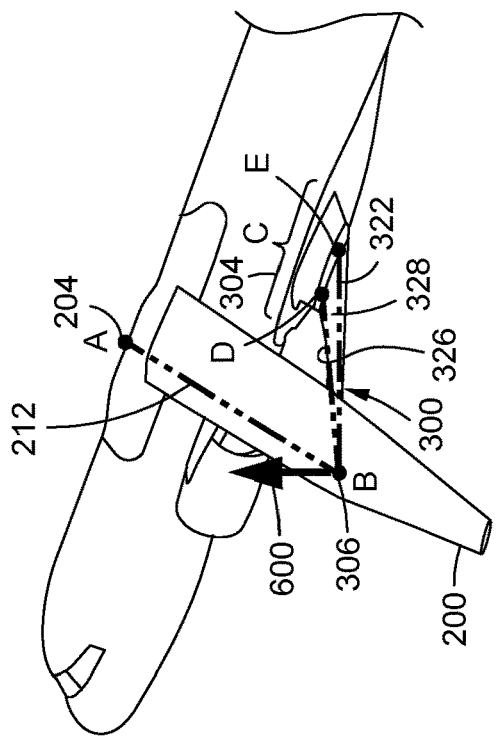
FIG. 33 is a top-aft perspective view of the aircraft, and illustrating a strut A-frame structure comprising a strut front spar and a strut rear spar, and defining a lower tetrahedral structure, and also showing the above-mentioned vertical load vector representing the lifting force distributed over the wing.
Figure 36:
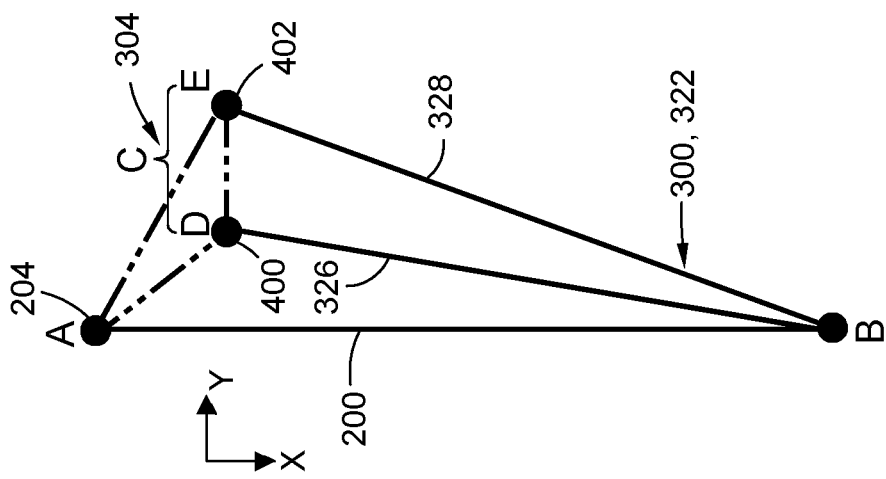
FIG. 36 is a top view schematic diagram of FIG. 35.

Referring to FIGS. 25-26, shown are schematic diagrams respectively similar to FIGS. 17-18, and illustrating an example of a structural arrangement of a wing 200 configured as a cantilevered beam 320 for resisting the vertical moment $M_z$ induced by the lifting force 600. In such an arrangement, for the vertical moment $M_{z,w}$, the cantilevered beam 320 of the wing 200 is non-rotatably or fixedly coupled via a fixed joint 388 to the fuselage 102, and is configured to carry compression and bending. FIGS. 27-28 show exaggerated bending of the cantilevered beam 320 of the wing 200 in response to the lifting force 600. The reaction forces 608 in FIGS. 27-28 are similar to the reaction forces 608 described above for FIGS. 23-24, with the exception that the wing 200 is in bending, and the strut 300 is under tension load 602. The reaction forces 608 at the strut-fuselage joint 304 comprise pure tension, and no bending load. The reaction forces 608 at the wing-fuselage joint 204 comprise compression in combination with the abovementioned vertical moment $M_{z,w}$. In addition, a reaction force 608 in the fore-aft direction (i.e., parallel to the Y axis) is induced at the wing-fuselage joint 204.

Referring to FIGS. 29-32, shown is an example of a structural arrangement in which both the wing 200 and the strut 300 are configured as cantilevered beams 320 for counteracting the vertical moment $M_z$ induced by the lifting force 600. The strut 300 and the wing 200 share in resisting the vertical moment $M_z$. More specifically, the portion of the vertical moment $M_{z,w}$ counteracted by the wing 200, in combination with the portion of the vertical moment $M_{z,s}$ counteracted by the strut 300, is equivalent to the total magnitude of the vertical moment $M_z$ for the unstacked arrangement of the wing 200 and strut 300. The loads in the wing 200 and strut 300, and the reaction forces 608 at the wing-fuselage joint 204 and the strut-fuselage joint 304, are similar to the above-described corresponding loads and reaction forces 608 in FIGS. 21-28.

In one example of the arrangement shown in FIGS. 29-32, the strut 300 is configured to counteract more than 50 percent of the vertical moment $M_z$, and the wing 200 is configured to counteract a remaining portion of the vertical moment $M_z$. The apportionment of vertical moment $M_z$ between the wing 200 and the strut 300 may be based in part on the amount of upward load on the wing 200 carried by the strut 300. In this regard, the relative stiffness (i.e., in the horizontal direction) of the wing 200 and the strut 300 measured at the strut-wing joint 306 may dictate the distribution of the vertical moment $M_z$. In one example, the wing 200 (and the wing-fuselage joint 204) may be configured to counteract 69 percent (e.g., 65-75 percent) of the vertical moment $M_z$, and the strut 300 (and the strut-fuselage joint 304) may be configured to counteract 31 percent (i.e., or a remaining portion) of the vertical moment $M_z$.

Advantageously, configuring the strut 300 and the wing 200 such that each carries a portion of the vertical moment $M_z$ allows for a reduction in the structural mass of the wing-fuselage joint 204 and the strut-fuselage joint 304, since neither joint is required to carry 100 percent of the vertical moment $M_z$. In addition, such an arrangement provides structural redundancy. For example, if the wing-fuselage joint 204 and the strut-fuselage joint 304 are each designed to carry 50 percent of the vertical moment Mz, then if one of the joints is ineffective, the remaining joint can carry the vertical moment $M_z$ due to a built-in safety factor typical of structural design. Thus, a degree of fail-safety is provided for an arrangement in which the vertical moment $M_z$ is shared between the wing 200 and the strut 300 in approximately equal proportions.

Referring to FIGS. 33-45, shown are structural arrangements in which the strut 300 is configured to carry the entirety of the vertical moment $M_z$ induced by the lifting force 600. In the example of FIG. 33-45, the structural arrangement is based on the concept that the structural efficiency and stiffness of the strut 300 increases as the strut chord increases. In the examples shown, the strut 300 is configured as an strut A-frame structure 322 having a strut front spar 326 and a strut rear spar 328. The combination of the wing 200 (i.e., the wing axis 212) and the strut A-frame structure 322 (i.e., the strut front spar 326 and the strut rear spar 328) defines a lower tetrahedron configuration 324.

Figure 35:
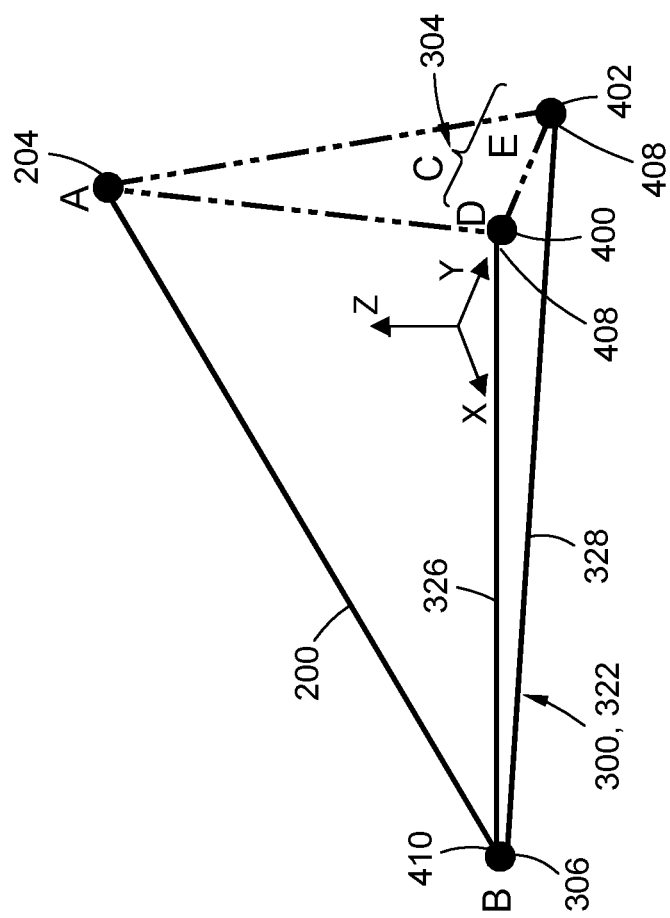
FIG. 35 is a schematic diagram of the wing and the strut of FIG. 33, and showing the strut configured as a strut A-frame structure in which the strut spar inboard ends of the strut front spar and the strut rear spar are spaced apart from each other.

In FIGS. 33-45, the strut front spar 326 and the strut rear spar 328 each have a strut spar inboard end 408 and a strut spar outboard end 410. Reference character D represents the location of the strut front attach point 400 (FIG. 35), and reference character E represents the location of the strut rear attach point 402 (FIG. 35). As mentioned above, reference character C represents the strut-fuselage joint 304. The strut spar outboard ends 410 (FIG. 35) of the strut front spar 326 and strut rear spar 328 converge at the strut-wing joint 306. The strut front spar 326 and the strut rear spar 328 are respectively configured to carry tension load 602 (FIG. 37) and compression load 604 (FIG. 37) in response to the vertical moment $M_z$ induced by the lifting force 600. The strut spar inboard ends 408 are spaced apart from each other at the strut-fuselage joint 304, and are configured to transfer tension load 602 and compression load 604 into the fuselage 102 at a strut front attach point 400 and a strut rear attach point 402.

Figure 38:
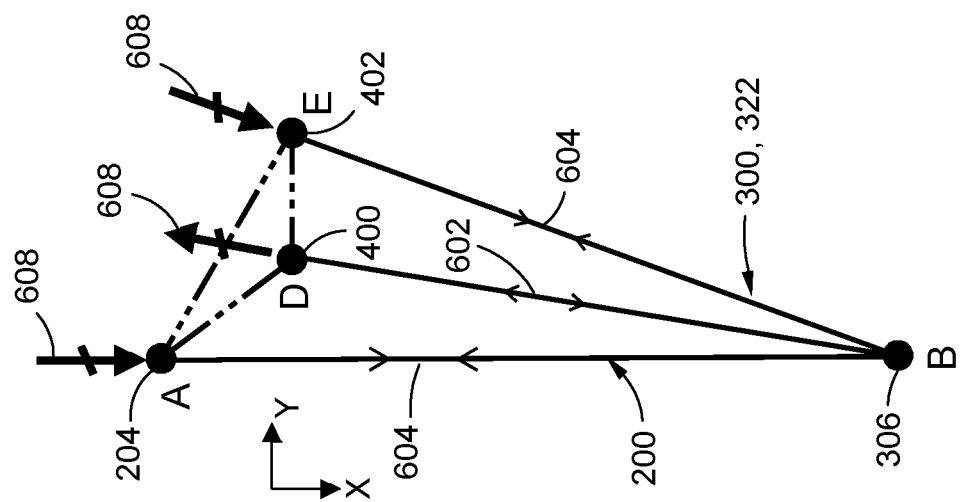
FIG. 38 is a top view schematic diagram of FIG. 37.
Figure 37:
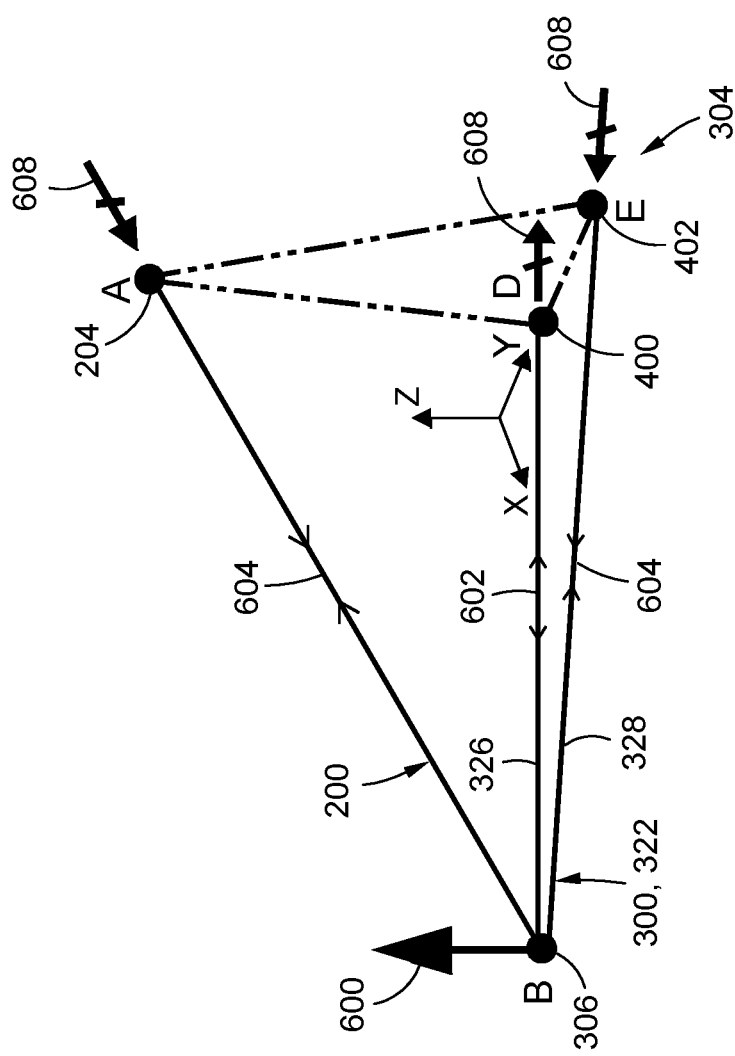
FIG. 37 is a schematic diagram of the wing and the strut of FIG. 35, and showing the lifting force at the strut-wing joint, and the reaction forces at the wing-fuselage joint, and at the strut-fuselage joint.

FIGS. 37-38 illustrate the loads and reaction forces 608 on the wing 200 and the strut 300 as a result of the lifting force 600 at the strut-wing joint 306. As can be seen, the wing 200 is subjected to compression load 604, and the reaction force 608 at the wing-fuselage joint 204 is compression. The strut front spar 326 is subjected to tension load 602, and the reaction force 608 at the strut front attach point 400 is tension. The strut rear spar 328 is typically subjected to compression load 604, and the reaction force 608 at the strut rear attach point 402 is compression.

Figure 40:
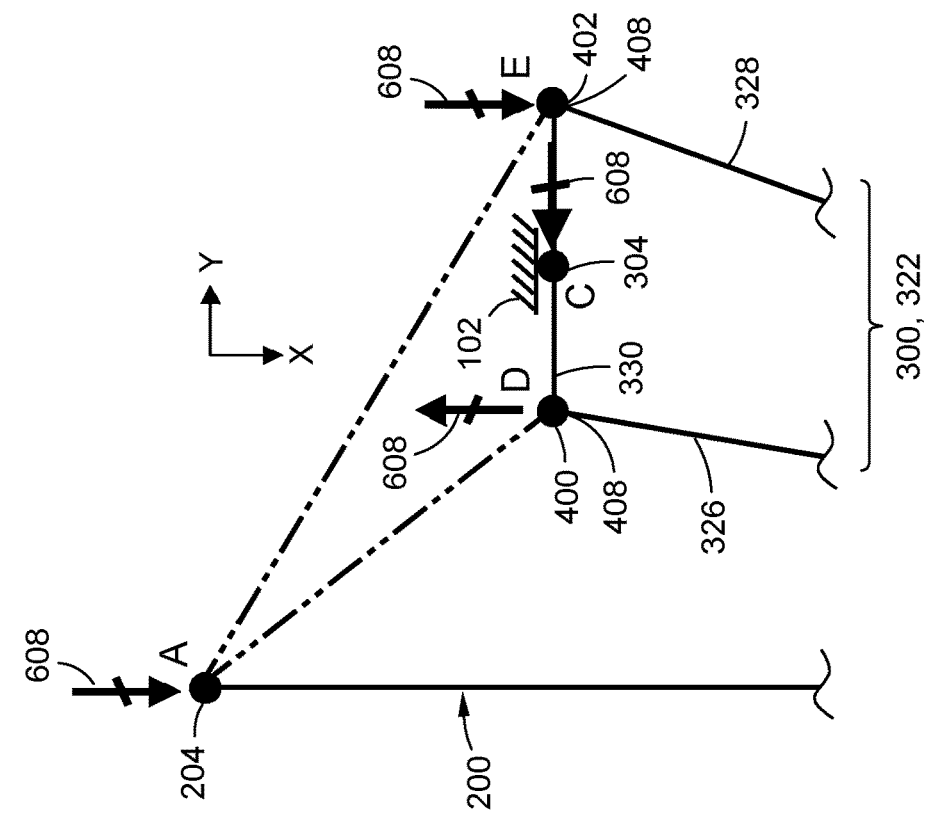
FIG. 40 shows the reaction forces of FIG. 39, and further illustrates the reaction forces at an inboard end connector coupling the strut front spar and the strut rear spar to the fuselage.
Figure 39:
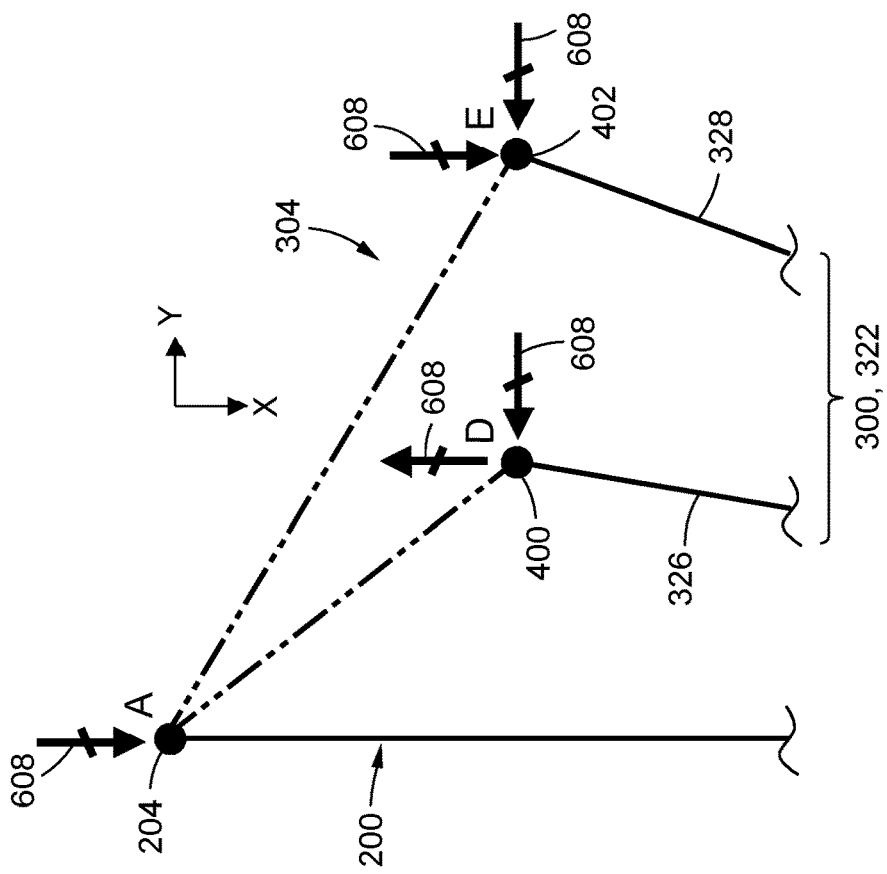
FIG. 39 is a magnified top view of a portion of the schematic diagram of FIG. 37, showing the reaction forces at the wing-fuselage joint, and at the strut-fuselage joint.

FIGS. 39-40 are magnified top-down views showing the strut-fuselage joint 304, and the resolution of the reaction forces 608 at the strut front attach point 400 and the strut rear attach point 402 into reaction forces 608 in the lateral direction (i.e., tension and compression, oriented perpendicular to the longitudinal axis 126) and reaction forces 608 (i.e., shear load) in the fore-aft direction (i.e., parallel to the longitudinal axis 126).

Figure 41:
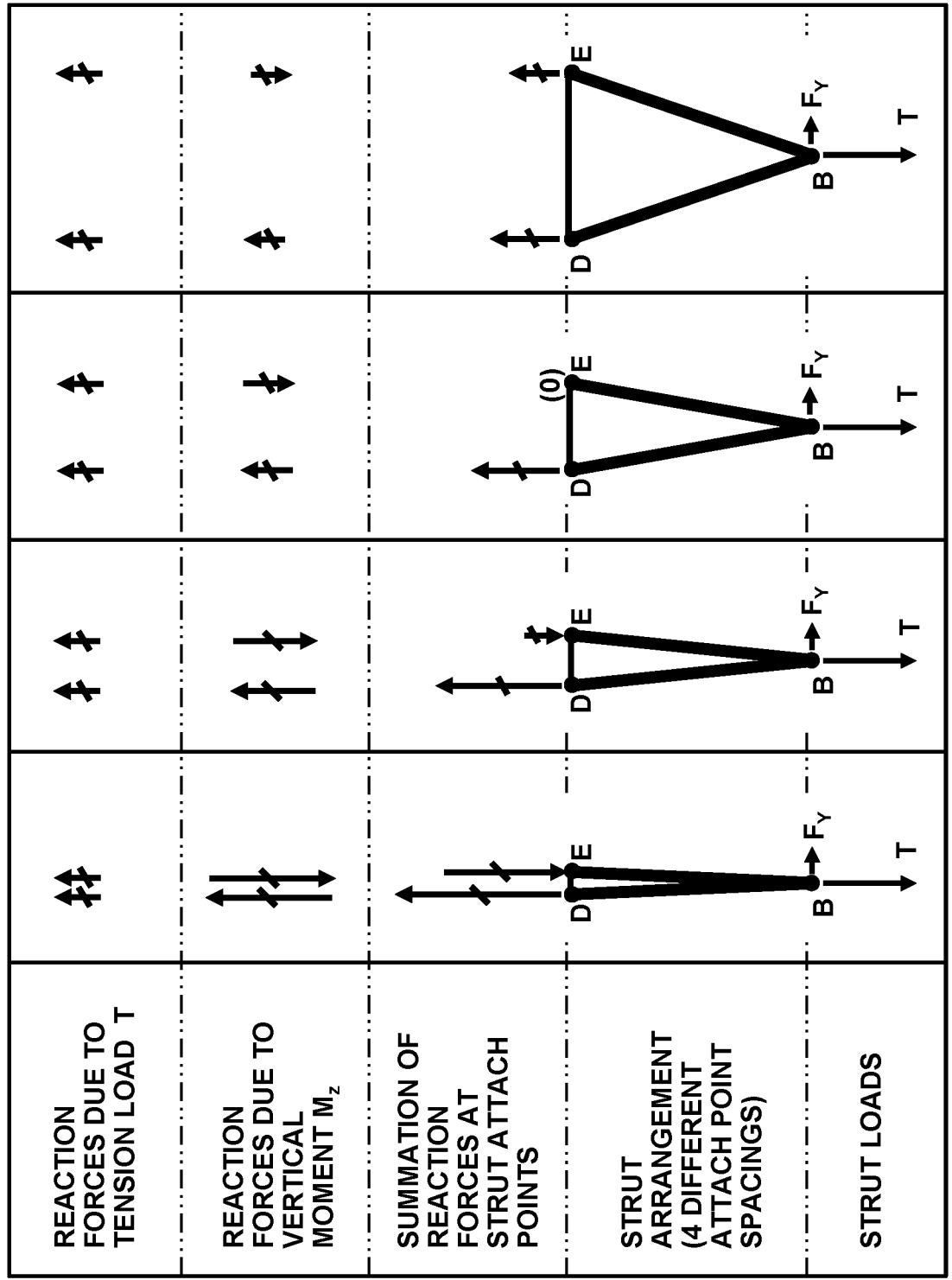
FIG. 41 is a chart of the reaction forces at the strut front and rear attach points for four different arrangements of the strut having different attach point spacings.

FIG. 41 is a chart of the reaction forces 608 at the strut front and rear attach points 400, 402 due to tension load T and vertical moment $M_z$ for four different configurations of the strut 300. As shown in the chart, each of the four strut 300 configurations has a different attach point spacing between the strut front attach point 400 (reference character D) and the strut rear attach point 402 (reference character E). The difference in attach point spacing ("DE"—e.g., FIGS. 61 and 64) may be due to different angular spacings of the strut front spar 326 and the strut rear spar 328 and/or due to different configurations of the strut root 302.

In FIG. 41, the magnitude of the reaction forces 608 is represented by the length of the arrows. Although the reaction forces 608 due to the tension load T are of the same magnitude for each of the four strut configurations, the reaction forces 608 due to the vertical moment $M_z$ are significantly different. For example, for the strut configuration on the extreme left-hand side of the chart, the attach point spacing between the strut front and rear attach points 400, 402 is the smallest of the four configurations, and which results in relatively large magnitude reaction forces 608 at the strut front and rear attach points 400, 402. In contrast, for the strut configuration on the extreme right-hand side of the chart, the attach point spacing is the largest of the four strut configurations, and which results in relatively small reaction forces 608 at the strut front and rear attach points 400, 402.

Referring still to FIG. 41, the chart shows the summation of the reaction forces 608 due to the tension load T and the vertical moment $M_z$ for each of the four strut configurations. In general, the chart shows that the structural efficiency and bending stiffness of the strut 300 increases as the attach point spacing ("DE") increases between the strut front attach point 400 and the strut rear attach point 402. Increased structural efficiency represents reduced reaction forces at D and E due to the vertical moment $M_z$ at the strut front attach point 400 and the strut rear attach point 402, which translates into reduced structural mass of the aircraft 100. FIG. 41 also shows that the reaction force 608 at the rear strut attach point 402 can be compression, tension, or even zero, depending upon the attach point spacing.

Referring back to FIG. 40, shown is an example of a strut A-frame structure 322 having an inboard end connector 330 interconnecting the strut spar inboard end 408 of the strut front spar 326 with the strut spar inboard end 408 of the strut rear spar 328. The inboard end connector 330 is configured to transfer shear load into the fuselage 102 at the strut-fuselage joint 304. The shear load (i.e., parallel to the Y axis) is a reaction force 608 to the tension load 602 and the compression load 604 respectively carried by the strut front spar 326 (FIG. 38) and the strut rear spar 328 (FIG. 38).

In FIG. 40, the inboard end connector 330 is shown coupled to the fuselage 102 at a single location for transferring the shear load as a single reaction force 608 into the fuselage 102. The inboard end connector 330 is either a separate connector beam (not shown), or the inboard end connector 330 is integrated into the structure of the fuselage 102 portion between the strut spar inboard end 408 of the strut front spar 326 and the strut spar inboard end 408 of the strut rear spar 328. Although FIG. 40 shows the inboard end connector 330 coupled to the fuselage 102 at a single location approximately midway between the strut front attach point 400 and strut rear attach point 402, the inboard end connector 330 allows the reaction force 608 (i.e., the shear reaction) to be transferred into the fuselage 102 at any location between the strut front attach point 400 and the strut rear attach point 402. Alternatively, the shear load can be distributed along the entire length of the inboard end connector 330.

Figure 43:
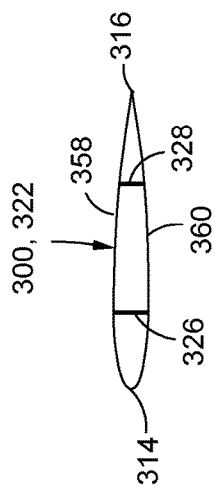
FIG. 43 is a sectional view taken along line 43-43 of FIG. 42, illustrating an airfoil shape of the strut containing the strut front spar and the strut rear spar.
Figure 42:
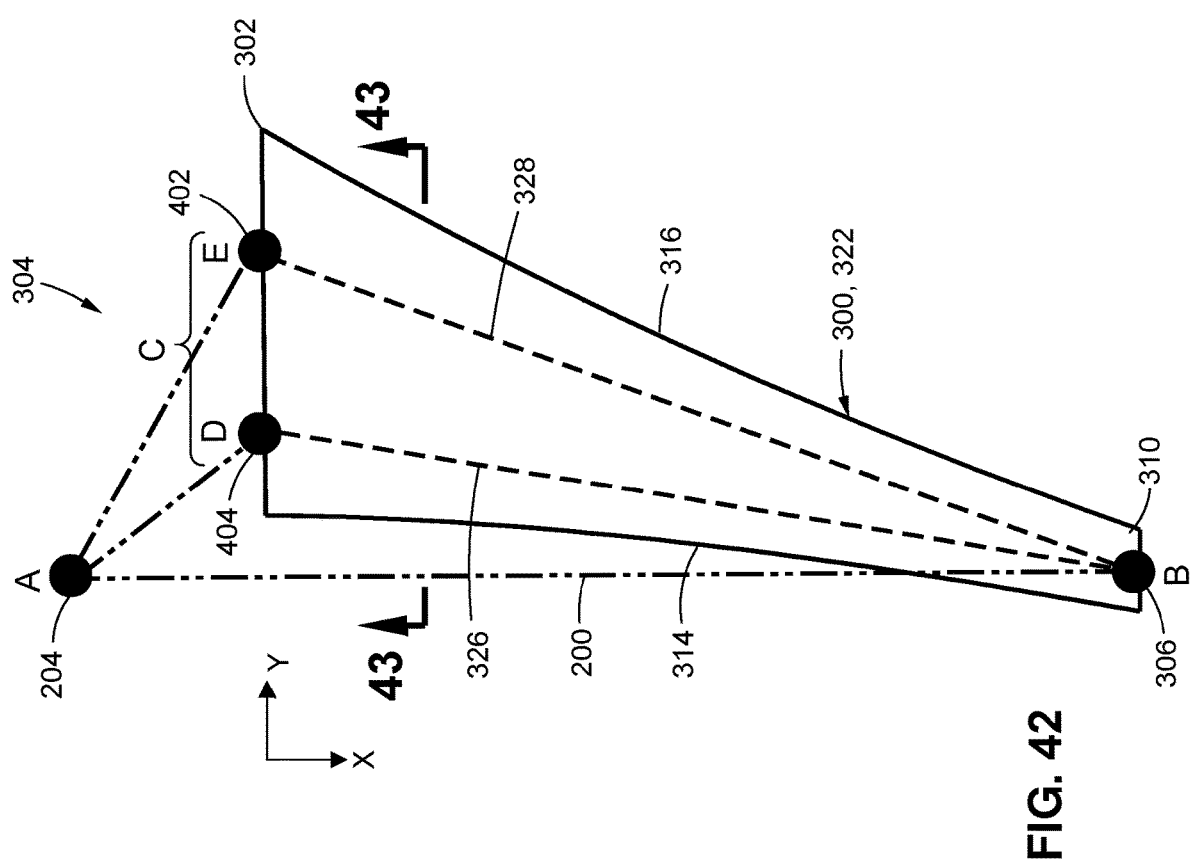
FIG. 42 is a top view of the strut having a tapered shape.

Referring to FIGS. 42-43, shown is an example of the strut 300 having a strut front spar 326 and a strut rear spar 328 encapsulated within the airfoil shape of the strut 300. As shown in FIG. 43, the airfoil shape is defined by a strut upper skin panel 358 and a strut lower skin panel 360. The strut 300 includes a strut leading edge 314 and a strut trailing edge 316, each extending from the strut root 302 at the strut-fuselage joint 304, to the strut outboard end 310 at the strut-wing joint 306. The strut leading edge 314 and the strut trailing edge 316 define a tapered shape for the strut 300. Advantageously, the tapered shape of the strut 300 is complementary to the strut A-frame structure 322 of the strut front spar 326 and the strut rear spar 328. The aerodynamic properties of the strut A-frame structure 322 are favorable, in that a progressively smaller strut chord near the strut-wing joint 306 minimizes interference drag between the strut 300 and the wing 200. Furthermore, the relatively large strut chord at the strut-fuselage joint 304 enables the strut 300 to handle a large portion (e.g., an entirety) of the vertical moment $M_z$ induced by the lifting force 600.

Figure 46:
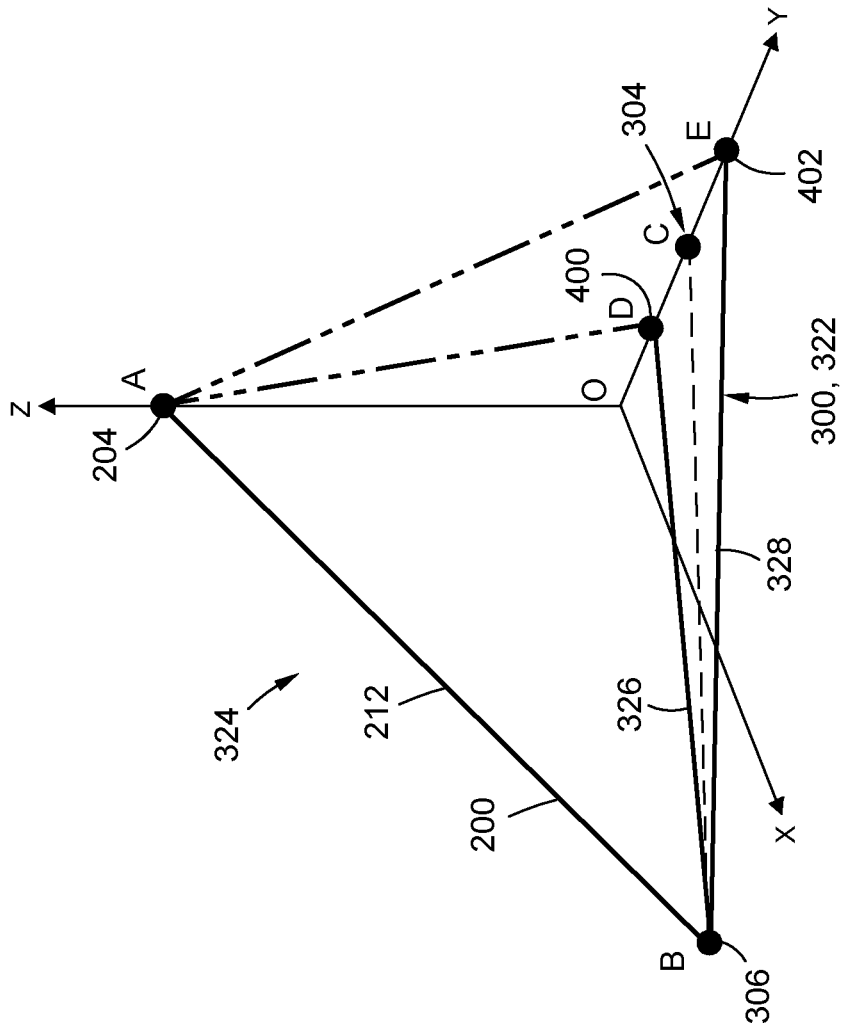
FIG. 46 is a schematic diagram of the wing and the strut A-frame structure, forming a lower tetrahedron structure.
Figure 44:
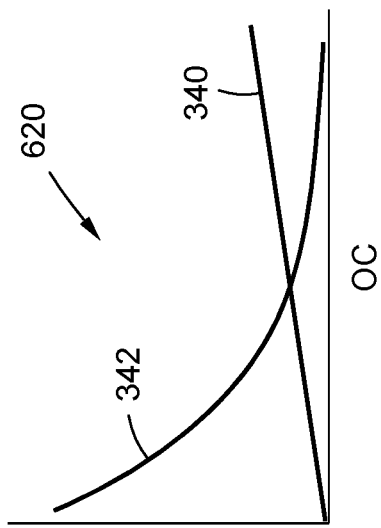
FIG. 44 is a plot of the aerodynamic penalty and the structural penalty as a function of the aft offset between the strut-fuselage joint and the wing-fuselage joint shown in FIG. 46 for the lower tetrahedron structure defined by the wing axis and the strut A-frame structure.
Figure 45:
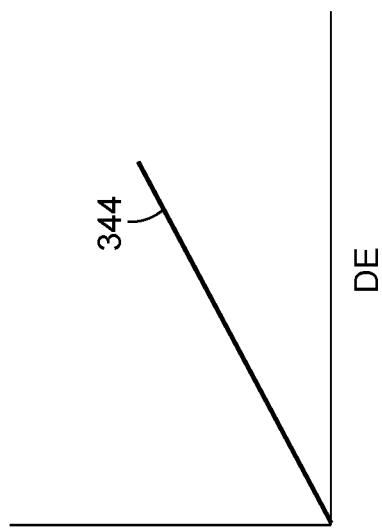
FIG. 45 is a plot of the structural benefit as a function of the attach point spacing between the strut front spar and the strut rear spar at the strut-fuselage joint for the lower tetrahedron structure of FIG. 46.
Figure 48:
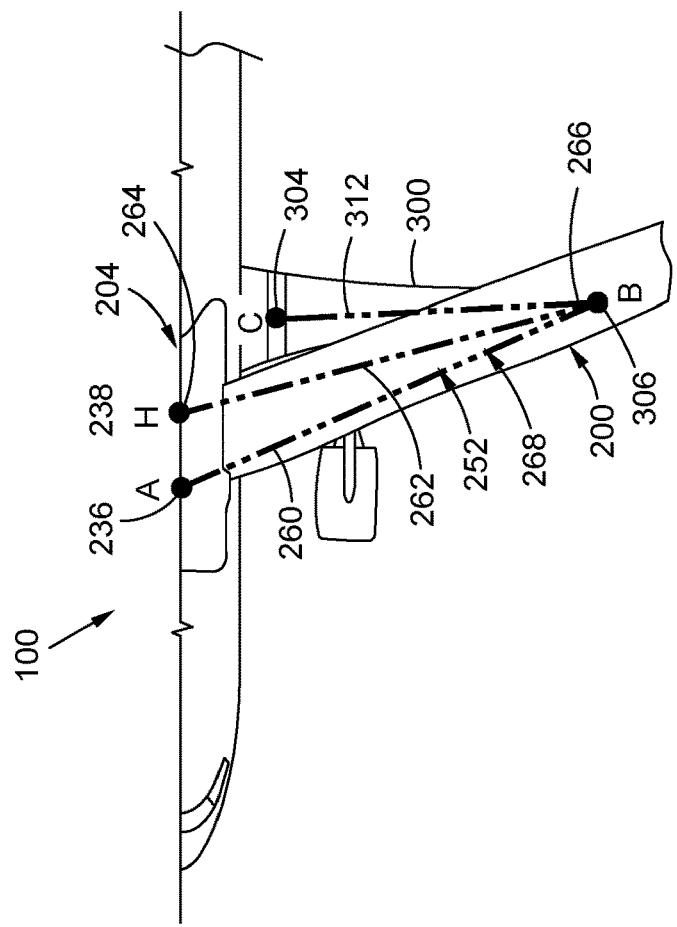
FIG. 48 is a top view of the aircraft of FIG. 47.
Figure 47:
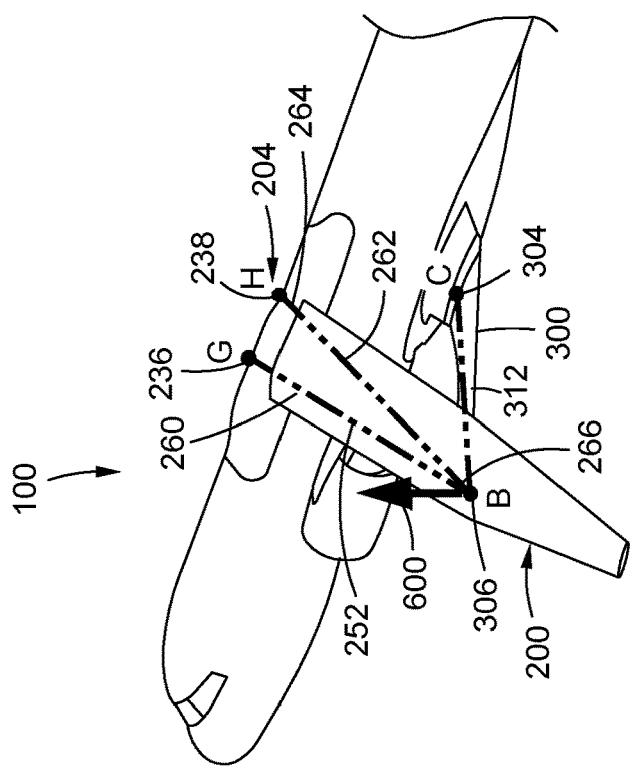
FIG. 47 is a top-aft perspective view of the aircraft, and illustrating the wing having wing A-frame structure, and defining an upper tetrahedron structure.

Referring to FIGS. 44-46, shown in FIGS. 44-45 are plots of the aerodynamic penalty 342, structural penalty 340, and structural benefit 344 as a function of the geometry of the lower tetrahedron configuration 324 of FIG. 46. As described above, the lower tetrahedron configuration 324 of FIG. 46 is defined by the wing axis 212, and by the strut A-frame structure 322, as shown in FIGS. 31-38. In FIG. 46, reference character O is at the same longitudinal location as the wing-fuselage joint 204, and reference character C represents the longitudinal location of the strut-fuselage joint 304. As mentioned above, reference character D represents the longitudinal location of the strut front attach point 400, and reference character E represents the longitudinal location of the strut rear attach point 402. Reference character C represents the strut-fuselage joint 304, and in FIG. 46, reference character C may be described as being located at the midpoint between the strut front attach point 400 (D) and the strut rear attach point 402 (E).

FIG. 44 is a moment diagram 620 illustrating a direct proportional relationship between distance OC and the magnitude of the vertical moment $M_z$. As can be seen, the structural penalty 340 (i.e., aircraft weight) increases as distance OC increases. FIG. 44 also illustrates the decrease in aerodynamic penalty 342 (e.g., decreased interference drag) that occurs with an increase in distance OC. FIG. 45 is a plot of structural benefit 344 as a function of the attach point spacing ("DE") between the strut front spar 326 and the strut rear spar 328. As can be seen, the structural benefit 344 (i.e., reduction in aircraft weight) increases as the distance DE increases. In addition, FIG. 45 illustrates that distance DE is directly proportional to the ability of the strut 300 to resist the vertical moment $M_z$. The larger the distance DE, the greater the ability of the strut 300 to resist the vertical moment $M_z$.

Referring to FIGS. 44-47, shown are examples of an aircraft 100 in which the wing 200 includes a wing-A-frame structure 252. The wing A-frame structure 252 extends from the wing-fuselage joint 204 at least to the strut-wing joint 306. The wing A-frame structure 252 includes a wing front member 260 and a wing rear member 262. The wing front member 260 and the wing rear member 262 may be alternatives to, or in addition to, the primary load-carrying structures of the wing 200, which typically comprises a wing front spar 220 (FIG. 6) and a wing rear spar 222 (FIG. 6).

At the wing-fuselage joint 204, the wing front member 260 has a wing front attach point 236, which is identified by reference character G. The wing rear member 262 has a wing rear attach point 238, which is identified by reference character H. As mentioned earlier, the strut-wing joint 306 is identified by reference character B, and the strut-fuselage joint 304 is identified by reference character C. The combination of the wing front member 260, the wing rear member 262, and the strut 300 form an upper tetrahedron configuration 268.

In FIGS. 47-50, the wing front member 260 and the wing rear member 262 each have a wing member inboard end 264 and a wing member outboard end 266. The wing member inboard end 264 of the wing front member 260, and the wing member inboard end 264 of the wing rear member 262, are spaced apart from each other at the wing-fuselage joint 204. The wing member outboard end 266 of the wing front member 260 and the wing member outboard end 266 of the wing rear member 262 converge proximate the strut-wing joint 306.

Figure 50:
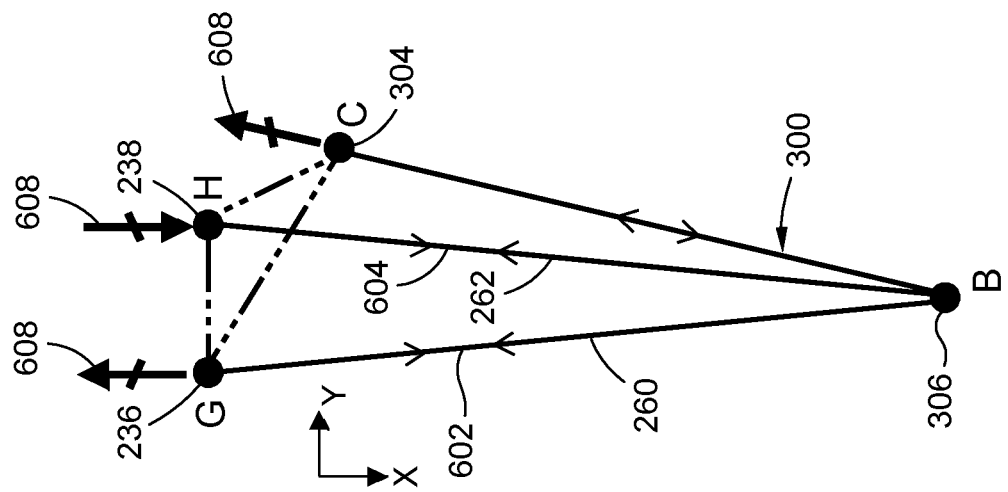
FIG. 50 is a top view schematic diagram of FIG. 49.
Figure 49:
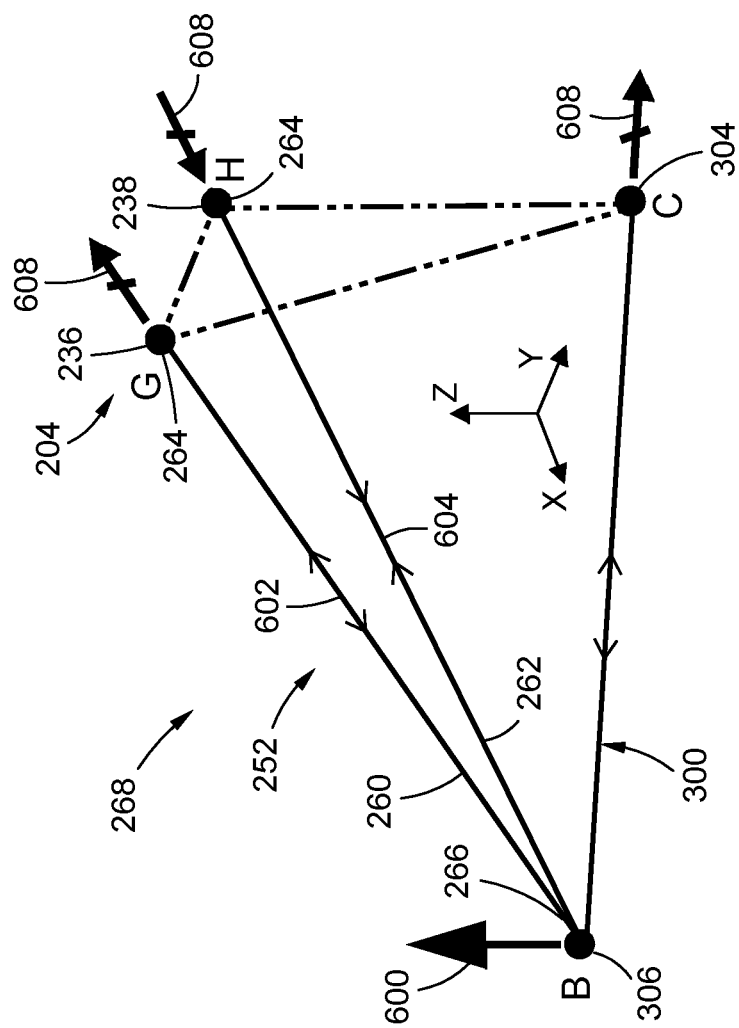
FIG. 49 is a schematic diagram of the wing and the strut of FIG. 47 and illustrating the wing A-frame structure comprising a wing front member and a wing rear member.
Figure 52:
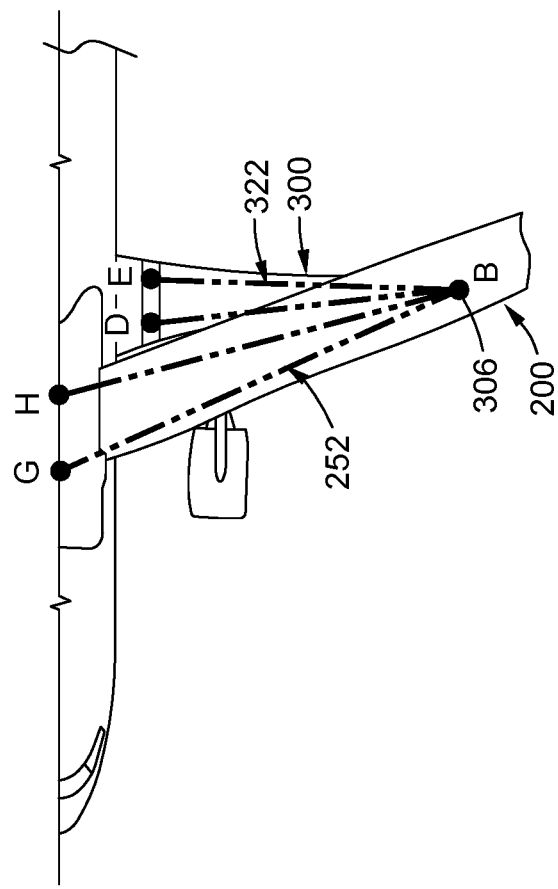
FIG. 52 is a top view of the aircraft of FIG. 51.
Figure 51:
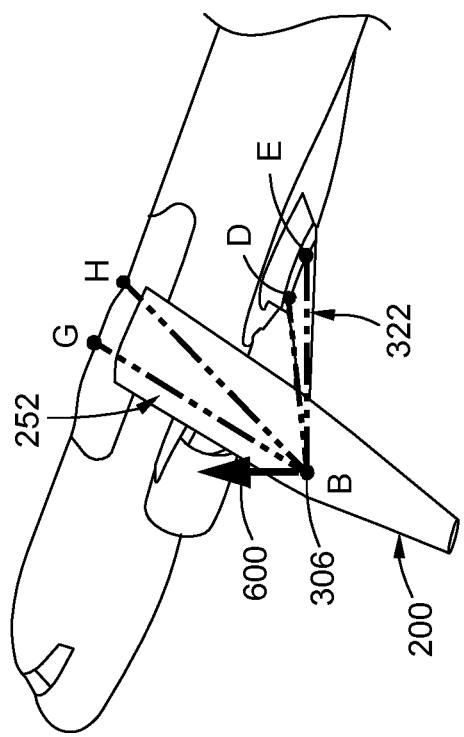
FIG. 51 is a top-aft perspective view of the aircraft, and showing the wing having a wing A-frame structure, and the strut having a strut A-frame structure, and defining a pyramid configuration.
Figure 54:
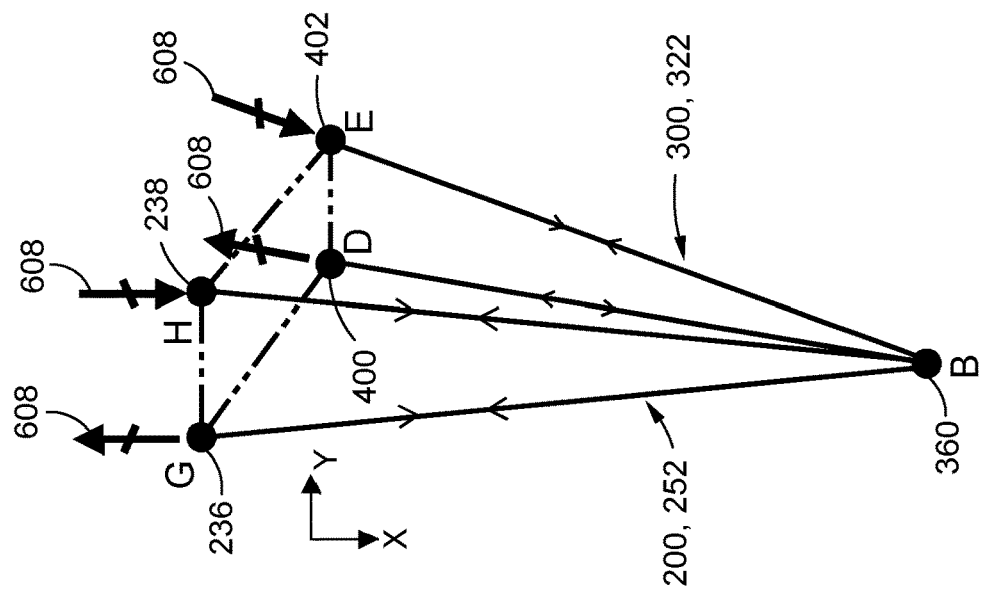
FIG. 54 is a top schematic diagram of the pyramid configuration of FIG. 51.
Figure 53:
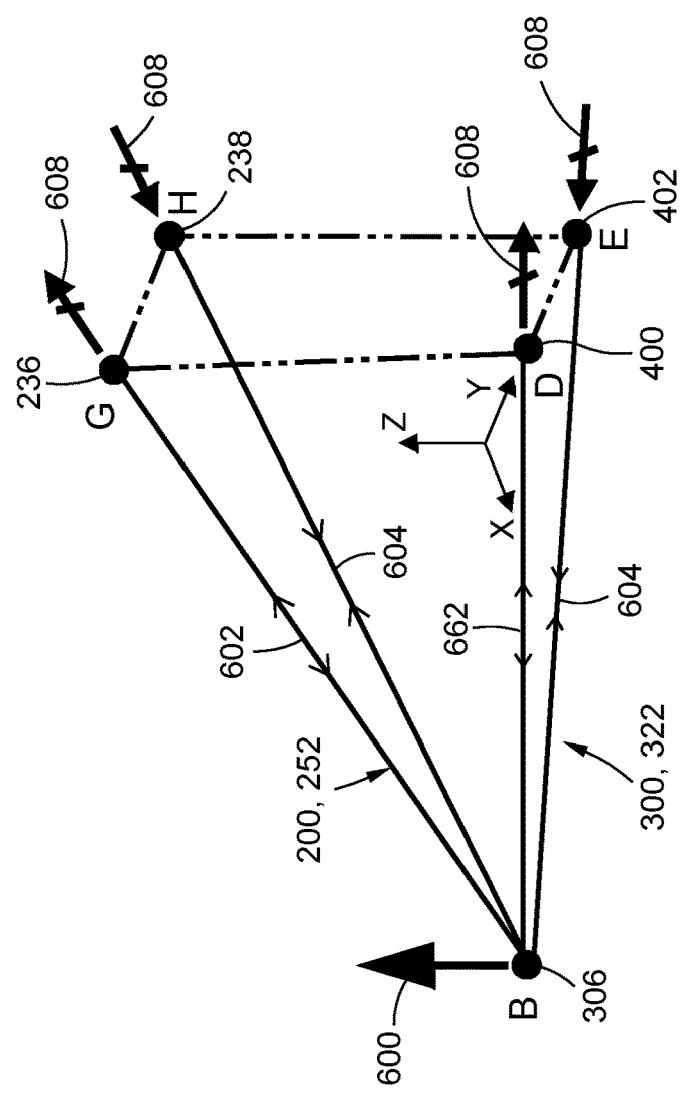
FIG. 53 is a top-aft schematic diagram of the pyramid configuration of FIG. 51.

FIGS. 49-50 illustrate the loads on the wing front member 260, wing rear member 262, and strut 300, and the reaction forces 608 at the wing-fuselage joint 204 and the strut-fuselage joint 304. The wing front member 260 and the wing rear member 262 are respectively sized and configured to respectively carry at least a portion of the tension load 602 and the compression load 604, to thereby counteract the vertical moment $M_z$ induced by the lifting force 600. In some examples, the wing A-frame structure 252 may be configured to carry an entirety of the vertical moment $M_z$ induced by the lifting force 600. The structural efficiency of the wing 200 in resisting the vertical moment $M_z$ is improved as the spacing increases between the wing front attach point 236 and the wing rear attach point 238. To avoid interference of the wing front and rear members 260, 262 with the wing front and rear spars 220, 222 (FIG. 6), or with the wing fuel tanks (not shown), the wing front member 260 and wing rear member 262 may each be provided as two separate members (not shown), with one member located proximate the upper surface of the wing 200, and the other member located proximate the lower surface of the wing 200.

Referring to FIGS. 51-54, shown is an example of a double tetrahedron configuration in which the wing 200 has a wing A-frame structure 252, and the strut 300 has a strut A-frame structure 322. The loads and reaction forces 608 associated with the wing A-frame structure 252 and the strut A-frame structure 322 are similar to the loads and reaction forces 608 described above. The structural efficiency of the double tetrahedron configuration increases as the distance between the wing front and rear attach points 236, 238 (e.g., reference characters G and H) increases, and/or as the distances between the strut front and rear attach points 400, 402 (e.g., reference characters D and E) increases.

Referring to FIGS. 55-58, shown in FIG. 56 is a plot of the conceptual weight 622 of a wing 200 vs. wingspan, for two different wing configurations. The area under the phantom line represents the weight of a typical cantilevered wing 624. The area under the solid line represents the weight of a strut-braced-wing 626, similar to the wing 200 of FIG. 55. The weight of each wing 200 is the structural mass required to react the wing bending moment due primarily to aerodynamic loading on the wing 200. The dashed line represents a cut-off for the weight of the wing 200 due to a minimum gauge limitation 628, which recognizes that even at a bending moment near zero, the wing structural elements cannot have zero thickness and/or zero cross-sectional area.

As can be seen in FIG. 56, the shape of the plot for the strut-braced-wing 626 is significantly different than the shape of the plot for the typical cantilevered wing 624. For example, the strut-braced-wing 626 has an up-bending moment at the wing root 202 that is very small, and may even be negative, depending on the wing configuration. For most of the wing 200 between the wing root 202 and the strut-wing joint 306, the vertical bending moment is small. The crossed-hatched area in FIG. 56 represents the structural weight savings achieved with the strut-braced-wing 626 of FIG. 55.

FIG. 57 is a plot of conceptual weight 630 vs. wingspan for the vertical moment $M_z$ reacted by the wing 200. Due to the aft offset of the strut-fuselage joint 304 relative to the wing-fuselage joint 204, the vertical moment $M_z$ can be relatively large, resulting in correspondingly large wing weight (i.e., structural mass) to carry the vertical moment $M_z$.

FIG. 58 is a combination of the plots of FIGS. 56 and 57. The structural mass required to carry the vertical moment $M_z$ detracts from the weight savings that would otherwise be achieved from using the strut-braced wing 200. The remaining weight savings is represented by the cross-hatched area between the curve of the typical cantilevered wing 624, and the curve of the strut-braced-wing 626. As a result, a larger portion of the vertical moment $M_z$ is preferably carried by the strut 300 rather than the wing 200, such that the weight savings of the strut-braced wing 200 can be preserved.

Figure 59:
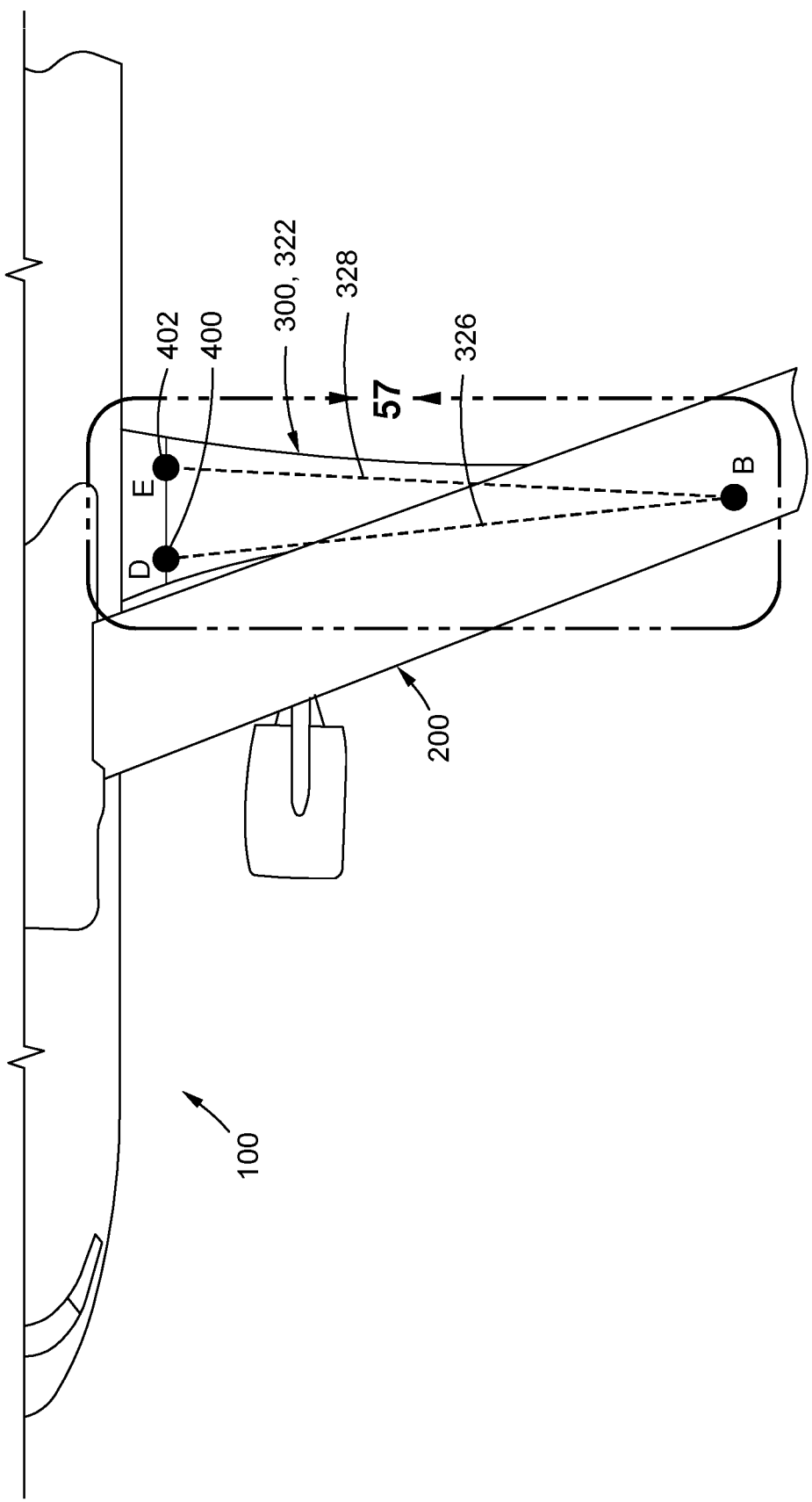
FIG. 59 is a top view of the aircraft showing the strut spar leading edge located aft of the wing trailing edge.

Referring to FIGS. 59-64, shown in FIG. 59 is a top-down view of a portion of the aircraft 100 illustrating an example of a strut A-frame structure 322. FIGS. 60-61 show an example of the strut 300 for which the strut front attach point 400 and the strut rear attach point 402 are at the same longitudinal location as the inboard ends of the strut front spar 326 and strut rear spar 328. In this regard, the attach point spacing ("DE") is dictated by the spacing between the inboard ends of the strut front spar 326 and the strut rear spar 328. FIG. 61 shows the relatively large reaction forces 608 at the strut front attach point 400 and strut rear attach point 402. FIG. 62 is a plot of the bending moment $M_s$ of the strut 300 (i.e., due the vertical moment) as a function of strut length, illustrating that the highest bending moment occurs at the strut root 302.

FIGS. 63-64 illustrate an example of a strut A-frame structure 322 in which the strut front attach point 400 is located forward of the strut front spar 326 and aft of the strut leading edge 314, and the strut rear attach point 402 is located aft of the strut rear spar 328 and forward of the strut trailing edge 316, thereby increasing the attach point spacing. As mentioned above, increasing the attach point spacing results in a decrease in loads at the strut-fuselage joint 304. In this regard, the magnitude of the reaction forces 608 at the strut front and rear attach points 400, 402 in FIG. 63 is lower than the magnitude of the reaction forces 608 in FIG. 60. The arrangement shown in FIG. 63-64 takes advantage of the volume of space within the strut leading edge portion and within the strut trailing edge portion, to thereby reduce the size and/or structural mass of the strut-fuselage joint 304 as a result of the reduced magnitude of the reaction forces 608.

FIGS. 65-92 represent different configurations of the strut 300 for decreasing the magnitude of the reaction forces 608 at the strut-fuselage joint 304. FIGS. 65-66 represent an arrangement in which the strut front spar 326 and the strut rear spar 328 are each contiguous from the strut-fuselage joint 304 to the strut-wing joint 306, and each have at least one kink 414 located proximate the strut-fuselage joint 304. In the example shown, the strut front spar 326 and the strut rear spar 328 each have a single kink 414 dividing the strut spar 326, 328 into a strut spar inboard section 416 and a strut spar outboard section 418. However, the strut 300 may be provided in an arrangement (not shown) wherein each strut spar 326, 328 has multiple kinks 414. At each kink 414, a kick load (not shown) is generated due to the non-alignment of the spar sections 416, 418. The upper and lower strut skin panels 358, 360 and/or other structural members (not shown) may be configured to react the kick loads.

In FIGS. 65-66, the strut spar inboard section 416 of the strut front spar 326 is angled forwardly relative to the strut spar outboard section 418 of the strut front spar 326, and the strut spar inboard section 416 of the strut rear spar 328 is angled aftwardly relative to the strut spar outboard section 418 of the strut front spar 326, to thereby increase the distance between the strut spar inboard ends 408. In the strut 300 includes a kink connector beam 422 extending between and interconnecting the kinks 414 respectively of the strut front spar 326 and the strut rear spar 328. In addition, the strut 300 includes an inboard end connector 330 connecting the strut spar inboard ends 408 of the strut spar inboard sections 416 of the strut front spar 326 and the strut rear spar 328. The inboard end connector 330 is configured to transfer shear load from the strut 300 to the fuselage 102, as described above.

Referring still to FIGS. 65-66, the strut 300 may alternatively or additionally include a kink plate 420 extending between and interconnecting the strut spar inboard section 416 of the strut front spar 326 to the strut spar inboard section 416 of the strut rear spar 328. As shown in FIG. 66, the kink plate 420 is located at the neutral axis of the strut front spar 326 and the strut rear spar 328. Although not shown, the strut front spar 326 and the strut rear spar 328 may each include spar slots 370 (e.g., FIG. 79) for receiving the kink plate 420. The kink plate 420 is configured to facilitate load transfer into the fuselage 102.

Alternatively or additionally, the strut 300 includes a pair of diagonal members 424, each extending from one of the strut spar inboard ends 408 of one of the strut spars 326, 326, to the kink 414 of the other one of the strut spars 326, 326, as shown in FIG. 62. The pair of diagonal members 424 are respectively configured to transfer tension load 602 and compression load 604. The diagonal members 424 can be rods configured to resist axial load, as the diagonal members 424 are not subjected to bending. In FIG. 65, the diagonal members 424 are shown crossing each other. However in other examples, one diagonal member 424 may be located on an upper surface of the kink plate 420, and the other diagonal member 424 may be located a lower surface of the kink plate 420.

Referring to FIGS. 67-68, shown is a further example of a strut A-frame structure 322 comprising a strut leading edge member 426 and a strut trailing edge member 428 respectively defining the strut leading edge 314 and the strut trailing edge 316 of the strut 300. The strut leading edge member 426 and the strut trailing edge member 428 are interconnected by a strut upper skin panel 358 and a strut lower skin panel 360, and the strut leading edge member 426 and strut trailing edge member 428 each have a strut member inboard end 430 and a strut member outboard end 432. As shown in FIGS. 67-68, the strut member inboard ends 430 of the strut leading edge member 426 and strut trailing edge member 428 are spaced apart from each other proximate the strut-fuselage joint 304. The strut member outboard ends 432 converge at the strut-wing joint 306. The strut leading edge member 426 and the strut trailing edge member 428 are respectively sized and configured to carry tension load and compression load resulting from the vertical moment $M_z$ induced by the lifting force 600.

The strut leading edge member 426 and the strut trailing edge member 428 are configured respectively such that the strut leading edge 314 and the strut trailing edge 316 are each concavely curved when the aircraft 100 is viewed from a top-down perspective. The curved shape of the strut leading edge member 426 and strut trailing edge member 428 increases the distance between the strut member inboard ends 430, relative to the distance between the strut member inboard ends 430 if the strut leading edge member 426 and the strut trailing edge member 428 were straight. In addition, the curvature of the strut leading edge 314 minimizes the amount of overlap between the strut leading edge 314 and the wing trailing edge 216 when the aircraft 100 is viewed from a top-down perspective, as shown in FIG. 59.

The strut leading edge member 426 and the strut trailing edge member 428 may be formed of a durable material for damage resistance during the service life of the aircraft 100, such as damage during ground operations, or in-flight damage from bird strikes or erosion, such as from hail or debris. In one example, the strut 300 leading and trailing edge members may be machined from a metallic material such as aluminum, steel, or titanium. The strut upper skin panel 358 and the strut lower skin panel 360 function as shear webs for transferring shear load as the strut 300 is subjected to bending load from the vertical moment $M_z$. The strut leading edge and trailing edge members 426, 428 and the strut upper and lower skin panels 358, 360 may be interconnected in a manner to avoid steps, jumps, or discontinuities in the outer surfaces, particularly near the strut leading edge 314, to promote laminar flow over the strut 300. The interior of the strut 300 may include material or structural members to improve buckling load capability. Due to the continuous curvature in the strut leading and trailing edge members 426, 428 of FIG. 67, instead of a concentrated kick load in the kinked strut spar configuration of FIG. 65, the kick load in FIG. 67 would be distributed along the length of the strut leading and trailing edge members 426, 428. As mentioned above, structure (not shown) would be provided between the strut leading and trailing edge members 426, 428 to carry such distributed kick loads.

Figure 71:
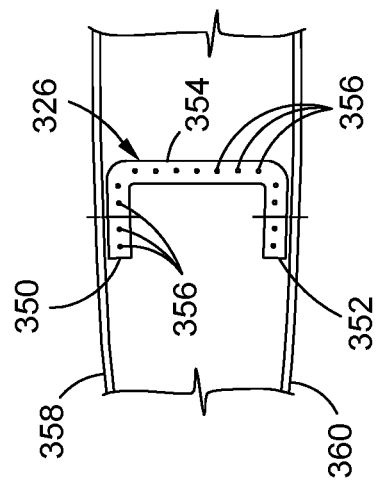
FIG. 71 is a magnified view of the portion of the strut identified by reference numeral 71 of FIG. 70, and illustrating reinforcing fibers embedded within or bonded to the strut front spar and extending along a lengthwise direction of the strut front spar.
Figure 70:
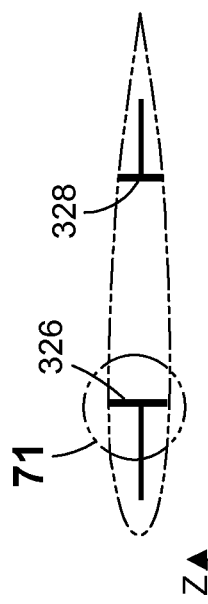
FIG. 70 is a sectional view taken along line 70-70 of FIG. 69, and illustrating an example of the strut front spar and the strut rear spar each having a channel-shaped cross-section.
Figure 69:
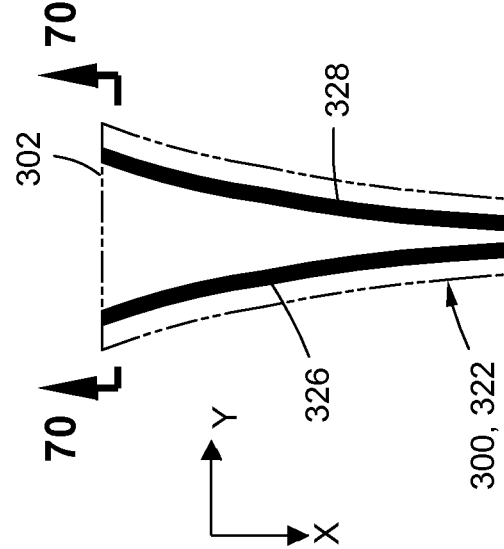
FIG. 69 is a schematic diagram of an example of a strut in which the strut front spar and the strut rear spar each have a curved shape complementary to the curved shape of the strut leading edge and the strut trailing edge.

Referring to FIGS. 69-71, shown is an example of a strut 300 in which the strut front spar 326 and the strut rear spar 328 each have a channel-shaped cross-section comprised of an upper cap 350 and a lower cap 352 interconnected by a spar web 354, although other cross-sectional shapes may be implemented. The strut front spar 326 and the strut rear spar 328 may be formed of fiber-reinforced polymer matrix material (i.e., composite material, such as graphite-epoxy). The strut front spar 326 and/or the strut rear spar 328 include reinforcing fibers 356 extending continuously from the strut root 302 to the strut outboard end 310. The reinforcing fibers 356 increase the load-carrying capability of the strut spars 326, 328. Each reinforcing fiber 356 is comprised of a bundle of filaments. The filaments may be formed of any one of a variety of materials including, but not limited to, polymeric material (e.g., carbon fibers) or non-polymeric material such as metallic fibers. In one example, the filaments may be formed of a lightweight and stiff material, such as boron, to increase the tension-load carrying capability of the strut front spar 326. An alternative material may be used for improving the compression load carrying capability of the strut rear spar 328. In some embodiments, the reinforcing fibers 356 are embedded within the material of the strut front spar 326 and/or the strut rear spar 328. In other embodiments, the reinforcing fibers 356 may be bonded or attached by other means to the strut front spar 326 and/or the strut rear spar 328. As mentioned above, the strut front spar 326 and/or the strut rear spar 328 are not limited to a channel-shaped cross-section as shown, but may be provided in alternative cross-sectional shapes, such as an I-shaped cross section.

Referring to FIGS. 72-73, shown is a still further example of a strut A-frame structure 322 comprising a strut front fitting 434 and a strut rear fitting 436. The strut front fitting 434 extends forward of (i.e., toward the strut leading edge 314) the strut front spar 326. The strut front fitting 434 is coupled to the strut front spar 326 proximate the strut root 302, and is configured to distribute load from the strut front spar 326 into the fuselage 102 at the strut front attach point 400 of the strut-fuselage joint 304. The strut rear fitting 436 extends aft of (i.e., toward the strut trailing edge 316) the strut rear spar 328. The strut rear fitting 436 is coupled to the strut rear spar 328 proximate the strut root 302, and is configured to distribute load from the strut rear spar 328 into the fuselage 102 at the strut rear attach point 402 of the strut-fuselage joint 304. By increasing the spacing between the strut front attach point 400 and strut rear attach point 402, the strut front fitting 434 and the strut rear fitting 436 increase the structural efficiency of the strut-fuselage joint 304, thereby reducing the magnitude of the reaction forces 608 (e.g., FIG. 63), which translates into reduced structural mass of the strut-fuselage joint 304.

In FIGS. 72-73, the strut front fitting 434 and the strut rear fitting 436 are each configured as plates. In the example shown, the plates are located at the neutral axis of the strut front spar 326 and the strut rear spar 328. The strut front fitting 434 and the strut rear fitting 436 may be bonded, mechanically fastened, welded, or integrally machined respectively with the strut front spar 326 and the strut rear spar 328. The strut front spar 326 and the strut rear spar 328 are straight in FIG. 72. However, in other examples not shown, the strut front spar 326 and strut rear spar 328 may be kinked similar to the strut front and rear spars 326, 328 of FIG. 65.

Referring to FIGS. 74-76, shown is an arrangement for attaching the strut front fitting 434 and strut rear fitting 436 respectively to the strut front spar 326 and strut rear spar 328. The strut front spar 326 and the strut rear spar 328 each have the above-described channel-shaped cross-section. However, the strut front spar 326 and strut rear spar 328 may have an alternative cross-sectional shape, such as an I-beam cross-sectional shape (not shown). The strut rear spar 328, the strut upper skin panel 358, and the strut lower skin panel 360 collectively form a strut box, which provides bending stiffness and torsional stiffness for the strut 300. The strut front fitting 434 extends vertically between, and interconnects, the upper cap 350 and the lower cap 352 of the strut front spar 326. The strut rear fitting 436 extends vertically between, and interconnects, the upper cap 350 and the lower cap 352 of the strut rear spar 328.

In FIGS. 74-76, the strut front fitting 434 and the strut rear fitting 436 have a cross-sectional shape that is complementary to the cross-sectional shape respectively of the strut front spar 326 and strut rear spar 328, which improves the transfer of tension load 602 and compression load 604 respectively from the strut front spar 326 and strut rear spar 328 into the strut-fuselage joint 304 (FIG. 59). The strut front fitting 434 and the strut rear fitting 436 may be adhesively bonded and/or mechanically fastened respectively to the strut front spar 326 and strut rear spar 328. The strut upper skin panel 358 and the strut lower skin panel 360 may optionally be stiffened by skin stiffeners 362 on an interior side of the strut 300. In the example shown, each skin stiffener 362 has a T-shaped cross-section. However, the skin stiffeners 362 may have other cross-sectional shapes (e.g., a Z-shaped or hat-shaped cross section). The skin stiffeners 362 may be adhesively bonded and/or mechanically fastened to the strut upper skin panel 358 and the strut lower skin panel 360. In another configuration, instead of skin stiffeners, one or more full-depth spars (not shown) may be installed, with each full-depth spar extending between the strut upper and lower skin panels 358, 360.

Figure 79:
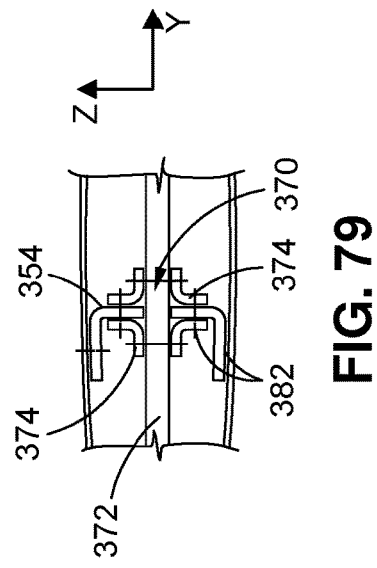
FIG. 79 is a magnified view of the portion of the strut identified by reference numeral 79 of FIG. 78, and illustrating the lug plate coupled to the strut front spar via a plurality of angle brackets.
Figure 78:
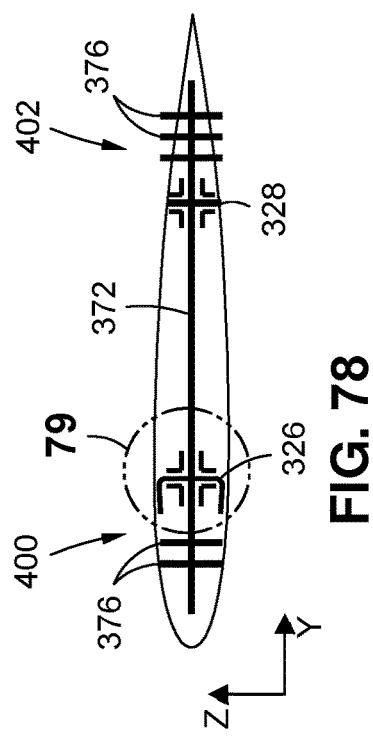
FIG. 78 is a sectional view taken along line 78-78 of FIG. 74, and illustrating the lug plate interconnected to the strut front spar and the strut rear spar, and further illustrating strut lugs protruding from the lug plate for coupling to the fuselage at the strut-fuselage joint.
Figure 77:
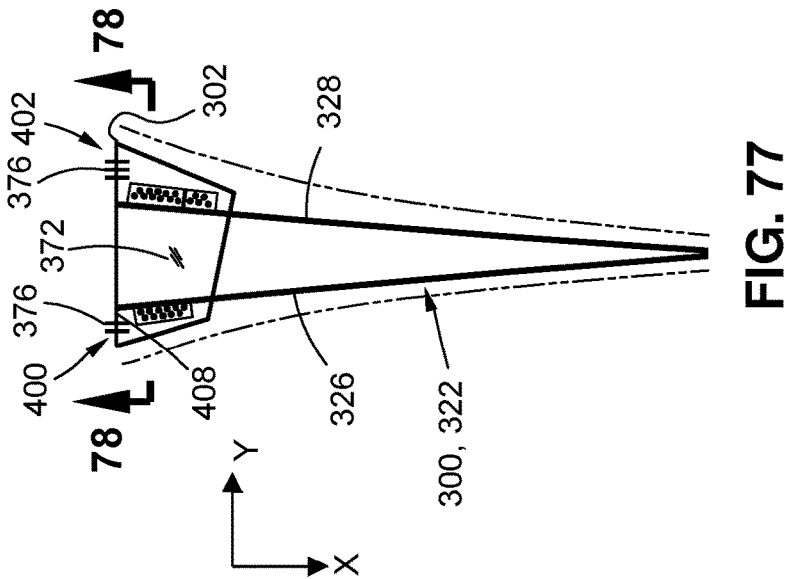
FIG. 77 is a schematic diagram of an example of a strut having a lug plate interconnecting the strut front spar and the strut rear spar.

Referring to FIGS. 77-79, shown is an example of a strut A-frame structure 322 in which the strut spar inboard end 408 of the strut front spar 326 and the strut rear spar 328 has a spar slot 370 formed in the spar web 354 at the strut root 302 end. Each spar slot 370 extends along the neutral axis of the respective strut front spar 326 and strut rear spar 328. The strut A-frame structure 322 includes a lug plate 372 (i.e., a shear plate) inserted within the spar slot 370 in the strut front spar 326 and the strut rear spar 328. The lug plate 372 interconnects the strut front spar 326 and the strut rear spar 328. As shown in FIGS. 77-78, the lug plate 372 extends forward of the strut front spar 326, and extends aft of the strut rear spar 328, thereby providing increased spacing between the strut front attach point 400 and strut rear attach point 402.

In FIGS. 77-79, the lug plate 372 is coupled (e.g., via mechanical fasteners 382) to the strut front spar 326 and strut rear spar 328 via a plurality of angle brackets 374. The strut A-frame structure 322 further includes a plurality of strut lugs 376 extending in an inboard direction from the lug plate 372. As shown in FIGS. 77-78, a plurality of strut lugs 376 are located forward of the strut spar inboard end 408 of the strut front spar 326, and a plurality of strut lugs 376 are located aft of the strut spar inboard end 408 of the strut rear spar 328. The strut lugs 376 are parallel to each other, and are spaced apart complementary to the spacing of a plurality of fuselage lugs 110 (e.g., FIG. 80) protruding from the fuselage 102.

Figure 81:
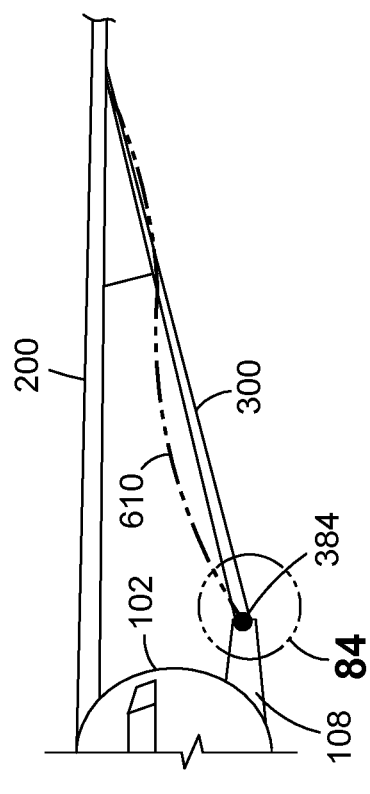
FIG. 81 is a front view of an example of the aircraft showing a buckling mode of the strut attached to the fuselage via the pinned joint of FIG. 80.
Figure 80:
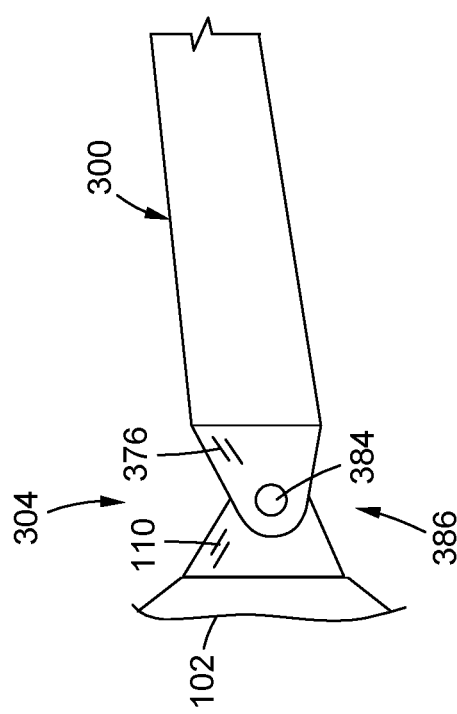
FIG. 80 is a schematic view of an example of a pinned joint coupling the strut to the fuselage or to a pylon (not shown) connected to the fuselage.

Referring to FIGS. 80-81, shown is an example of a pinned joint 386 for coupling a strut 300 to the fuselage 102. As mentioned above, the fuselage 102 has a plurality of parallel and spaced apart fuselage lugs 110 protruding in an outboard direction at the strut front attach point 400 (FIG. 77) and at the strut rear attach point 402 (FIG. 77). The strut lugs 376 are coupled to the fuselage lugs 110 via one or more pins 384. For example, a pin 384 may be installed at the strut front attach point 400 and a pin 384 may be installed at the strut rear attach point 402. Alternatively, a single common pin 384 may extend through the strut lugs 376 and fuselage lugs 110 of the strut front attach point 400 and strut rear attach point 402. In another example, the one or more pins 384 may each be configured in a coaxial pin arrangement (not shown) consisting of an inner pin within an outer pin, for fail-safety.

Figure 83:
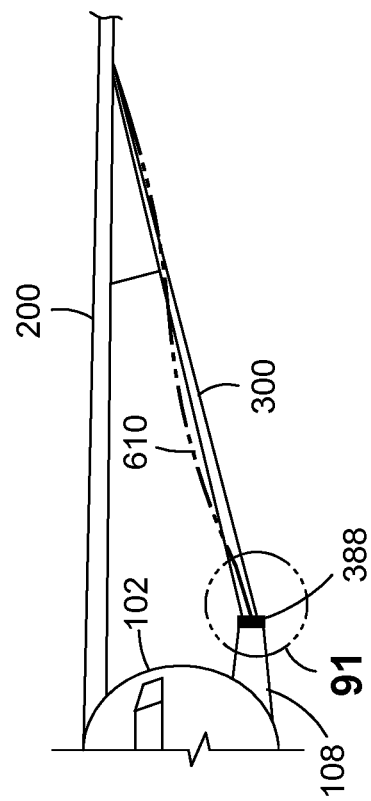
FIG. 83 is a front view of the aircraft showing the buckling mode of the strut attached to the fuselage via the fixed joint of FIG. 82.
Figure 82:
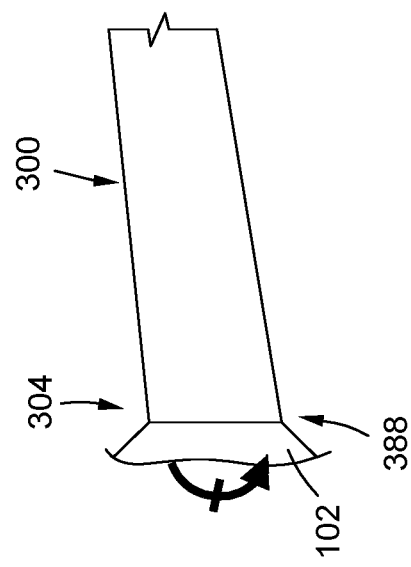
FIG. 82 is a schematic view of an example of a fixed joint coupling the strut to the fuselage.

In FIGS. 80-81, the one or more pins 384 allow rotation or pivoting of the strut 300 about an axis parallel to the longitudinal axis 126 (FIG. 4) of the aircraft 100. The pinned joint 386 allows the strut 300 to pivot slightly in an upward and downward direction during changes in loading on the wing 200 (e.g., during takeoff, maneuvering, turbulence, landing, etc.), thereby reducing or eliminating bending loads at the strut-fuselage joint 304. In contrast, FIGS. 82-83 show an example of a fixed joint 388 for fixedly or non-rotatably coupling the strut 300 to the fuselage 102, as described in greater detail below. As shown in FIGS. 81 and 83, the pinned joint 386 allows for larger amount of buckling 610 (FIG. 81) of the strut 300, relative to the magnitude of buckling 610 (FIG. 83) of the strut 300 attached to the fuselage 102 via the fixed joint 388. In this regard, the fixed joint 388 provides higher bucking load capability for the strut 300 relative to the pinned joint 386. In addition, the fixed joint 388 may provide greater resistance to lateral torsional buckling of the strut 300, as described below.

Referring to FIGS. 84-85, shown is an example of a pinned joint 386 coupling the strut 300 to the fuselage 102. The strut 300 has the strut A-frame structure 322 described above and shown in FIGS. 77-79. In this regard, the strut A-frame structure 322 includes the above-described lug plate 372 that interconnects the strut front spar 326 and the strut rear spar 328. The lug plate 372 extends through the spar slot 370 (FIG. 79) formed in the inboard end of the strut front spar 326 and strut rear spar 328. Angle brackets 374 are used for mechanically fastening the lug plate 372 to the strut front spar 326 and the strut rear spar 328.

The lug plate 372 includes a plurality of the above-described strut lugs 376, which are located forward of the strut front attach point 400, and aft of the strut rear attach point 402. The strut lugs 376 may be integrally formed (e.g., machined) with the lug plate 372, or the strut lugs 376 may separate components that are attached (e.g., mechanically fastened, welded) to the lug plate 372. As shown in FIG. 84, the strut 300 includes a lug bracket 378 at the inboard edge of the lug plate 372. The lug bracket 378 is shown oriented substantially vertical, or normal to the strut axis 312 and the strut chord. In addition, the lug bracket 378 extends parallel to the joint rotational axis defined by the pin 384. The lug bracket 378 stabilizes the strut lugs 376, and facilitates the transfer of load from the lug plate 372 into the strut lugs 376. The lug plate 372, lug plate 372, and strut lugs 376 transfer into the fuselage 102 tension load 602 from the strut front spar 326, and compression load 604 from the strut rear spar 328. In addition, the lug plate 372 and strut lugs 376 facilitate the transfer of shear load between the strut 300 and the fuselage 102.

Figure 86:
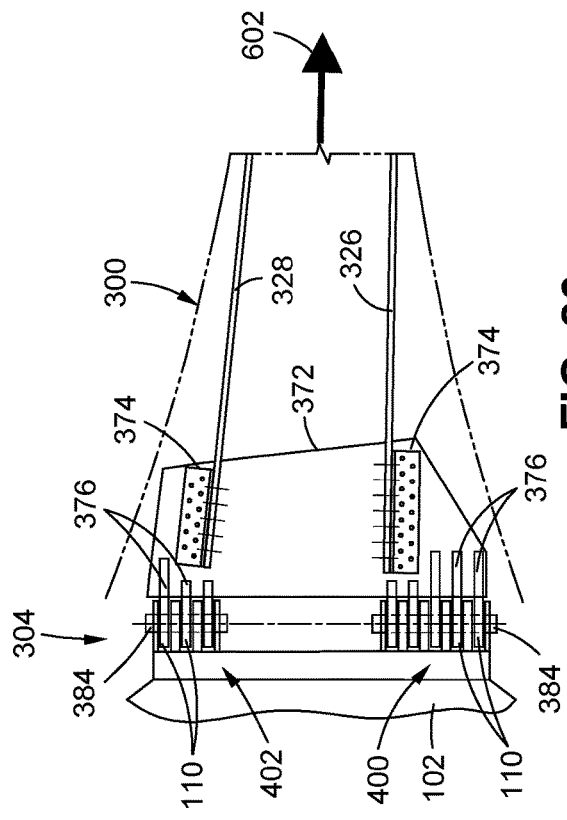
FIG. 86 is a top view of an example of the pinned-joint of FIG. 84, and illustrating a net tension load exerted on the strut as a result of a lifting force generated by the wing.
Figure 88:
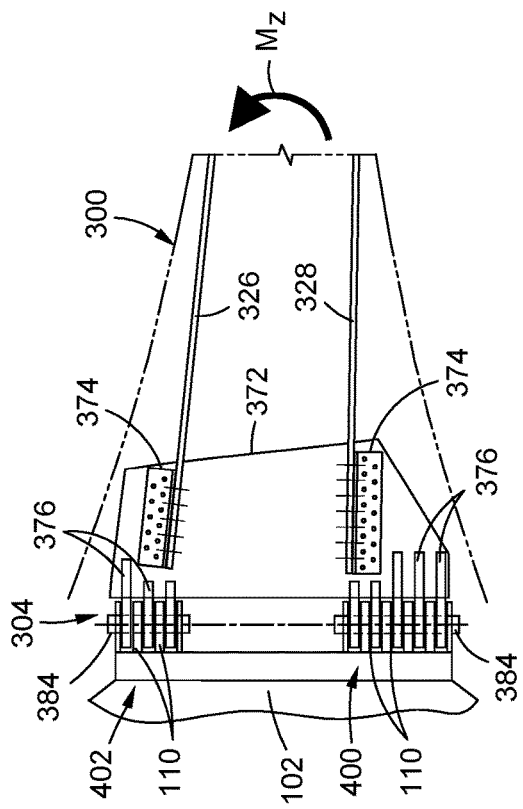
FIG. 88 shows the pinned-joint of the strut of FIG. 84, and illustrating a strut moment exerted on the strut as a result of the lifting force generated by the wing.
Figure 87:
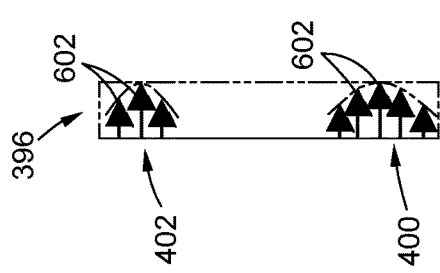
FIG. 87 is an axial load profile of the tension load on the strut lugs at the strut front attach point and the strut rear attach point.

Referring to FIGS. 86-89, shown in FIG. 86 is an example of net tension load 602 (i.e., pure axial load) applied by the strut 300 at the strut-fuselage joint 304, as a result of the vertical moment $M_z$ induced by the lifting force 600 (FIG. 37) at the strut-wing joint 306. FIG. 88 shows the vertical moment $M_z$ on the strut 300 as a result of the lifting force 600. For most flight conditions, the ratio of the vertical moment $M_z$ to the axial load will be generally constant. FIG. 87 is an axial load profile 396 of the tension load 602 on the plurality of strut lugs 376 at the strut front attach point 400, and at the strut rear attach point 402. As can be seen, the most highly loaded strut lugs 376 at each attach point 400, 402 are those that are located in the middle of the plurality of strut lugs 376.

Figure 89:
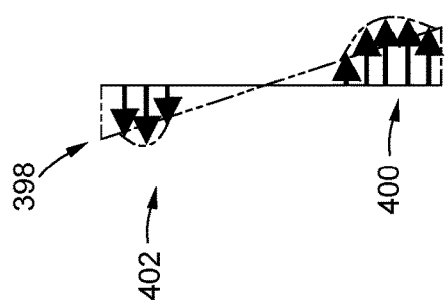
FIG. 89 is a moment profile of the moment at the strut front attach point and the strut rear attach point.

FIG. 89 is a moment profile 398 of the moment at the strut front attach point 400 and at the strut rear attach point 402. As can be seen, the moment generally peaks at the extreme ends of the strut-fuselage joint 304 (i.e., at the forward end, and at the aft end). The configuration of the strut lugs 376 at the strut front attach point 400 and strut rear attach point 402 can be tailored to achieve substantially uniform loads in the strut lugs 376 and fuselage lugs 110, thereby providing an opportunity for increasing the structural efficiency of the strut-fuselage joint 304, which may translate to reduce structural mass of the aircraft 100.

Figure 90:
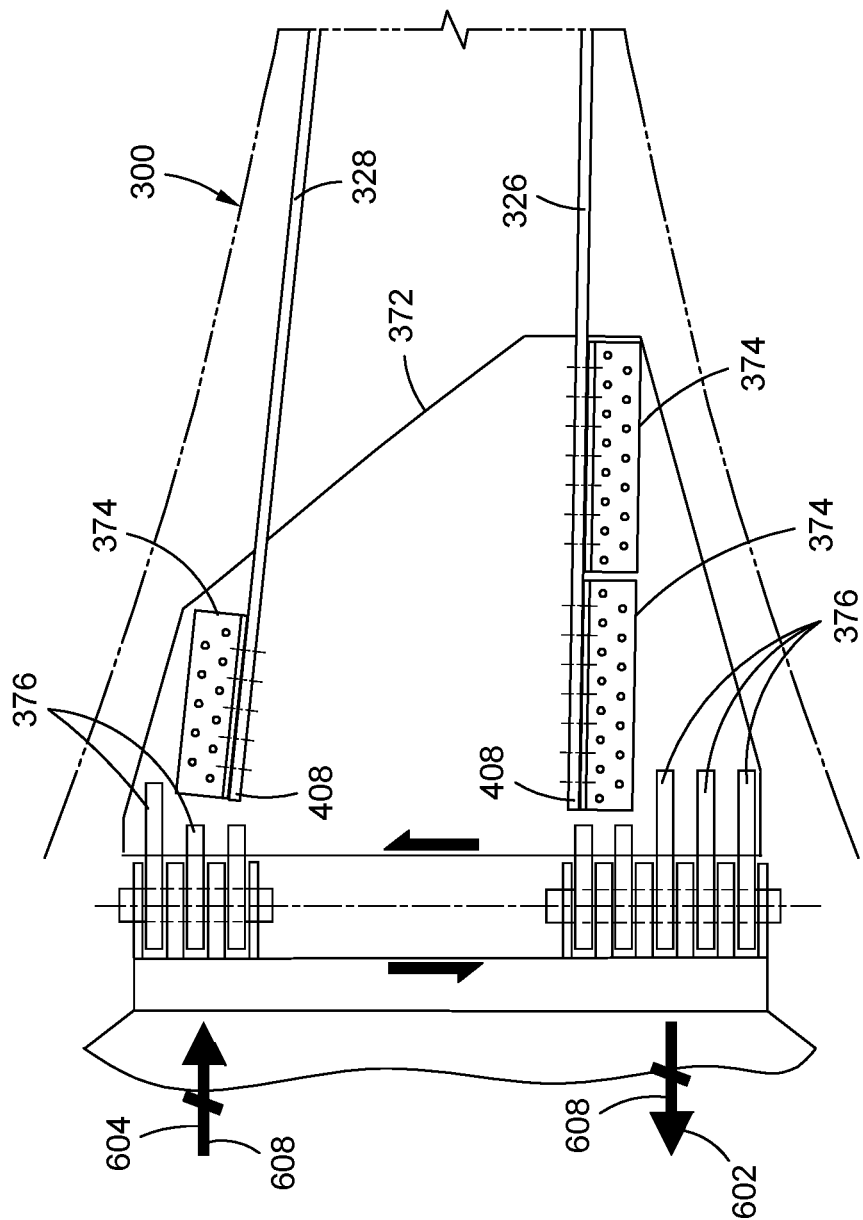
FIG. 90 is a top view of an example of a pinned joint showing additional angle brackets coupling the lug plate to the strut front spar to accommodate the increased axial load and moment at the strut front attach point.
Figure 96:
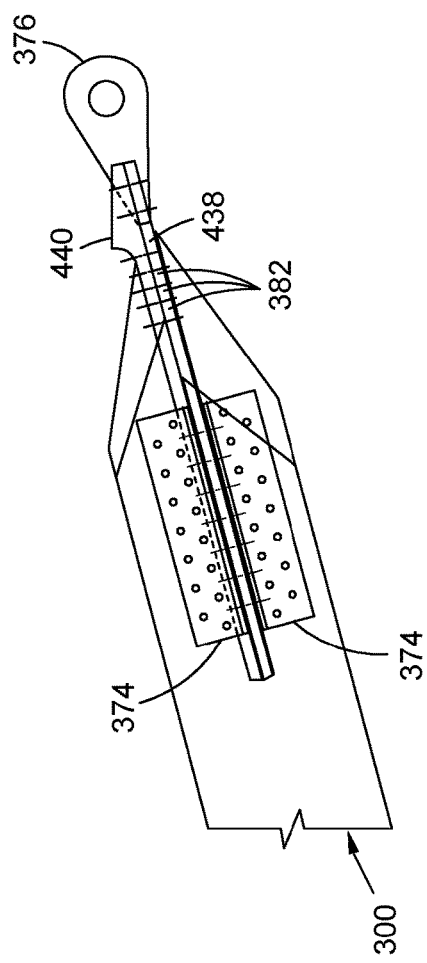
FIG. 96 is a front view of an example of the front spar plate and the rear spar plate coupled to the strut front spar and the strut rear spar.
Figure 97:
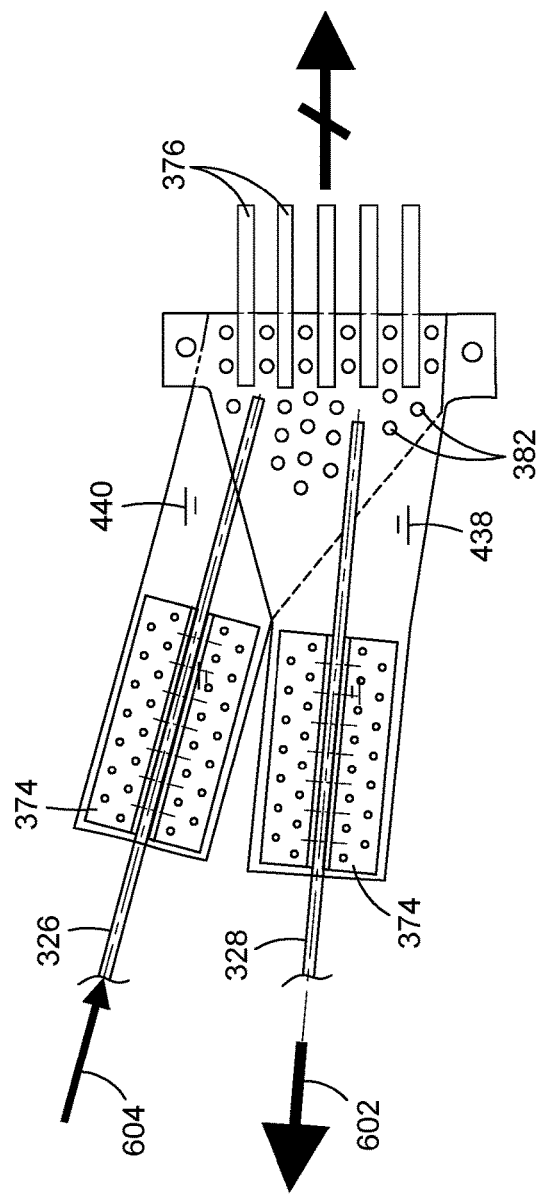
FIG. 97 is a top view of the front spar plate and the rear spar plate coupled to the strut front spar and the strut rear spar.
Figure 104:
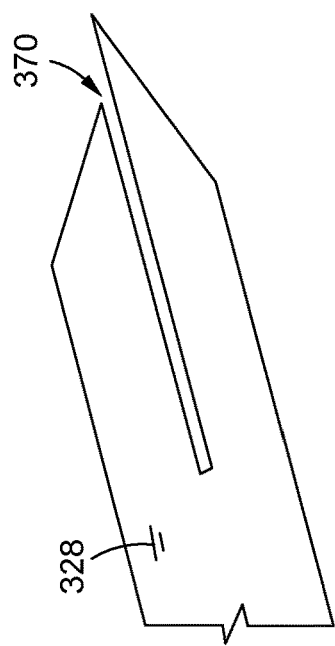
FIG. 104 is a front view of the strut rear spar having a spar slot for receiving the rear spar plate.
Figure 102:
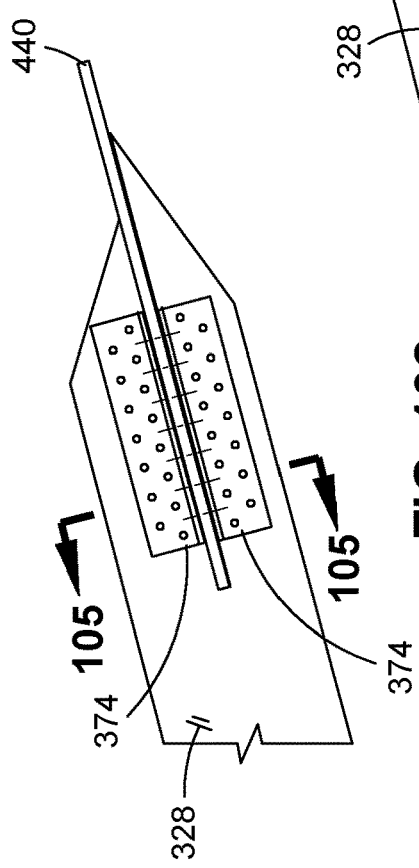
FIG. 102 is a front view of the rear spar plate coupled to the strut rear spar via angle brackets.
Figure 103:
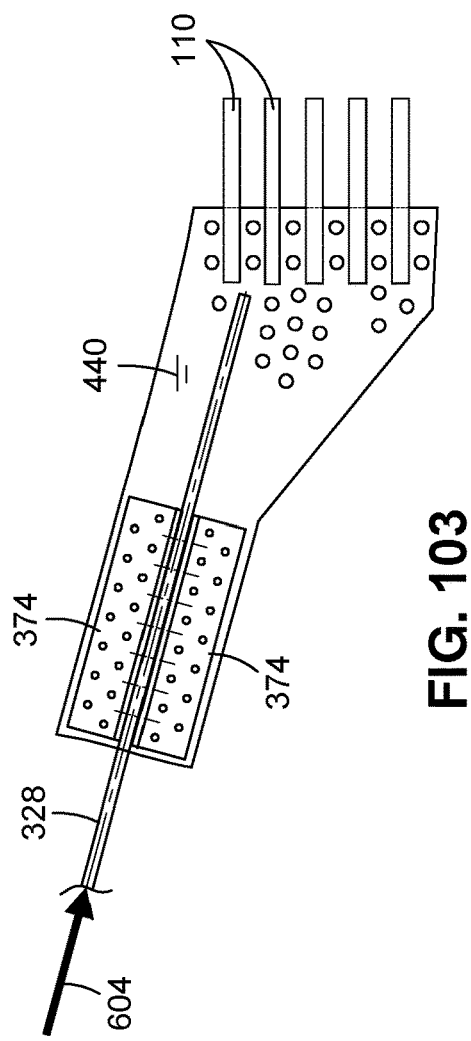
FIG. 103 is a top-down view of the rear spar plate and the strut rear spar.
Figure 105:
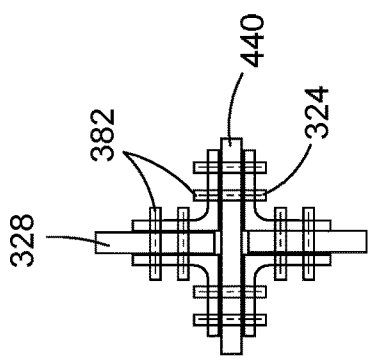
FIG. 105 is a sectional view taken along line 105-105 of FIG. 102, illustrating the coupling of the rear spar plate to the strut rear spar via angle brackets.

Referring to FIG. 90, shown is an example of a strut A-frame structure 322 having a lug plate 372 and strut lugs 376 similar to the above-described arrangement shown in FIGS. 84-85. In FIG. 90, the lug plate 372 extends from the strut spar inboard end 408 a further distance outboard along the strut front spar 326 than the distance that the lug plate 372 extends along the strut rear spar 328. Additional angle brackets 374 are included along the strut front spar 326 to facilitate the transfer of a higher tension load 602 from the strut front spar 326 into the lug plate 372, relative to the tension load 602 in the strut front spar 326 of the arrangement shown in FIGS. 84-85.

Referring to FIGS. 91-92, shown is an example of a fixed joint 388 coupling a strut A-frame structure 322 to the fuselage 102. The strut A-frame structure 322 includes a lug plate 372 coupled to the strut front spar 326 and strut rear spar 328 via angle brackets 374, as described above. In addition, the strut A-frame structure 322 includes a strut end plate 380. The strut end plate 380 is coupled to the strut spar inboard end 408 of the strut front spar 326 and the strut rear spar 328. In the example shown, the strut end plate 380 extends across the edge of the lug plate 372, and interconnects the strut front spar 326 and the strut rear spar 328. The strut end plate 380 is attached (e.g., via mechanical fasteners 382) to the fuselage 102, thereby non-rotatably coupling the strut spar 326, 328 to the fuselage 102, such that the strut 300 is a cantilevered beam 320, as shown in the above-described FIGS. 21-24. As mentioned above with regard to FIG. 83, non-rotatably coupling the strut spars 326, 328 to the fuselage 102 may improve the buckling load capability of the strut 300, and may also suppress lateral-torsional buckling of the strut 300, as described below.

Referring to FIGS. 93-108, shown is an example of a structural arrangement for attaching the strut 300 to the wing 200 at the strut-wing joint 306, for the aircraft 100 of FIG. 93. FIGS. 94-95 show the structural arrangement as a pinned joint 386 between the strut 300 and the wing 200. FIGS.

93-94 illustrate the pinned joint 386 in the assembled state. FIGS. 98-108 illustrate the configuration of the individual components that make up the pinned joint 386.

As shown in FIGS. 94-97, the strut outboard ends 310 of the strut front spar 326 and strut rear spar 328 respectively have a front spar plate 438 and a rear spar plate 440. The front spar plate 438 and the rear spar plate 440 each extend in an outboard direction and overlap each other, and are coupled together via mechanical fasteners 382. Advantageously, the arrangement of the front spar plate 438 and the rear spar plate 440 provides a means for resolving the tension load 602 in the strut front spar 326 and the compression load 604 in the strut rear spar 328 into axial tension and shear load between the strut 300 and the wing 200.

As shown in FIGS. 98-101, the front spar plate 438 is inserted into a spar slot 370 formed along the neutral axis in the strut outboard end 310 of the strut front spar 326. FIGS. 102-105 show the rear spar plate 440 inserted into a spar slot 370 formed along the neutral axis in the strut outboard end 310 of the strut rear spar 328. FIGS. 106-108 show an example where a spar plate doubler 442 is included with the rear spar plate 440 to facilitate compression load transfer between the strut rear spar 328 and the rear spar plate 440. Although not shown, a similar spar plate doubler 442 may be included with the front spar plate 438 to facilitate tension load transfer between the strut front spar 326 and the front spar plate 438. Use of spar plate doublers 442 may reduce the diameter and/or quantity of mechanical fasteners 382, due to the increased (i.e., double) shear capacity of the mechanical fasteners 382 as a result of adding the spar plate doubler 442.

In FIGS. 98-108, angle brackets 374 are used for mechanically fastening the front spar plate 438 to the strut front spar 326. Similarly, angle brackets 374 are used to couple the rear spar plate 440 to the strut rear spar 328. However the front and rear spar plates 438, 440 may be respectively coupled to the strut front and rear spars 326, 328 in any one of a variety of means. For example, the front and rear spar plates 438, 440 may be integrally formed (e.g., machined) respectively with the strut front and rear spars 326, 328.

As shown in FIGS. 98-99, the front spar plate 438 has a plurality of strut lugs 376 protruding in an outboard direction. Likewise, FIGS. 102-105 show a plurality of strut lugs 376 protruding from the rear spar plate 440. The strut lugs 376 of the front spar plate 438 and the rear spar plate 440 are generally vertically oriented. As shown in FIGS. 94-95, the strut lugs 376 are spaced apart from each other complementary to the spacing of the wing lugs 234, which protrude in an inboard direction from the underside of the wing 200. The wing lugs 234 may be directly or indirectly coupled to the wing front spar 220 (not shown) and/or the wing rear spar 222 (not shown). The strut lugs 376 are rotatably coupled to the wing lugs 234 via a pin 384, which is oriented approximately parallel to the longitudinal axis 126. The pin 384 allows for upward and downward pivoting of the strut 300 during changes in loading on the wing 200.

Referring back to FIGS. 94-95, the strut-wing joint 306 further includes at least one drag link 444 for accommodating shear loads between the wing 200 and the strut 300. In the example shown, the spar front plate is coupled to the wing 200 via a front drag link 444. The front drag link 444 extends in a forward direction from a plate front portion of the front spar plate 438. Similarly, the rear spar plate 440 is coupled to the wing 200 via a rear drag link 446. The rear drag link 446 extends in an aft direction from a plate aft portion of the rear spar plate 440. As mentioned above, the coupling of the front spar plate 438 to the rear spar plate 440 resolves the tension load 602 and compression load 604 respectively in the strut front spar 326 and strut rear spar 328 into tension load 602 in the wing lugs 234, and compression and tension respectively in the front drag link 444 and rear drag link 446. The pin 384 transfers axial load (e.g., tension load 602) between the strut lugs 376 and the wing lugs 234.

Figure 109:
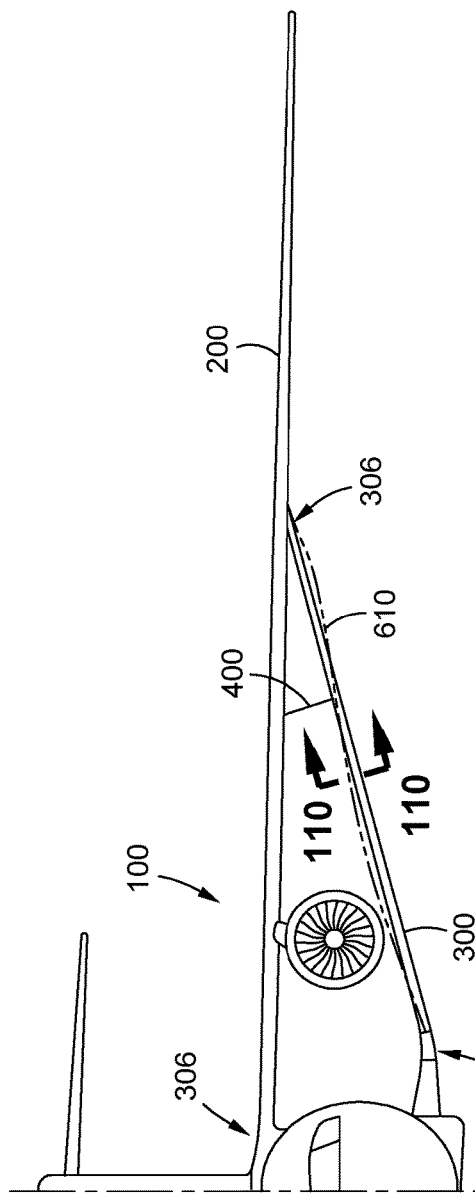
FIG. 109 is a front view of the aircraft showing the buckling of the strut, and the stabilization provided by the jury strut.
Figure 111:
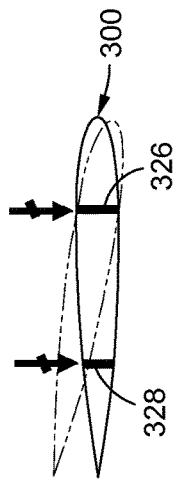
FIG. 111 is a diagrammatic view of the strut showing the reaction force provided by the jury strut acting at the strut front spar to resist buckling of the spar.

Referring to FIGS. 109-113, shown are examples of a jury strut 500 that may be included with the strut-braced aircraft 100. The jury strut 500 extends between the strut 300 and the wing 200, and is included to suppress buckling 610 (FIG. 109) of the strut 300 at high compression loads. When the aircraft 100 is viewed from the front as shown in FIG. 109, the jury strut 500 is oriented approximately (e.g., within 20 degrees) perpendicular to the strut 300. The jury strut 500 is coupled to the strut 300 at a distance from the strut-fuselage joint 304 of approximately (e.g., within 30 percent) two-thirds of the distance between the strut-fuselage joint 304 and the strut-wing joint 306.

Figure 113:
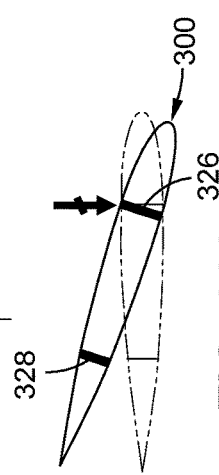
FIG. 113 is a diagrammatic view of the strut showing improved torsional buckling load-carrying capability of the strut, as a result of the jury strut extending between the strut front spar and the strut rear spar.
Figure 110:
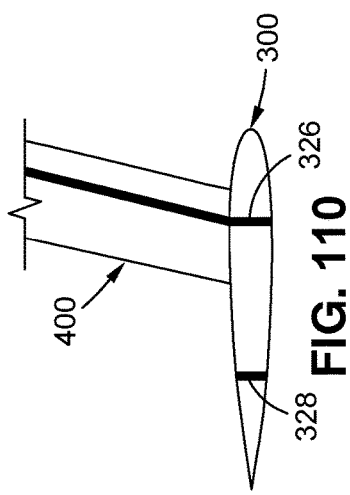
FIG. 110 is a view of the strut taken along line 110-110 of FIG. 109, and illustrating the jury strut attached to the strut proximate the strut front spar.
Figure 112:
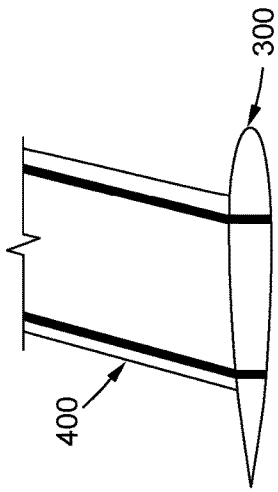
FIG. 112 is a view of an example of a strut in which the jury strut extends between the strut front spar and the strut rear spar.

As shown in FIG. 110, the jury strut 500 may be coupled to the strut 300 proximate the strut front spar 326. Such an arrangement may allow for lateral pivoting movement of the strut 300, as shown in FIG. 108. Because the strut rear spar 328 is in compression, it may have a tendency to buckle via lateral-torsional buckling. FIGS. 112-113 illustrate an arrangement in which the jury strut 500 has a width that is at least as wide as the distance between the strut front spar 326 and the strut rear spar 328 at the location wherein the jury strut 500 is coupled to the strut 300. As a result, the jury strut 500 couples both the strut front spar 326 and the strut rear spar 328 to the wing 200, and thereby has the capability to suppress lateral-torsional buckling of the strut 300.

Figure 114:
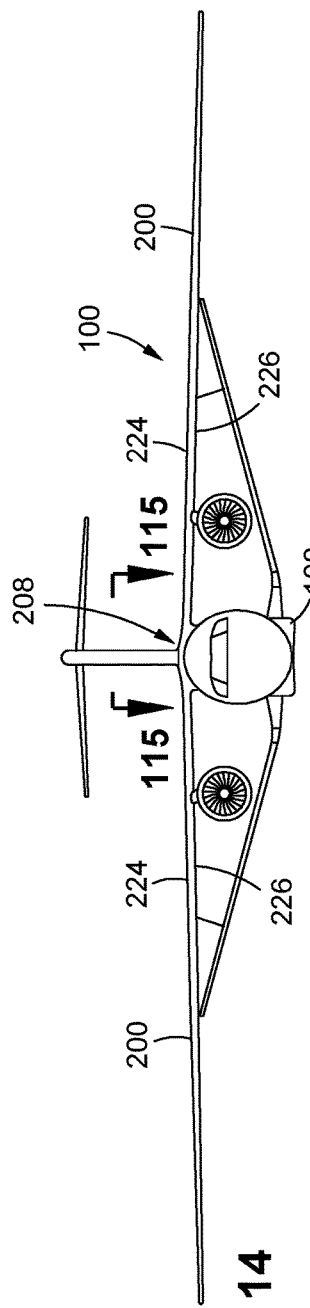
FIG. 114 is a front view of the aircraft showing the wings attached to the fuselage at the wing-fuselage joint and illustrating each wing having a wing upper skin panel and a wing lower skin panel.
Figure 115:
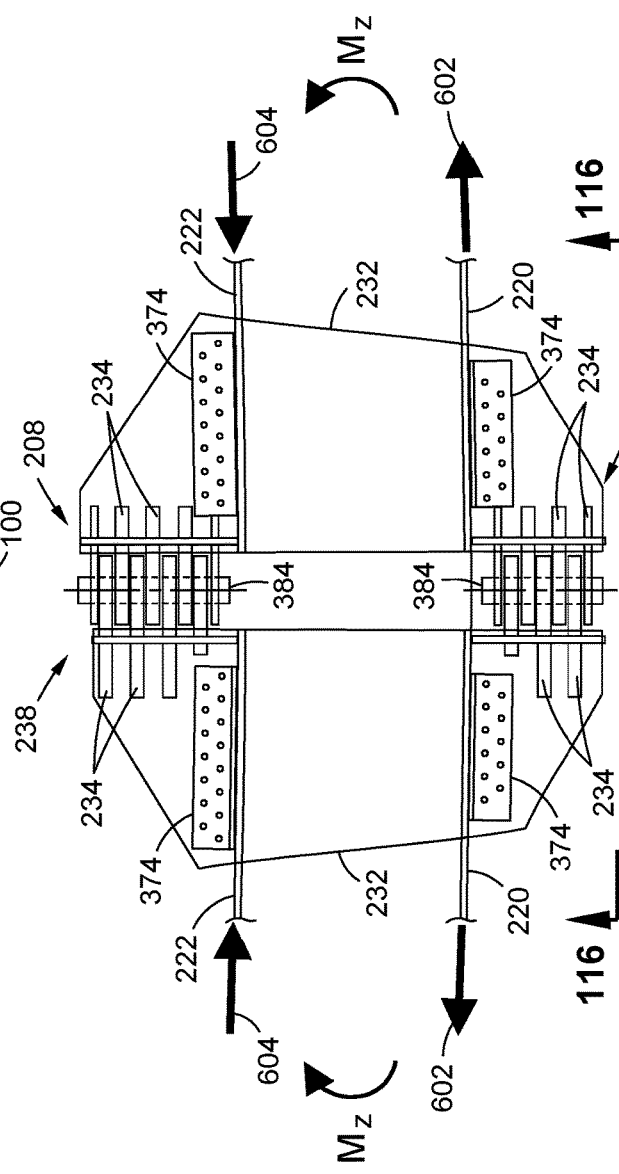
FIG. 115 is a top-down view of the wing-fuselage joint taken along line 115-115 of FIG. 114, and illustrating each wing having a wing box comprised of a wing upper skin panel, a wing lower skin panel, a wing front spar, and a wing rear spar, and coupled to a wing shear plate.
Figure 116:
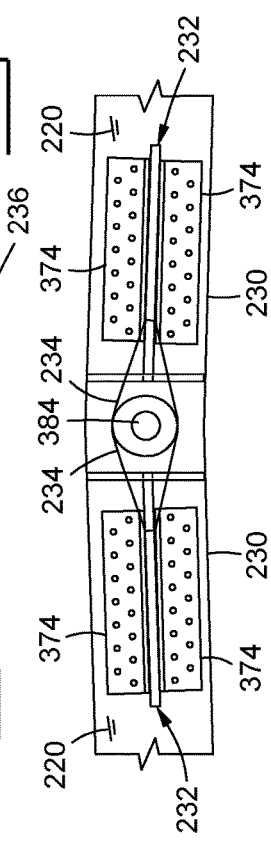
FIG. 116 is a front view of the wing-fuselage joint of FIG. 115, showing the pinned joint for interconnecting the wing shear plate respectively of each wing.

Referring to FIGS. 114-117, shown is an example of a wing-wing joint 208 at the location where the wings 200 attach to the fuselage 102. As shown in FIGS. 115-116, each wing 200 includes the above-mentioned wing front spar 220 and wing rear spar 222. In addition, the wing 200 also has a wing upper skin panel 224 (FIG. 13) and a wing lower skin panel 226 (FIG. 13). The wing front spar 220, the wing rear spar 222, the wing upper skin panel 224, and the wing lower skin panel 226 collectively form a wing box, which provides bending stiffness and torsional stiffness for the wings 200.

The wing front spar 220 and the wing rear spar 222 of each wing 200 have a wing spar inboard end 230. A spar slot 370 is formed in the wing spar inboard end 230 of the wing front spar 220 and the wing rear spar 222. Each wing 200 further includes a wing shear plate 232 interconnecting the wing spar inboard ends 230 of the wing front spar 220 and the wing rear spar 222. The wing shear plate 232 is received within the spar slots 370, and is mechanically coupled to the wing front spar 220 and the wing rear spar 222 via angle brackets 374 or other suitable means.

In addition, each wing 200 includes one or more wing lugs 234 protruding in an inboard direction from the wing shear plate 232. In the example shown, a plurality of wing lugs 234 are located forward of the wing front spar 220, and a plurality of wing lugs 234 are located aft of the wing rear spar 222. Coupled to the inboard edge of each wing shear plate 232 is a lug bracket 378 for interconnecting and mechanically stabilizing the wing lugs 234. On each wing 200, the lug bracket 378 is connected to the wing front spar 220 and the wing front spar 220 respectively at the wing front attach point 236 and at the wing rear attach point 238. The wing lugs 234 of one wing 200 are spaced apart complementary to the wing lugs 234 of the opposite wing 200. The wing lugs 234 of the opposing wings 200 are configured to be rotatably coupled via one or more pins 384, similar to the pins described above for a pinned joint 386 configuration of the strut-fuselage joint 304. In the example shown, the wing-wing joint 208 includes a separate pin 384 at the wing front attach point 236, and a separate pin 384 at the wing rear attach point 238. The pins 384 allow the wings 200 to pivot in response to various loading conditions, while resisting the tension load 602 in the wing front spars 220, the compression load 604 in the wing rear spars 222, and the vertical moment $M_z$ resulting from the lifting force 600 on each wing 200.

Figure 10:
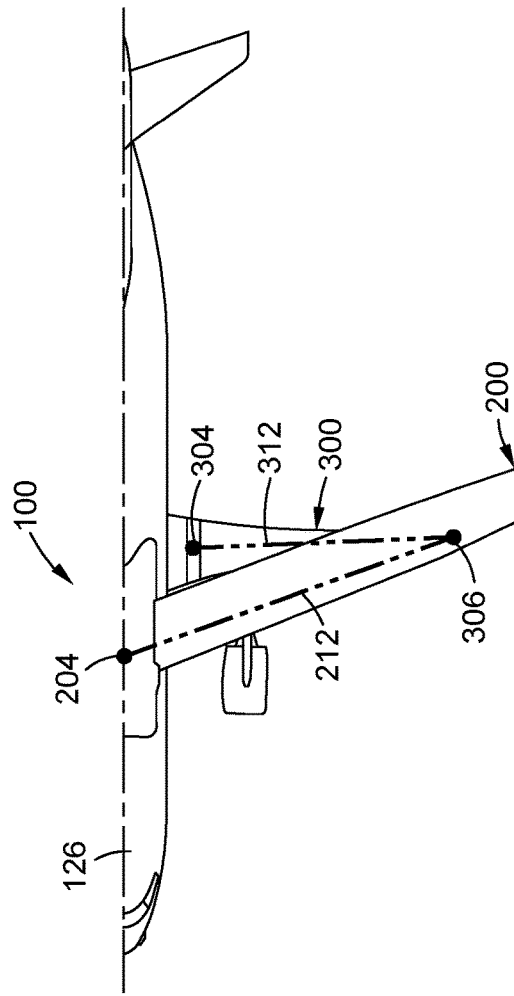
FIG. 10 is a top view of the aircraft of FIG. 9.
Figure 117:
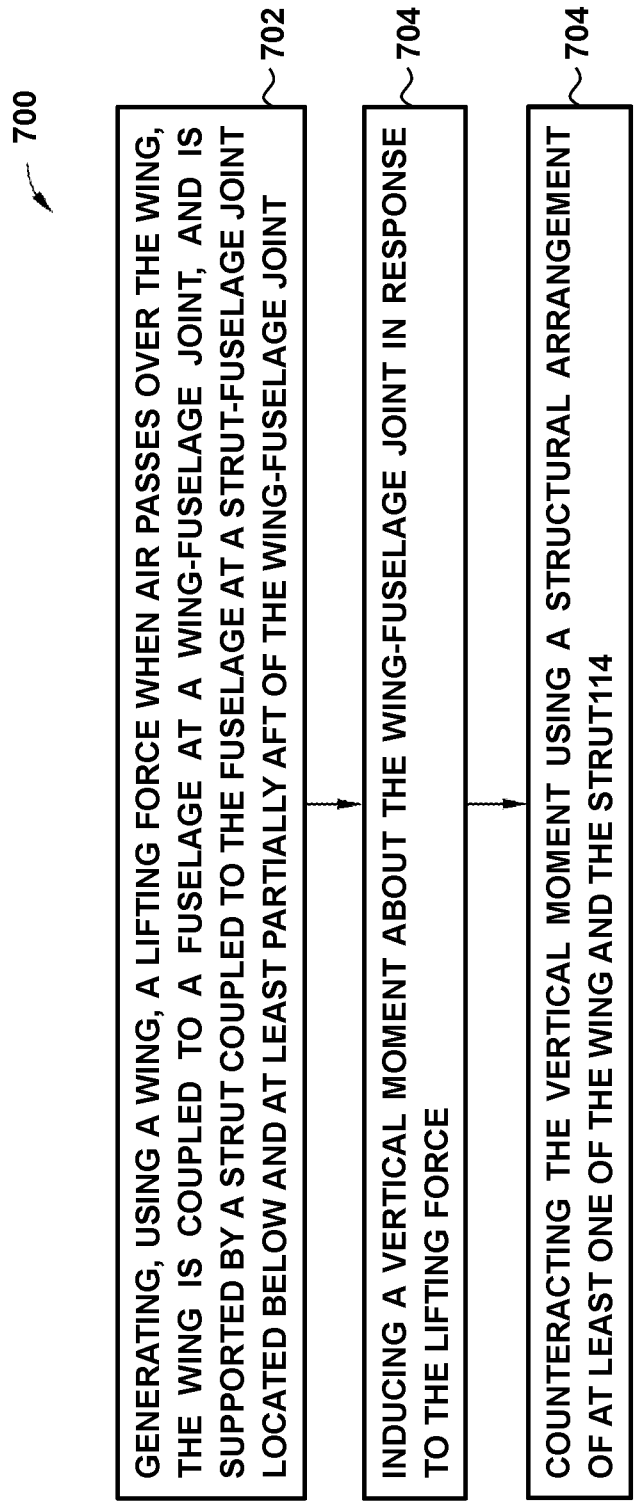
FIG. 117 is a flowchart of operations included in a method of enhancing the operation of an aircraft by counteracting vertical moment induced by lifting force generated by the wings.

Referring to FIG. 117, shown is a method 700 of enhancing the performance of an aircraft 100 configured as shown in FIGS. 1-116. Step 702 of the method 700 includes generating, using a wing 200, a lifting force 600 when air passes over the wing 200. As described above, each wing 200 of the aircraft 100 is coupled to the fuselage 102 at a wing-fuselage joint 204, and each wing 200 is supported by a strut 300 coupled to the fuselage 102 at a strut-fuselage joint 304 located below and at least partially aft of the wing-fuselage joint 204, as shown in FIGS. 10 and 12, and described above.

Step 704 of the method 700 includes the wing-strut arrangement inducing a vertical moment $M_z$ about the wing-fuselage joint 204 in response to the lifting force 600. As described above, the lifting force 600 is generated as a result of air moving over the wing 200. The vertical moment $M_z$ is created due to the non-parallel relationship between the wing axis 212 and the strut axis 312 (FIG. 20), and tends to urge the wing 200 to pivot in an aftward direction.

Step 706 of the method 700 includes counteracting the vertical moment $M_z$ using the structural arrangement of the wing 200 and/or using the structural arrangement of the strut 300. In some examples, counteracting the vertical moment $M_z$ comprises counteracting a portion of the vertical moment $M_z$ using the structural arrangement of the wing 200, and counteracting a portion of the vertical moment $M_z$ using the structural arrangement of the strut 300. The combination of the vertical moment $M_z$ counteracted by the wing 200 and the vertical moment $M_z$ counteracted by the strut 300 is equivalent to the total magnitude of the vertical moment $M_z$.

The above-described FIGS. 29-32 illustrate a structural arrangement wherein the wing 200 and the strut 300 are each configured as a cantilevered beam 320 capable of resisting a portion of the vertical moment $M_z$. In another example, FIGS. 51-54 illustrate a structural arrangement wherein the wing 200 has a wing A-frame structure 252, and the strut 300 has a strut A-frame structure 322. The combination of the wing A-frame structure 252 and the strut A-frame structure 322 defines a double tetrahedron structure, and each of the wing A-frame structure 252 and the strut A-frame structure 322 is capable of resisting a portion of the vertical moment $M_z$.

In some examples, step 706 comprises counteracting substantially equivalent portions (e.g., 50 percent) of the vertical moment $M_z$ using the wing 200 and the strut 300. In other examples, step 706 comprises counteracting more than 50 percent of the vertical moment $M_z$ using the strut 300, and counteracting a remaining portion of the vertical moment $M_z$ using the wing 200. Referring to the example of FIGS. 21-24, step 706 of counteracting the vertical moment $M_z$ comprises carrying tension load 602 and bending load in the strut 300, which is configured as a single cantilevered beam 320 fixedly coupled to the fuselage 102 at the strut-fuselage joint 304.

Referring to FIGS. 37-40, step 706 of counteracting the vertical moment $M_z$ comprises carrying tension load 602 and compression load 604 respectively in the strut front spar 326 and the strut rear spar 328 of the above-mentioned strut A-frame structure 322. As described above, the strut front spar 326 and strut rear spar 328 each have a strut spar inboard end 408 and a strut spar outboard end 410. The strut spar outboard ends 410 converge at the strut-wing joint 306, and the strut spar inboard ends 408 are spaced apart from each other at the strut-fuselage joint 304. Step 706 additionally includes transferring the tension load 602 and the compression load 604 into the fuselage 102 at the strut front attach point 400 and the strut rear attach point 402 of the strut-fuselage joint 304.

Referring still to the arrangement shown in FIGS. 37-40, the method 700 further comprises reacting shear load at the strut-fuselage joint 304 (e.g., at the strut front attach point 400 and the strut rear attach point 402) using an inboard end connector 330 interconnecting the strut spar inboard ends 408. As described above, the shear reaction results from the tension load 602 and the compression load 604 in the strut front spar 326 and the strut rear spar 328. As shown schematically in FIG. 40, the step of transferring the shear reaction into the fuselage 102 comprises reacting the shear load at a single location along the inboard end connector 330.

Referring to the arrangement of FIGS. 42-43, the steps of carrying the tension load 602 and carrying the compression load 604 comprise, carrying the tension load 602 and the compression load 604 respectively in the strut front spar 326 and the strut rear spar 328 of the strut 300 having a strut leading edge 314 and a strut trailing edge 316. As shown in the figures, the strut front spar 326 and the strut rear spar 328 each extend from the strut root 302 at the strut-fuselage joint 304, to the strut outboard end 310 at the strut-wing joint 306. As described above, the strut leading edge 314 and the strut trailing edge 316 define a tapered shape of the strut 300 from the strut root 302 to the strut outboard end 310. As shown in FIG. 42, the tapered shape is complementary to the A-frame structure of the strut front spar 326 and the strut rear spar 328. At least a portion of the strut leading edge 314 is aft of a wing trailing edge 216 of the wing 200.

Referring to the arrangement of FIGS. 65-66, the steps of carrying the tension load 602 and carrying the compression load 604 respectively comprise carrying the tension load 602 and the compression load 604 respectively in the strut front spar 326 and the strut rear spar 328, each of which is contiguous, and each has at least one kink 414 dividing the strut front spar 326 and the strut rear spar 328 into a strut spar inboard section 416 and a strut spar outboard section 418. As described above, the strut spar inboard section 416 of the strut front spar 326 is angled forwardly relative to the strut spar outboard section 418 of the strut front spar 326, and the strut spar inboard section 416 of the strut rear spar 328 is angled aftwardly relative to the strut spar outboard section 418 of the strut front spar 326, to thereby increase the distance between the strut spar inboard ends 408.

Referring still to FIGS. 65-66, carrying the tension load 602 and carrying the compression load 604 respectively comprise distributing the tension load 602 and the compression load 604 respectively into the strut front attach point 400 and the strut rear attach point 402 using a kink connector beam 422, a kink plate 420, and/or a pair of diagonal members 424. As shown and described above, the kink connector beam 422 extends between and interconnects the kinks 414 respectively of the strut front spar 326 and the strut rear spar 328. The kink plate 420 extends between and interconnects the strut spar inboard section 416 of the strut front spar 326 to the strut spar inboard section 416 of the strut rear spar 328. Each one of the diagonal members 424 extends from one of the strut spar inboard ends 408 of one of the strut spars 326, 328, to the kink 414 of the remaining strut spar 326, 328.

Referring to the arrangement of FIGS. 72-73, the method 700 may further include distributing the tension load 602 into the strut front attach point 400 using a strut front fitting 434 extending forward of, and coupled to, the strut front spar 326 proximate the strut root 302. In addition, the method 700 may include distributing the compression load 604 into the strut rear attach point 402 using a strut rear fitting 436 extending aft of, and coupled to, the strut rear spar 328 proximate the strut root 302. As described above, the steps of distributing the tension load 602 and distributing the compression load 604 are respectively performed by the strut front fitting 434 and the strut rear fitting 436 configured as plates. In the example of FIG. 73, the plates of the strut front fitting 434 and the strut rear fitting 436 are located at the neutral axis respectively of the strut front spar 326 and the strut rear spar 328.

Referring to the arrangement of FIGS. 74-76, the steps of distributing the tension load 602 and distributing the compression load 604 are respectively performed by the strut front fitting 434 and the strut rear fitting 436 extending between and interconnecting the upper cap 350 and the lower cap 352 respectively of the strut front spar 326 and the strut rear spar 328. As described above, the strut front spar 326 and the strut rear spar 328 each have a channel-shaped cross-section in which the upper cap 350 and the lower cap 352 are interconnected by a web. As shown in FIG. 76, the strut front fitting 434 is nested within the channel-shaped cross-section of the strut front spar 326, and is mechanically fastened to the strut front spar 326. The strut rear fitting 436 is coupled to the strut rear spar 328 in a similar manner.

For the arrangement of FIGS. 74-76, the method 700 further comprises distributing the tension load 602 into the strut front attach point 400, and distributing the compression load 604 into the strut rear attach point 402, using a lug plate 372 insertable within a spar slot 370 in the strut front spar 326 and the strut rear spar 328. As described above, the lug plate 372 interconnects the strut front spar 326 and the strut rear spar 328. To increase the spacing between the strut front attach point 400 and strut rear attach point 402, the lug plate 372 extends forward of the strut front spar 326, and aft of the strut rear spar 328. The lug plate 372 has one or more strut lugs 376 located forward of the strut front spar 326, and one or more strut lugs 376 located aft of the strut rear spar 328. The strut lugs 376 are rotatably coupled, via one or more pins 384, to a plurality of fuselage lugs 110 protruding from the fuselage 102 at the strut front attach point 400 and the strut rear attach point 402, as shown in FIGS. 84-85 and described above.

Referring to FIGS. 67-68, in an alternative structural arrangement of the strut A-frame structure 322, step 706 of counteracting the vertical moment $M_z$ comprises carrying tension load 602 and compression load 604 respectively in a strut leading edge member 426 and a strut trailing edge member 428 respectively defining the strut leading edge 314 and the strut trailing edge 316 of the strut 300. As shown in the above-described FIG. 68, the strut leading edge member 426 and the strut trailing edge member 428 are interconnected by the strut upper skin panel 358 and the strut lower skin panel 360. As shown in FIG. 67, the strut leading edge member 426 and the strut trailing edge member 428 each have a strut member inboard end 430 and a strut member outboard end 432. The strut member inboard ends 430 are spaced apart from each other at the strut-fuselage joint 304, and the strut member outboard ends 432 converge at the strut-wing joint 306. Referring to FIGS. 69-70 showing 200 a still further structural arrangement of the strut A-frame structure 322, the steps of carrying the tension load 602 and carrying the compression load 604 respectively comprise carrying the tension load 602 and carrying the compression load 604 using reinforcing fibers 356 (e.g., boron fibers) extending continuously between the strut root 302 and the strut outboard end 310 of the strut front spar 326 and the strut rear spar 328.

As an alternative to the pinned joint 386 of FIGS. 84-85, the steps of transferring the tension load 602 and transferring the compression load 604 respectively comprise transferring the tension load 602 and transferring the compression load 604 via a fixed joint 388, coupling the strut 300 to the fuselage 102 at the strut front attach point 400 and the strut rear attach point 402. Transferring the tension load 602 and transferring the compression load 604 are performed via a strut end plate 380. As described above, the strut end plate 380 is coupled to the strut spar inboard end 408 of the strut front spar 326 or the strut rear spar 328. In the example shown, the strut end plate 380 is attached to the fuselage 102 via mechanical fasteners 382.

Referring to the example of the strut-wing joint 306 shown in FIGS. 94-107, the method 700 further comprises transferring the tension load 602 and the compression load 604 into the wing 200 using a front spar plate 438 and a rear spar plate 440 respectively extending from the strut front spar 326 and the strut rear spar 328. As described above, the front spar plate 438 and rear spar plate 440 are coupled together in overlapping relation. The front spar plate 438 and the rear spar plate 440 each have one or more strut lugs 376 protruding in an outboard direction. The method 700 additionally includes resolving, via the front spar plate 438 and the rear spar plate 440, the tension load 602 and the compression load 604 respectively in the strut front spar 326 and strut rear spar 328 into axial tension transmitted into a plurality of wing lugs 234. As described above, the wing lugs 234 protrude in an inboard direction, and are rotatably coupled to the strut lugs 376 via a pin 384. The resolution of the tension load 602 and compression load 604 respectively in the strut front spar 326 and strut rear spar 328 also includes transmitting shear between the wing 200 and strut 300 via at least one drag link. In the example shown, compression load 604 and tension load 602 are respectively transferred via the front drag link 444 and the rear drag link 446. As shown in FIG. 94, the front drag link 444 and the rear drag link 446 are oriented in a forward-aft direction. The front drag link 444 and the rear drag link 446 couple the wing 200 respectively to the front spar plate 438 and the rear spar plate 440.

Referring to FIGS. 109-113, the method 700 further comprises suppressing buckling of each strut 300 using a jury strut 500 extending between the strut 300 and the wing 200. As described above, each jury strut 500 suppresses buckling of the strut 300 (i.e., the main strut) at high compression load. The step of suppressing the buckling of the strut 300 is performed with the jury strut 500 coupled to the strut 300 at a distance from the strut-fuselage joint 304 of approximately two-thirds of the distance between the strut-fuselage joint 304 and the strut-wing joint 306. In some examples, suppressing the buckling of the strut 300 comprises suppressing lateral-torsional buckling of the strut 300 using the jury strut 500 having a jury strut 500 width that is at least as wide as the distance between the strut front spar 326 and the strut rear spar 328.

Referring to FIGS. 114-116, the method 700 may comprise counteracting at least a portion of the vertical moment $M_z$ using the wing 200, by carrying tension load 602 and compression load 604 respectively in the wing front spar 220 and the wing rear spar 222. As described above, the wing front spar 220 and the wing rear spar 222 each have a wing spar inboard end 230 at the wing-fuselage joint 204. Each wing 200 includes a wing shear plate 232 interconnecting the wing spar inboard ends 230 of the wing front spar 220 and the wing rear spar 222. The wing shear plates 232 each have protruding wing lugs 234 that are interconnected via a pinned joint 386 using one or more pins 384.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. An aircraft, comprising:
a fuselage;
a wing coupled to the fuselage at a wing-fuselage joint;
a strut coupled to the fuselage at a strut-fuselage joint and coupled to the wing at a strut-wing joint, the strut-fuselage joint located below and at least partially aft of the wing-fuselage joint;
wherein:
the wing generates a lifting force when air passes over the wing;
the lifting force induces a vertical moment about the wing-fuselage joint due to the location of the strut-fuselage joint below and at least partially aft of the wing-fuselage joint;
the strut comprises an A-frame structure configured to counteract at least a portion of the vertical moment, the A-frame structure comprising a strut front spar and a strut rear spar each having a strut spar inboard end and a strut spar outboard end;
the strut spar inboard ends are spaced apart from each other at the strut-fuselage joint; and
the strut front spar and the strut rear spar having strut axes that converge to a point at the strut-wing joint where the strut spar outboard ends are coupled to the wing.

2. The aircraft of claim 1, wherein:
the wing and the strut are each configured to counteract a portion of the vertical moment; and
a combination of the vertical moment counteracted by the wing, and the vertical moment counteracted by the strut, is equivalent to a total magnitude of the vertical moment.

3. The aircraft of claim 1, wherein:
the strut front spar and the strut rear spar are respectively configured to carry tension load and compression load in response to the vertical moment induced by the lifting force; and
the strut spar inboard ends are configured to transfer the tension load and the compression load into the fuselage at a strut front attach point and a strut rear attach point of the strut-fuselage joint.

4. The aircraft of claim 3, wherein:
the A-frame structure has an inboard end connector interconnecting the strut spar inboard ends;
the inboard end connector is configured to transfer shear load into the fuselage at the strut front attach point and the strut rear attach point; and
the shear load is in response to the tension load and the compression load respectively carried by the strut front spar and the strut rear spar.

5. The aircraft of claim 3, wherein:
the strut includes a strut leading edge and a strut trailing edge, each extending from a strut root at the strut-fuselage joint, to a strut outboard end at the strut-wing joint;
the strut leading edge and the strut trailing edge define a tapered shape of the strut from the strut root to the strut outboard end; and
the tapered shape of the strut is complementary to a shape of the A-frame structure defined by the strut front spar and the strut rear spar.

6. The aircraft of claim 3, wherein:
the strut includes a strut leading edge and a strut trailing edge, each extending from a strut root at the strut-fuselage joint, to a strut outboard end at the strut-wing joint;
the strut front attach point is located forward of the strut spar inboard end of the strut front spar, and aft of the strut leading edge; and
the strut rear attach point is located aft of the strut spar inboard end of the strut rear spar, and forward of the strut trailing edge.

7. The aircraft of claim 3, wherein:
the strut front spar and the strut rear spar are each contiguous, and each has a kink dividing the strut front spar and the strut rear spar into a strut spar inboard section and a strut spar outboard section; and
the strut spar inboard section of the strut front spar is angled forwardly relative to the strut spar outboard section of the strut front spar, and the strut spar inboard section of the strut rear spar is angled aftwardly relative to the strut spar outboard section of the strut front spar, to thereby increase the distance between the strut spar inboard ends.

8. The aircraft of claim 7, further comprising at least one of:
a kink connector beam extending between and interconnecting the kinks respectively of the strut front spar and the strut rear spar;
a kink plate extending between and interconnecting the strut spar inboard section of the strut front spar to the strut spar inboard section of the strut rear spar; and
a pair of diagonal members, each extending from one of the strut spar inboard ends of one of the strut spars, to the kink of the other strut spar.

9. The aircraft of claim 3, further comprising:
a strut front fitting extending forward of, and coupled to, the strut front spar, and configured to distribute the tension load into the fuselage at the strut front attach point of the strut-fuselage joint; and
a strut rear fitting extending aft of, and coupled to, the strut rear spar, and configured to distribute the compression load into the fuselage at the strut rear attach point of the strut-fuselage joint.

10. The aircraft of claim 3, wherein:
the strut spar inboard end of the strut front spar and of the strut rear spar each has a spar slot extending along a neutral axis;
the A-frame structure including:
a lug plate insertable within the spar slot in the strut front spar and the strut rear spar, the lug plate interconnecting the strut front spar and the strut rear spar, and extending forward of the strut front spar, and aft of the strut rear spar;

a plurality of strut lugs extending in an inboard direction from the lug plate, including one or more strut lugs located forward of the strut spar inboard end of the strut front spar, and one or more strut lugs located aft of the strut spar inboard end of the strut rear spar; and the fuselage has a plurality of fuselage lugs protruding in an outboard direction for rotatably coupling, via one or more pins, to the strut lugs at the strut front attach point and the strut rear attach point.

11. The aircraft of claim 3, wherein:

the strut outboard ends of the strut front spar and the strut rear spar respectively have a front spar plate and a rear spar plate, each extending in an outboard direction and overlapping each other and coupled together via mechanical fasteners;

at least one of the front spar plate and the rear spar plate has one or more strut lugs protruding in an outboard direction;

the wing has one or more wing lugs protruding from the wing in an inboard direction and configured complementary to the strut lugs;

the strut lugs and the wing lugs are rotatably coupled via a pin;

at least one of the spar front plate and the spar rear plate is coupled to the wing via at least one drag link oriented in a forward-aft direction and coupled to at least one of the spar front plate and the spar rear plate; and the coupling of the front spar plate to the rear spar plate resolving the tension load and compression load respectively in the strut front spar and strut rear spar into axial tension in the wing lugs, and axial compression and axial tension respectively in the front drag link and the rear drag link.

12. An aircraft, comprising:

a fuselage;

a wing coupled to the fuselage at a wing-fuselage joint, and having a wing trailing edge;

a strut coupled to the fuselage at a strut-fuselage joint and coupled to the wing at a strut-wing joint, the strut-fuselage joint located below and at least partially aft of the wing-fuselage joint, the strut has a strut leading edge, a portion of which is located aft of the wing trailing edge when the aircraft is viewed from a top-down perspective;

wherein:

the wing generates a lifting force when air passes over the wing;

the lifting force induces a vertical moment about the wing-fuselage joint due to the location of the strut-fuselage joint below and at least partially aft of the wing-fuselage joint;

the strut comprises an A-frame structure configured to counteract at least a portion of the vertical moment, the A-frame structure comprising a strut front spar and a strut rear spar each having a strut spar inboard end and a strut spar outboard end;

the strut spar inboard ends are spaced apart from each other at the strut-fuselage joint; and the strut front spar and the strut rear spar having strut axes that converge to a point at the strut-wing joint where the strut spar outboard ends are coupled to the wing.

13. A method of enhancing the performance of an aircraft, comprising:

generating, using a wing, a lifting force when air passes over the wing, the wing is coupled to a fuselage at a wing-fuselage joint, and is supported by a strut coupled to the fuselage at a strut-fuselage joint located below and at least partially aft of the wing-fuselage joint, the strut comprises an A-frame structure having a strut front spar and a strut rear spar each having a strut spar inboard end and a strut spar outboard end, the strut spar inboard ends are spaced apart from each other at the strut-fuselage joint, the strut front spar and the strut rear spar having strut axes that converge to a point at the strut-wing joint where the strut spar outboard ends are coupled to the wing;

inducing a vertical moment about the wing-fuselage joint in response to the lifting force; and counteracting at least a portion of the vertical moment using the strut.

14. The method of claim 13, wherein counteracting the vertical moment comprises:

counteracting a portion of the vertical moment using a structural arrangement of the wing, and counteracting a portion of the vertical moment using a structural arrangement of the strut, a combination of the vertical moment counteracted by the wing and the vertical moment counteracted by the strut is equivalent to a total magnitude of the vertical moment.

15. The method of claim 13, wherein counteracting the vertical moment comprises:

carrying tension load and compression load respectively in the strut front spar and the strut rear spar of the A-frame structure of the strut; and transferring the tension load and the compression load into the fuselage at a strut front attach point and a strut rear attach point of the strut-fuselage joint.

16. The method of claim 15, further comprising:

reacting shear load at the strut-fuselage joint using an inboard end connector interconnecting the strut spar inboard ends, the shear load resulting from the tension load and the compression load in the strut front spar and the strut rear spar.

17. The method of claim 15, wherein carrying the tension load and carrying the compression load comprises:

carrying the tension load and the compression load respectively in the strut front spar and the strut rear spar, the strut having a strut leading edge and a strut trailing edge, each extending from a strut root at the strut-fuselage joint, to a strut outboard end at the strut-wing joint; and wherein the strut leading edge and the strut trailing edge define a tapered shape of the strut from the strut root to the strut outboard end, the tapered shape is complementary to the A-frame structure defined by the strut front spar and the strut rear spar.

18. The method of claim 15, wherein carrying the tension load and carrying the compression load respectively comprises:

carrying the tension load and the compression load respectively in the strut front spar and the strut rear spar, each of which is contiguous, and each has a kink dividing the strut front spar and the strut rear spar into a strut spar inboard section and a strut spar outboard section; and wherein the strut spar inboard section of the strut front spar is angled forwardly relative to the strut spar outboard section of the strut front spar, and the strut spar inboard section of the strut rear spar is angled aftwardly relative to the strut spar outboard section of the strut front spar, to thereby increase the distance between the strut spar inboard ends.

19. The method of claim 15, further comprising:
distributing the tension load into the strut front attach point using a strut front fitting extending forward of, and coupled to, the strut front spar; and
distributing the compression load into the strut rear attach point using a strut rear fitting extending aft of, and coupled to, the strut rear spar.

20. The method of claim 15, further comprising:
distributing the tension load into the strut front attach point, and distributing the compression load into the strut rear attach point, using a lug plate insertable within a spar slot in the strut front spar and the strut rear spar, the lug plate interconnecting the strut front spar and the strut rear spar, and extending forward of the strut front spar, and aft of the strut rear spar; and
the lug plate having one or more strut lugs located forward of the strut front spar, and one or more strut lugs located aft of the strut rear spar, the strut lugs rotatably coupled via one or more pins to a plurality of fuselage lugs protruding from the fuselage at the strut front attach point and the strut rear attach point.

21. The method of claim 15, further comprising transferring the tension load and transferring the compression load into the wing at the strut-wing joint, by performing the following:
transferring the tension load and the compression load respectively into a front spar plate and a rear spar plate respectively extending from the strut front spar and the strut rear spar, the front spar plate and rear spar plate are coupled together in overlapping relation, and at least one of the front spar plate and rear spar plate has a plurality of strut lugs protruding in an outboard direction;
resolving, via the front spar plate and the rear spar plate, the tension load and the compression load into:
axial tension in a plurality of wing lugs protruding in an inboard direction and rotatably coupled to the plurality of strut lugs via a pin; and
axial compression and axial tension respectively in a front drag link and a rear drag link each extending in a forward-aft direction from at least one of the spar front plate and the spar rear plate.

* * * * *